US008098485B2

(12) United States Patent
Weaver et al.

(10) Patent No.: US 8,098,485 B2

(45) Date of Patent: Jan. 17, 2012

(54) WIRELESS NETWORK SENSORS FOR DETECTING EVENTS OCCURRING PROXIMATE THE SENSORS

(75) Inventors: Billy L. Weaver, Eagan, MN (US); Silva K. Theiss, Woodbury, MN (US); Kathy L. Hagen, Stillwater, MN (US)

(73) Assignee: 3M Innovative Properties Company, Saint Paul, MN (US)

(*) Notice: Subject to any disclaimer, the term of this patent is extended or adjusted under 35 U.S.C. 154(b) by 1217 days.

(21) Appl. No.: 11/772,883

(22) Filed: Jul. 3, 2007

(65) Prior Publication Data

US 2009/0196206 A1 Aug. 6, 2009

(51) Int. Cl.
*G06F 1/16* (2006.01)

(52) U.S. Cl. ................. 361/679.01; 340/573.1; 370/338

(58) Field of Classification Search ............. 361/679.01; 370/338

See application file for complete search history.

(56) References Cited

U.S. PATENT DOCUMENTS

| | | | | |
|---|---|---|---|---|
| 4,853,678 | A | 8/1989 | Bishop, Jr. et al. | |
| 5,400,246 | A | 3/1995 | Wilson et al. | |
| 5,742,055 | A | 4/1998 | Lee | |
| 5,844,240 | A | 12/1998 | Lee et al. | |
| 5,959,529 | A * | 9/1999 | Kail, IV | 340/539.12 |
| 6,031,455 | A | 2/2000 | Grube et al. | |
| 6,477,160 | B2 | 11/2002 | Gleeson | |
| 6,608,559 | B1 | 8/2003 | Lemelson et al. | |
| 6,859,359 | B2 * | 2/2005 | Young et al. | 361/679.34 |
| 6,895,324 | B2 | 5/2005 | Straub | |
| 7,171,024 | B2 | 1/2007 | Crabtree | |
| 7,411,489 | B1 * | 8/2008 | Elwell et al. | 340/501 |
| 8,013,731 | B2 * | 9/2011 | Weaver et al. | 340/539.1 |
| 2001/0049636 | A1 | 12/2001 | Hudda et al. | |
| 2002/0121979 | A1 * | 9/2002 | Smith | 340/572.1 |
| 2002/0178085 | A1 | 11/2002 | Sorenson | |
| 2003/0160701 | A1 | 8/2003 | Nakamura et al. | |
| 2003/0174099 | A1 | 9/2003 | Bauer et al. | |
| 2004/0217876 | A1 * | 11/2004 | Blum et al. | 340/815.4 |
| 2004/0233054 | A1 | 11/2004 | Neff et al. | |
| 2004/0233178 | A1 | 11/2004 | Silk et al. | |
| 2004/0263328 | A1 | 12/2004 | Issal | |
| 2005/0273377 | A1 | 12/2005 | Ouimet et al. | |
| 2006/0087992 | A1 | 4/2006 | Ganesh | |
| 2006/0088012 | A1 | 4/2006 | Ganesh | |
| 2006/0088013 | A1 * | 4/2006 | Ganesh | 370/338 |

(Continued)

FOREIGN PATENT DOCUMENTS

EP 755034 A1 1/1997

(Continued)

OTHER PUBLICATIONS

"Method for relating retails sales based on customer traffic patterns," Research Disclosure, Jan. 2002, 138.

Wren et al., "Toward Scalable Activity Recognition for Sensor Networks", Mitsubishi Electric Research Laboratories, TR2006-011, Mar. 2006.

(Continued)

*Primary Examiner* — Lisa Lea Edmonds

(57) ABSTRACT

A detection sensor for detecting proximately occurring events such as traffic patterns. The detection sensor includes a housing having several apertures and a wireless network sensor located in the housing. The wireless network sensor has several sensors for detecting events occurring proximate them, a processor for receiving and processing data from the sensors, and a wireless transmitter for wirelessly transmitting data. Each of the sensors is contained within one of the apertures, and the apertures have shapes configured to provide for varying types of coverage areas for each of the sensors.

20 Claims, 34 Drawing Sheets

U.S. PATENT DOCUMENTS

| | | | | |
|---|---|---|---|---|
| 2006/0098594 | A1 | 5/2006 | Ganesh | |
| 2006/0103534 | A1 | 5/2006 | Arms et al. | |
| 2006/0106490 | A1 | 5/2006 | Howell et al. | |
| 2007/0030816 | A1 | 2/2007 | Kolavennu | |
| 2007/0285510 | A1 | 12/2007 | Lipton et al. | |
| 2009/0009317 | A1 * | 1/2009 | Weaver et al. | 340/517 |
| 2009/0009323 | A1 * | 1/2009 | Weaver et al. | 340/539.26 |
| 2009/0009339 | A1 * | 1/2009 | Gorrell et al. | 340/573.1 |
| 2009/0009340 | A1 * | 1/2009 | Weaver et al. | 340/573.1 |

FOREIGN PATENT DOCUMENTS

| | | | |
|---|---|---|---|
| GB | 2423402 | A | 8/2006 |
| WO | WO 0026879 | | 5/2000 |
| WO | WO 02/093306 | | 11/2002 |
| WO | WO 03080133 | | 10/2003 |
| WO | WO 2004/027556 | | 4/2004 |
| WO | WO 2006125279 | | 11/2006 |

OTHER PUBLICATIONS

Wren et al., “Similarity-based analysis for large networks of ultra-low resolution sensors”, Pattern Recognition, Jan. 2005, 1918-1931.

Company Overview from www.brickstream.com dated Jul. 13, 2007.

U.S. Appl. No. 60/947,822, filed Jul. 3, 2007.

U.S. Appl. No. 60/947,814, filed Jul. 3, 2007.

U.S. Appl. No. 60/947,803, filed Jul. 3, 2007.

Anderson, Donald, “Why Count Customers” Retail Connections Magazine, 2004.

U.S. Appl. No. 11/772,871, Office Action Dated Jul. 9, 2009.

U.S. Appl. No. 11/772,866, Office Action Dated Sep. 23, 2009.

U.S. Appl. No. 11/772,878, Office Action Dated Sep. 28, 2009.

U.S. Appl. No. 11/772,889, Office Action Dated Jul. 9, 2009.

* cited by examiner

| Mote\Sensor | 1 | 2 | 3 | 4 | 5 | 6 | Total |
|---|---|---|---|---|---|---|---|
| 1 | 15 | 21 | 11 | 1 | 1 | 24 | 73 |
| 2 | 9 | 15 | 10 | 11 | 8 | 16 | 69 |
| 3 | 0 | 0 | 0 | 0 | 0 | 0 | 0 |
| 4 | 0 | 0 | 0 | 0 | 0 | 0 | 0 |
| 5 | 0 | 0 | 0 | 0 | 0 | 0 | 0 |
| 6 | 0 | 0 | 0 | 0 | 0 | 0 | 0 |
| 7 | | | | | | | |

| Episode | 1 | 2 | 3 | 4 | 5 | 6 |
|---|---|---|---|---|---|---|
| 1 | 1 | 1 | 0 | 0 | 0 | 5 |
| 2 | 5 | 1 | 1 | 0 | 0 | 0 |
| 3 | 0 | 0 | 5 | 1 | 0 | 0 |
| 4 | 0 | 0 | 2 | 0 | 4 | 0 |
| 5 | 0 | 0 | 0 | 4 | 1 | 1 |
| 6 | 0 | 0 | 0 | 0 | 1 | 7 |

WIRELESS NETWORK SENSORS FOR DETECTING EVENTS OCCURRING PROXIMATE THE SENSORS

REFERENCE TO RELATED APPLICATIONS

The present application is related to the following applications, all of which are incorporated herein by reference as if fully set forth: U.S. Patent Applications Publication Nos. 2009-0009339, 2009-0009317, 2009-0009323, and 2009-0009340.

BACKGROUND

Devices are available for monitoring people traffic in public spaces. For example, ceiling mounted cameras have been used to monitor pedestrians. However, cameras require more power and vastly higher data bandwidth than other ways to measure the traffic. Interpreting camera data is also a complicated and computationally-intensive undertaking, in addition to raising privacy concerns. Infrared motion detectors are another way to measure the traffic, particularly the number of individuals entering or leaving a particular space. However, they too require more power than other solutions and suffer from reduced range when the ambient temperature approaches body temperature.

Accordingly, a need exists for improved ways to monitor, measure, and evaluate people or other traffic in particular spaces.

SUMMARY

A first detection sensor, consistent with the present invention, has a housing that includes several apertures. A wireless network sensor is located in the housing and has several sensors for detecting events occurring proximate them, a processor for receiving and processing data from the sensors, and a wireless transmitter for wirelessly transmitting data. Each of the sensors is contained within one of the apertures.

A second detection sensor, consistent with the present invention, has a housing having several side sections. The housing has a first aperture having a first diameter and a second aperture, joined with the first aperture, having a second diameter larger than the first diameter and having an exit portion at one of the side sections. The exit portion has a circular or oval cross-sectional shape. The second aperture is configured to contain a sensor for detecting events occurring proximate the sensor, the sensor being coupled to a wireless network sensor having a processor for receiving and processing data from the sensor and a wireless transmitter for wirelessly transmitting data.

BRIEF DESCRIPTION OF THE DRAWINGS

The accompanying drawings are incorporated in and constitute a part of this specification and, together with the description, explain the advantages and principles of the embodiment. In the drawings.

DETAILED DESCRIPTION

Figure 1:
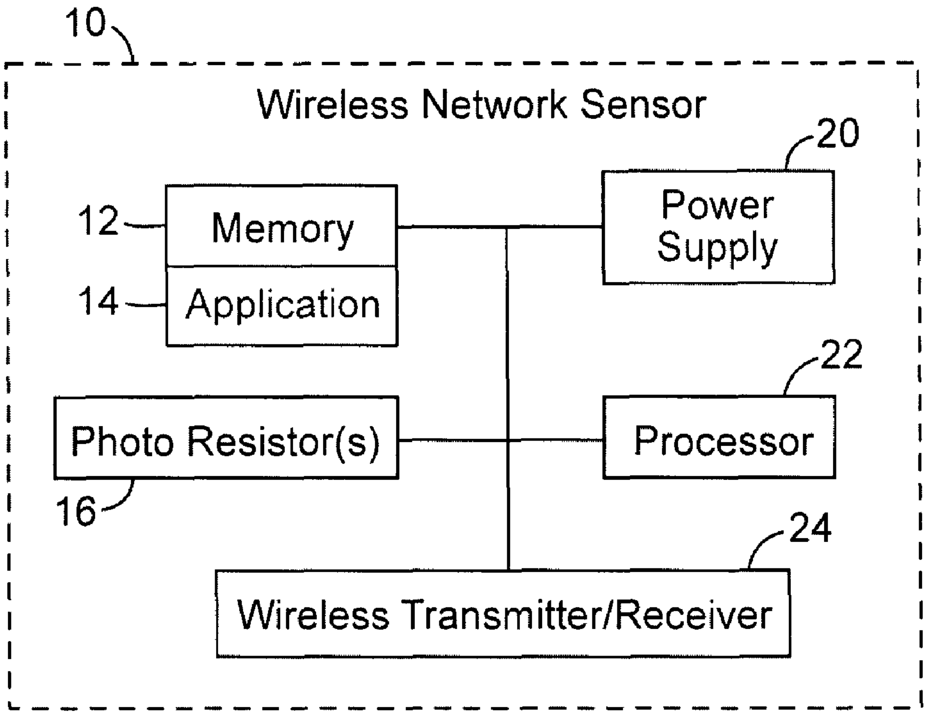
FIG. 1 is a diagram of a wireless network sensor.

FIG. 1 is a diagram of a wireless network sensor 10, which typically includes the following components: a memory 12 storing one or more applications 14; a power supply 20; one or more photo resistors 16; a processor 22 for executing programs in memory 12 or received from another source; and a wireless transmitter/receiver 24 (radio) for wirelessly transmitting and receiving data via an antenna. Component 24 alternatively can be implemented with a wireless transmitter so that network sensor 10 can at least wirelessly transmit data although not wirelessly receive data. The power supply 20 can be implemented with batteries, for example. The wireless transmitter/receiver 24 can be implemented with a radio capable of short range wireless transmission of data.

The use of such "non-wired" components allows tremendous flexibility and versatility in locating the wireless network sensors in a various locations and monitored environments. In addition, by using sensors such as photo resistors that only detect changes in light levels proximate them, the wireless network sensors do not have the capability to identify individuals and avoid privacy issues present in monitoring methods involving such identification of individuals.

One example of a wireless network sensor (without the photo resistors) are the wireless circuits that communicate with each other, also referred to as motes, available from Crossbow Technology, Inc. (part number MPR410CB). An example of the photo resistors for use with the wireless network sensor are photocell sensors available from Advanced Photonix Inc. (part number PDV-P9005-1), which can be attached via Crossbow sensor boards (part number MDA100) to the motes. In an exemplary embodiment, each sensor is in series with a fixed resistor of 620K ohms tied to the battery power (up to 3.3V), such that the voltage across the sensor is dependent on the input light for each sensor. This voltage is read by the mote and converted from an analog to a digital reading.

Wireless network sensors include any wireless circuits that communicate with each other and receive data from a photo resistor or other sensor. Sensors include any components that can detect and provide an indication of an event occurring proximate the sensor; one example is a photo resistor that can detect and provide an indication of changes in light levels, although other types of sensors are possible such as infrared (IR) detectors, acoustic sensors, or image sensors.

Figure 2:
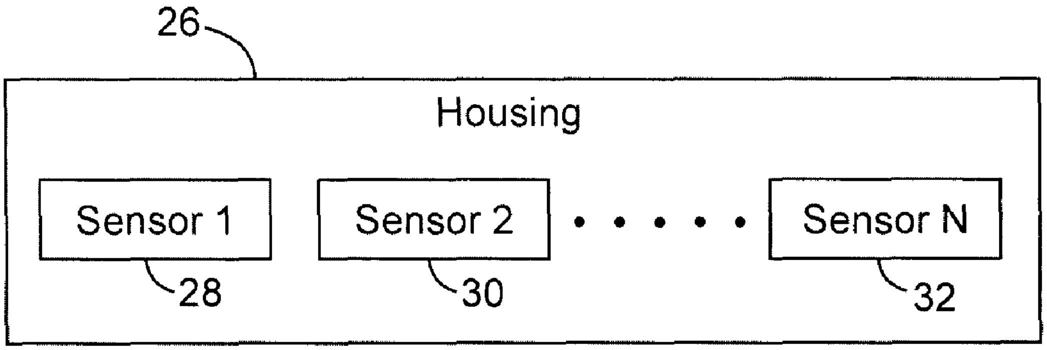
FIG. 2 is a diagram of a detection sensor housing containing multiple sensors.

FIG. 2 is a diagram of a detection sensor housing 26 containing multiple sensors 28, 30, and 32. The housings include apertures for positioning photo resistors, or other sensors, to detect events occurring proximate the wireless network sensors coupled to the photo resistors in the housings. The apertures are described below in particular embodiments of the housings, although the apertures can be changed or configured differently depending upon, for example, a desired coverage pattern. The aperture configuration can include, for example, a length of the aperture, diameter of the exit portion of the aperture, angular placement of the aperture, and placement of the aperture with respect to other apertures in the same housing.

The housings are described below in particular embodiments. The housings can alternatively have different dimensions and geometric configurations. The housings can have many placement options in the space monitored by the wireless network sensors in the housings, as described below, such as on a ceiling, against a wall, in a free standing stanchion, or under a shelf. The housings can be permanently or removable affixed in the monitored space such as via fasteners or adhesive. These placement options can allow, for example, the wireless network sensors to be placed at inconspicuous locations in the space. The wireless network sensors in the monitored space can wirelessly transmit data among them with one of the wireless network sensors having a connection (wireless or wired) with a computer such as a notebook computer in order to collect and process the data collected via the wireless network sensors.

Sensors Hardware

1. Person Sensing Stanchion

This embodiment is a device that can be used to inconspicuously place a set of wireless network sensors in an area traveled by pedestrians. These devices in this embodiment use stanchions, similar to the stanchion and rope devices that are used for crowd control. These devices are typically about four feet tall and have a way of either attaching ropes or pulling out a strap. By placing these in an open area and then connecting them together it is possible to help direct the flow of people. These devices are used in many places and, because the devices are familiar to many people, they typically would take no particular notice of them. Therefore, by placing the wireless network sensors in a familiar or inconspicuous device the presence of the device would not be expected to alter the behavior of the people that come in proximity with them.

This embodiment modifies one of these stanchions to hold wireless network sensors that can be used to monitor if an object passes in front of the sensor or other event occurring proximate the network sensors. In addition, by using wireless communication methods via the wireless network sensor (for example, wireless transmitter/receiver 24), no wires are required to receive the collected data from the wireless network sensor in the stanchion to another wireless network sensor or a receiving computer.

Figure 3:
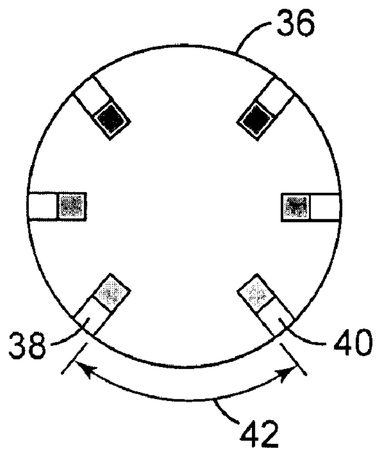
FIG. 3 is a top view of a person sensing stanchion containing a wireless network sensor.
Figure 4:
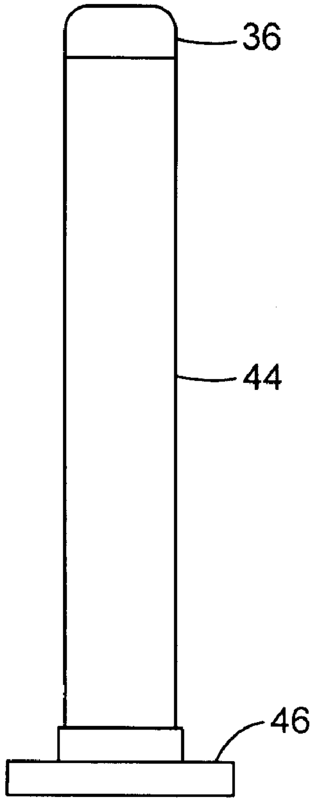
FIG. 4 is a side view of a person sensing stanchion.
Figure 5:
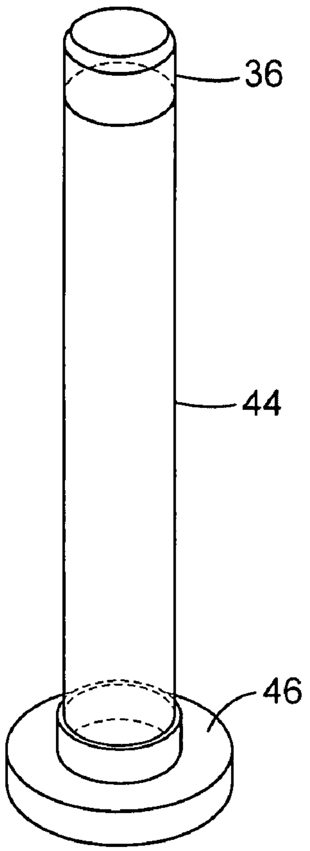
FIG. 5 is a perspective view of a person sensing stanchion.

In this embodiment, a stanchion head assembly was fabricated that contained six photo resistors that are placed in a circle. FIG. 3 is a top view of a person sensing stanchion having a top removable portion 36 for containing a wireless network sensor along with several sensor apertures 38 and 40. This exemplary housing includes six sensors, each separated in the circle by approximately 60° increments (angle 42). FIGS. 4 and 5 are side and perspective views, respectively, of a person sensing stanchion showing top removable portion 36, and elongate cylindrical support 44, and a base 46. In an exemplary embodiment, elongate portion is approximately four feet long, and top portion 36 has a diameter sufficient to accommodate a wireless network sensor.

The housing portion 36 is configured to accommodate wireless network sensor 10 with the photo resistors 16 or other sensors connected to network sensor 10 placed within the apertures such as 38 and 40 in order to detect events occurring proximate housing 36. The top portion contains the apertures for the sensors and the other components of the wireless network sensor. The completed stanchion head (top portion 36) is assembled into a stanchion by placing it into a three inch diameter clear PVC pipe (elongate cylindrical support 44) that uses a floor flange (base 46) to stably support it on the floor.

Clear PVC can be used for the stanchion to allow for monitoring of light emitting diode (LED) status lights that are mounted on the electronics assembly. Alternatively, an opaque material can be used on elongate cylindrical support 44 in order, for example, to hide the wireless network sensor inside of it. Metal typically cannot be used because it would block the wireless transmission of data from the wireless network sensor assembly to a receiver. However, multilayer optical film (MOF), such as MOF film available from 3M Company (St. Paul, Minn.), can be used to create the appearance of a standard metal stanchion.

2. Ceiling Mount Detection Sensor

This embodiment is a ceiling mounted fixture or detection sensor that contains a wireless network sensor to allow the collection of data from an open floor space in a retail environment or other monitored space. The detection sensor housing is configured to contain the components of wireless network sensor 10 including the individual sensors such as photo resistors. Photo resistors are used as the sensors in this detection sensor to monitor changes in light levels of a particular area. In this detection sensor, a 9/64 inch hole that is 3/4 inch long provides an aperture that limits the area the photo resistor is monitoring.

This embodiment can be used, for example, when it is difficult to place sensors in the path of pedestrians. This embodiment allows for the area to be monitored to be completely free of any floor mounted devices and or fixtures. The advantage of this arrangement is that open arenas, conventions, museums, for example, and other areas can be monitored without restricting pedestrian traffic.

Figure 6:
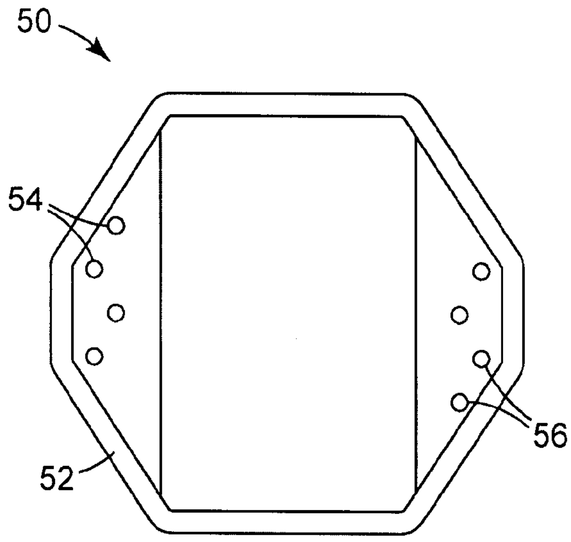
FIG. 6 is a top view of a ceiling mount detection sensor containing a wireless network sensor.
Figure 7:
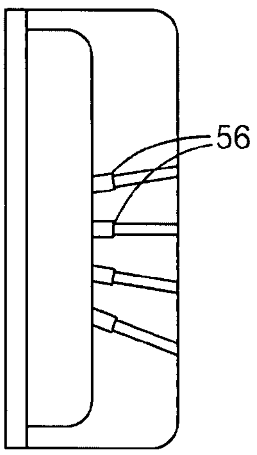
FIG. 7 is a side view of a ceiling mount detection sensor.
Figure 8:
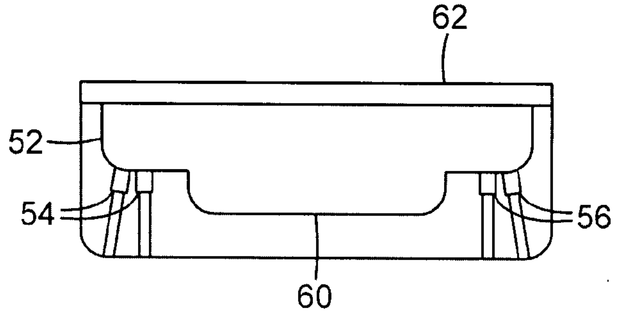
FIG. 8 is a side view of a ceiling mount detection sensor.
Figure 9:
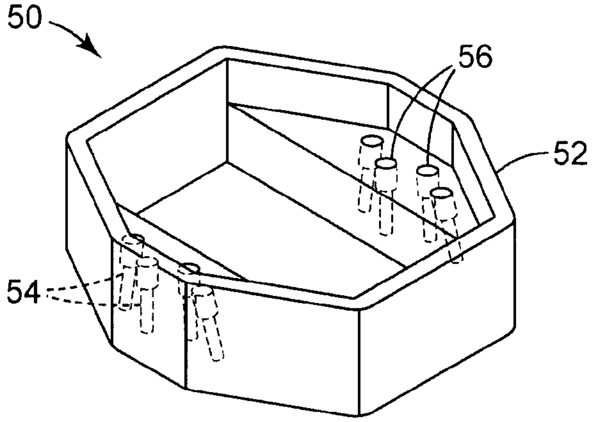
FIG. 9 is a perspective view of a ceiling mount detection sensor.

FIG. 6 is a top view of a ceiling mount detection sensor 50 for containing a wireless network sensor. FIGS. 7 and 8 are side views of a ceiling mount detection sensor 50. FIG. 9 is a perspective view of a ceiling mount detection sensor 50. As shown in FIGS. 6-9, detection sensor 50 includes a housing having a wall 52 with eight sides in an octagonal shape, a center portion 60 for containing a wireless network sensor, a top portion 62 for mounting detection sensor 50 to a ceiling, and eight apertures 54 and 56 for each containing a sensor pointed in a particular direction via an aperture. The housing for detection sensor 50 can be made out of a black Delrin material, or alternatively a white material can be used to better match the ceiling color in many conditions.

The housing for detector sensor 50 is configured to accommodate wireless network sensor 10 with the photo resistors 16 or other sensors connected to network sensor 10 placed within the apertures such as 54 and 56 in order to detect events occurring proximate housing 50. The sensors, six in this exemplary embodiment, are mounted in apertures such as 54 and 56 that hold the sensor at the right depth and control the area the sensor is monitoring. The unused may be covered with tape, for example. Alternatively, all of the apertures may include a sensor or fewer than six may be used. Some of the apertures are drilled at an angle to allow detection sensor 50 to monitor a larger area.

In an exemplary embodiment, detection sensor 50 has the following approximate dimensions: a length and width of 5 inches (shown in FIG. 6); a height of 2 inches (shown in FIG. 7); an internal width of 3 inches for center portion 60; a wall width of 0.25 inches for wall portion 52; a first diameter of 11/64 inch the shorter portion of each apertures 54 and 56 leading to a second diameter of 9/64 inch for the longer portion of each apertures 54 and 56; a spacing of 0.5 inch between the four apertures 54 and 56 on each side of detection sensor 50; and an angular displacement from a center line (perpendicular to the zone of coverage) of +10°, 0°, −10°, and −20° for the apertures from top to bottom, respectively as shown in FIG. 7. Detection sensor 50 is approximately five inches square overall.

Figure 10:
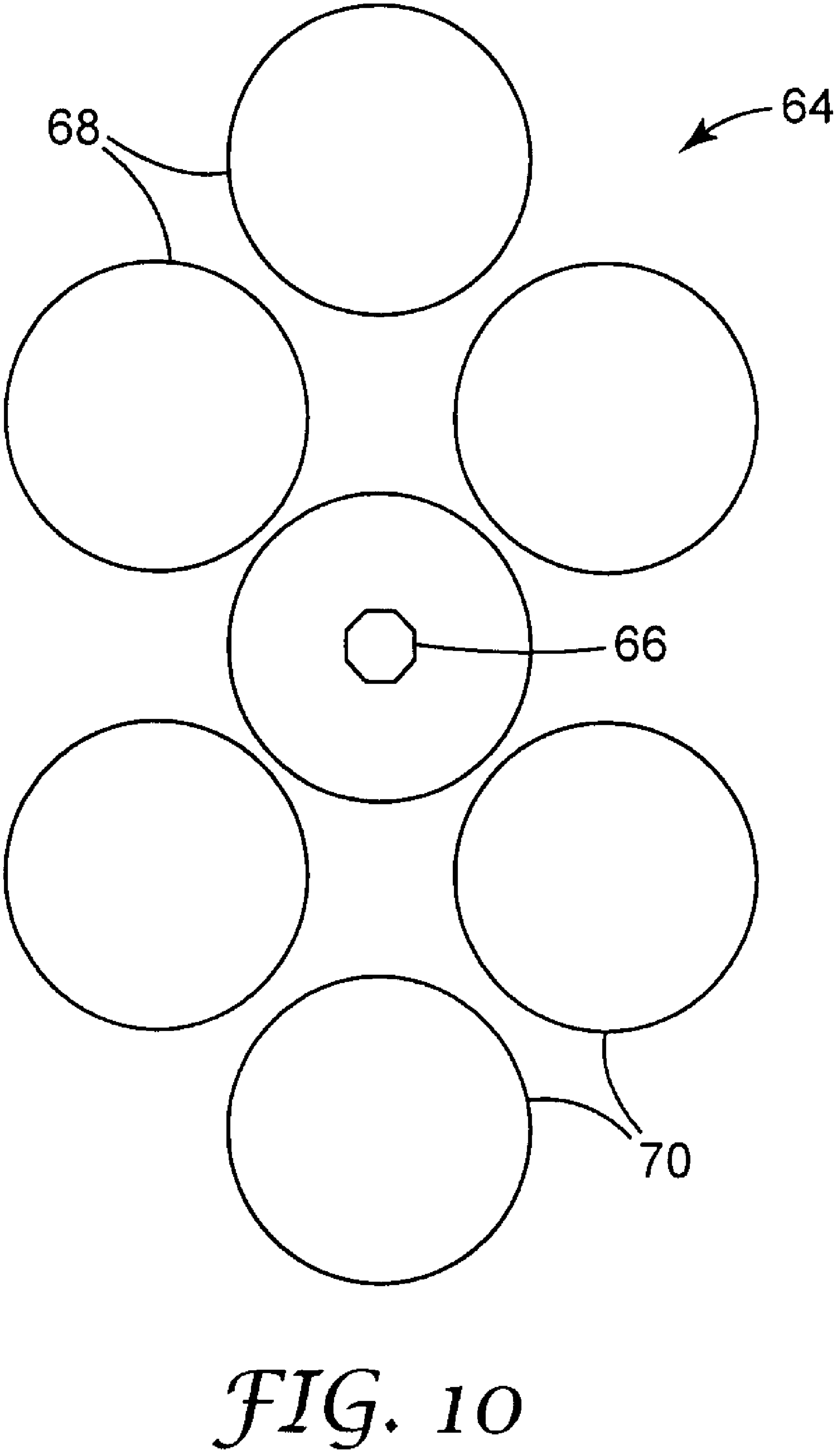
FIG. 10 is a diagram illustrating a pattern of coverage for a ceiling mount detection sensor.

FIG. 10 is a diagram illustrating a pattern of coverage 64 for a ceiling mount detection sensor 50. Icon 66 corresponds with a location of detection sensor 50 directly above the pattern of coverage 64 as mounted on a ceiling. Coverage areas 68 and 70 may correspond with sensors 54 and 56 or others depending upon the angular configuration of the apertures. The pattern of coverage has six areas of coverage by the six sensors. In an exemplary embodiment, pattern of coverage 64 has the following approximate dimensions: the four coverage areas adjacent the center are spaced apart 18 inches from the center as represented by icon 66; the outermost two coverage areas are spaced 38 inches from the center; and the outermost two coverage areas are spaced 18 inches apart from the four coverage areas adjacent the center. The location of the circles would be representative of the pattern if the detection sensor 50 is mounted nine feet above the floor. Detection sensor 50 can monitor an area over eight feet wide in one direction by over five feet foot in the other. The coverage area can also be based upon a mounting height of the detection sensor. Different drill angles and angular displacements of the apertures can provide for different patterns of monitored areas.

3. Soffit or Ceiling Mount Sensor

This embodiment is a soffit mounted detection sensor that contains wireless network sensor 10 to allow the collection of data from an open floor space in a retail environment or other monitored space. It can be desirable to monitor an open space by locating a detection sensor on a ceiling and monitoring traffic from that vantage point. Another situation for such monitoring involves use of an edge from a higher ceiling area to a lower (dropped) ceiling area, where a small vertical "wall" or soffit is available over a pathway or doorway. In this case, the detection sensor can be affixed to the soffit to monitor all traffic in and out of the pathway.

Photo resistors are used in this soffit mounted detection sensor to monitor changes in light levels of a particular area. In this detection sensor, a 9/64 inch hole that is 3/4 inch long provides an aperture that limits the area the photo resistor is monitoring. These apertures may be angled to spread out the area covered by the sensors to a line along the soffit. People crossing under the soffit area would be likely to be seen by at least one sensor. Other diameters and lengths of the apertures are possible, depending upon, for example, a desired coverage area.

This embodiment can be used, for example, when it is difficult to place sensors in the path of pedestrians, and it allows the area to be monitored to be completely free of any floor mounted devices and or fixtures, when desired. The detection sensor can be mounted directly to an open ceiling or to a small soffit, such as at the entry of a bank branch located within a larger grocery store. The opening to the bank area could also be covered by a string of sensors along the soffit, for example, but using a single detection sensor eases the speed and simplicity of installation.

Figure 11:
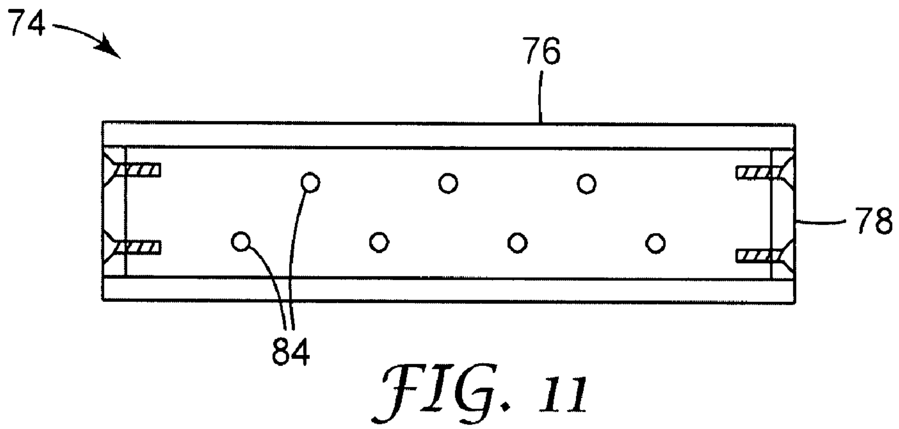
FIG. 11 is a top view of a soffit mount detection sensor containing a wireless network sensor.
Figure 12:
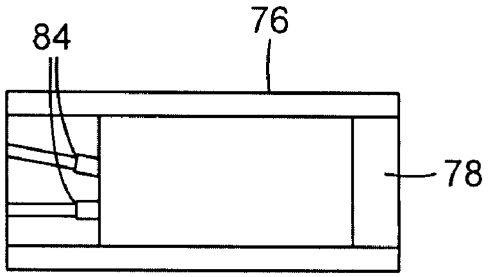
FIG. 12 is a side view of a soffit mount detection sensor.
Figure 13:
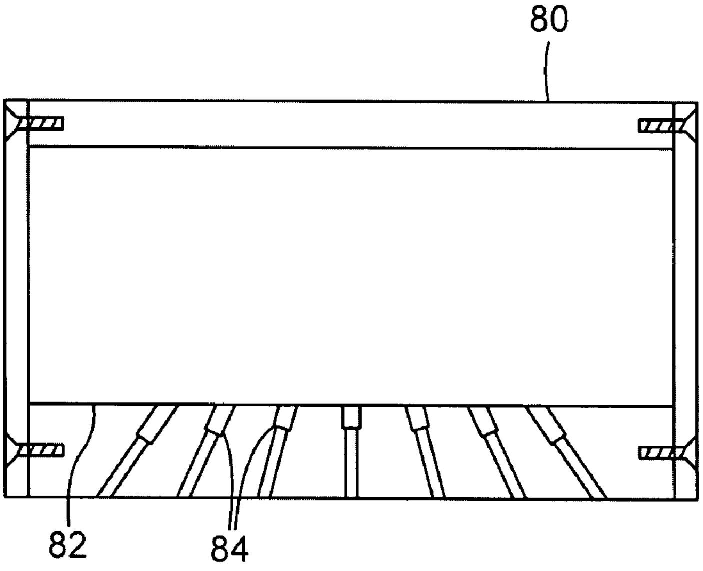
FIG. 13 is a side view of a soffit mount detection sensor.
Figure 14:
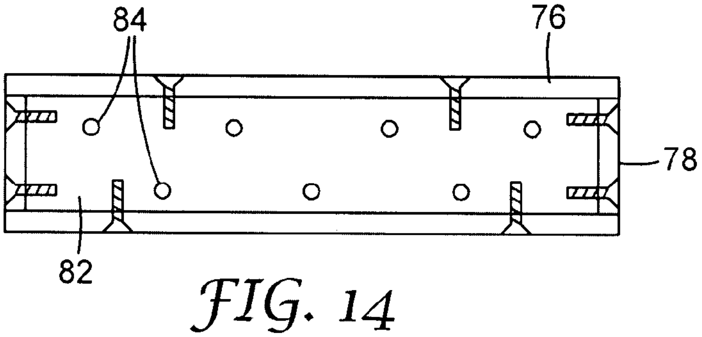
FIG. 14 is a bottom view of a soffit mount detection sensor.
Figure 15:
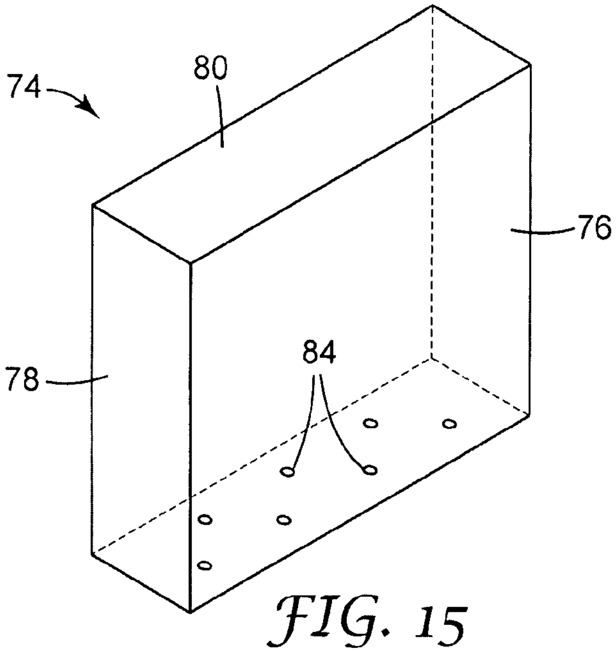
FIG. 15 is a perspective view of a soffit mount detection sensor.

FIG. 11 is a top view of a soffit mount detection sensor 74 containing a wireless network sensor. FIGS. 12 and 13 are side views of a soffit mount detection sensor 74. FIG. 14 is a bottom view of a soffit mount detection sensor 74. FIG. 15 is a perspective view of a soffit mount detection sensor 74. As shown in FIGS. 11-15, detection sensor 74 includes a housing having side walls 76 and 78, a top portion 80, a bottom portion 82, and seven apertures 84 for each containing a sensor pointed in a particular direction. The housing for detector sensor 74 is configured to accommodate wireless network sensor 10 with the photo resistors 16 or other sensors connected to network sensor 10 placed within the apertures such as 84 in order to detect events occurring proximate housing 74. The housing for soffit mount detection sensor can be made of black Delrin material, or a white material can be used to better match the ceiling color in many conditions.

The sensors, six in this embodiment, are mounted in the apertures that hold the sensor at the right depth and control the area the sensor is monitoring. The unused may be covered with tape, for example. Alternatively, all of the apertures may include a sensor or fewer than six may be used. Some of the holes have been drilled at an angle (angular displacement) to allow this device. The detection sensor can be attached to a ceiling at the edge opposite the holes or attached to a soffit at the wider sides of the box. In both cases the sensors face the floor.

In an exemplary embodiment, detection sensor 74 has the following approximate dimensions: a length of 7.5 inches (shown in FIGS. 11 and 13); a width of 1.625 inches (shown in FIG. 11); a height of 4.25 inches (shown in FIG. 12); a spacing of 0.75 inches between the apertures 84; and an angular displacement from a center line (perpendicular to the zone of coverage) of −35°, −25°, −15°, 0°, +15°, +25°, and +35° for the apertures from left to right, respectively as shown in FIG. 13.

Figure 16:
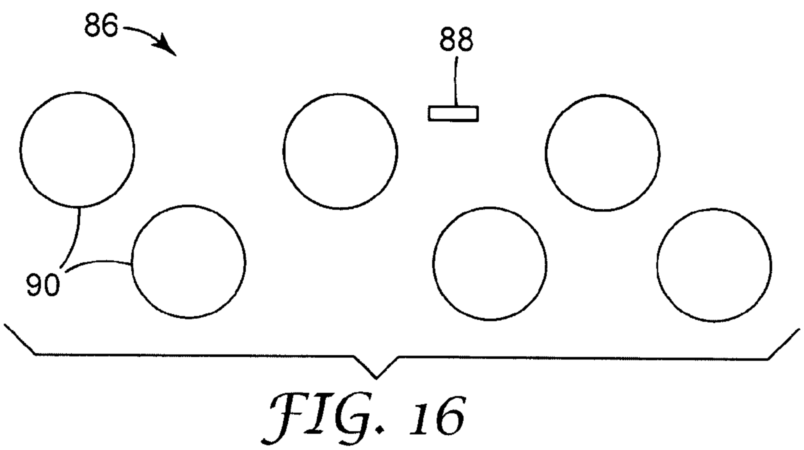
FIG. 16 is a diagram illustrating a pattern of coverage for a soffit mount detection sensor.

FIG. 16 is a diagram illustrating a pattern of coverage 86 for a soffit mount detection sensor 74. Icon 88 corresponds with a location of detection sensor 74 directly above the pattern of coverage 86 as mounted on a ceiling. Coverage areas 90 correspond with sensors 84. The circles of the coverage pattern are 18 inches in diameter. The location of the circle would be representative of the pattern if the detection sensor is mounted nine feet above the floor. This detection sensor can monitor an area ten feet wide in one direction by about three feet in the other. Different drill angles of the apertures (angular displacements) can provide for different coverage patterns of monitored areas.

4. Wall Mount Detection Sensor

This embodiment is a device that can be used to inconspicuously place wireless network sensor 10 in an area traveled by pedestrians. This detection sensor can be mounted on the walls of everyday environments to be monitored and can be made to be part of the retail environment or a temporary placement that allows monitoring of an area for a short amount of time. This detection sensor can be placed at various heights and be used to monitor the traffic filtered by height. By placing the detection sensors in a familiar or inconspicuous device, the presence of the device is not expected to alter the behavior of the people that come in proximity to the device. Walls, pillars, and other vertical surfaces exist throughout the retail landscape, for example. The ability to place a set of sensors on any of these surfaces allows for monitoring traffic in a wide variety of locations.

Figure 17:
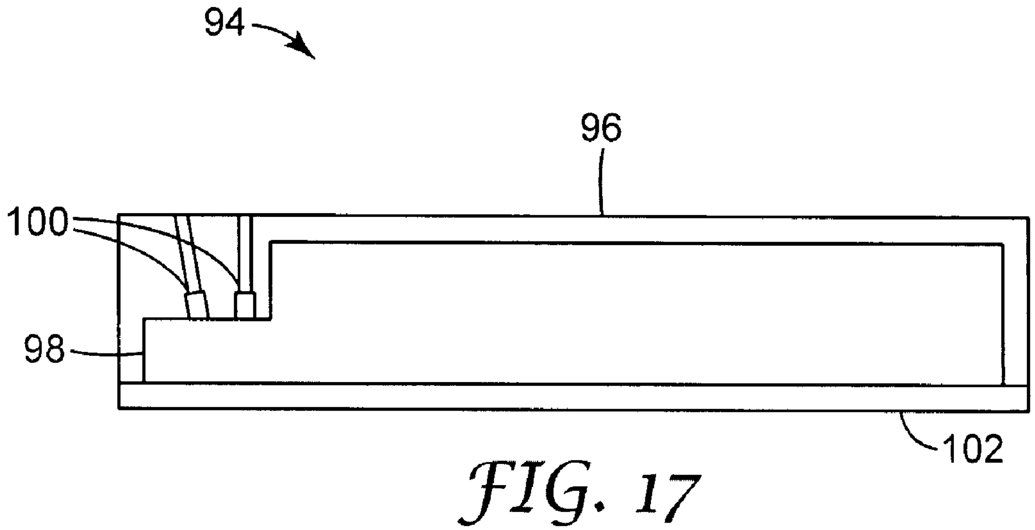
FIG. 17 is a side view of a wall mount detection sensor containing a wireless network sensor.
Figure 18:
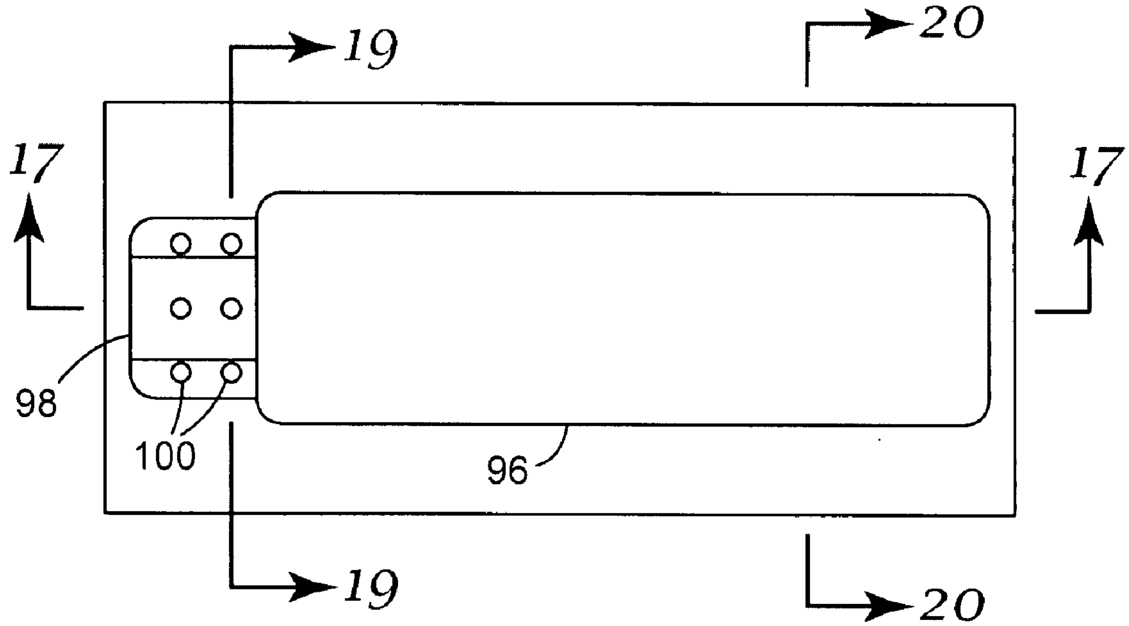
FIG. 18 is a sectional side view of a wall mount detection sensor.
Figure 19:
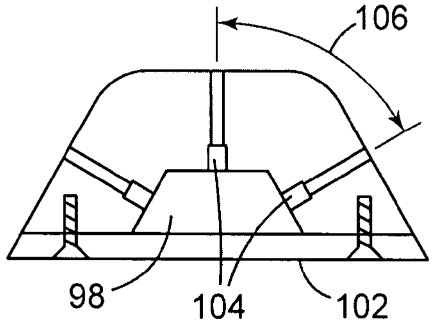
FIG. 19 is a top view of a wall mount detection sensor.
Figure 20:
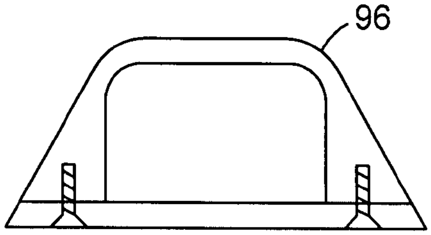
FIG. 20 is a bottom view of a wall mount detection sensor.
Figure 21:
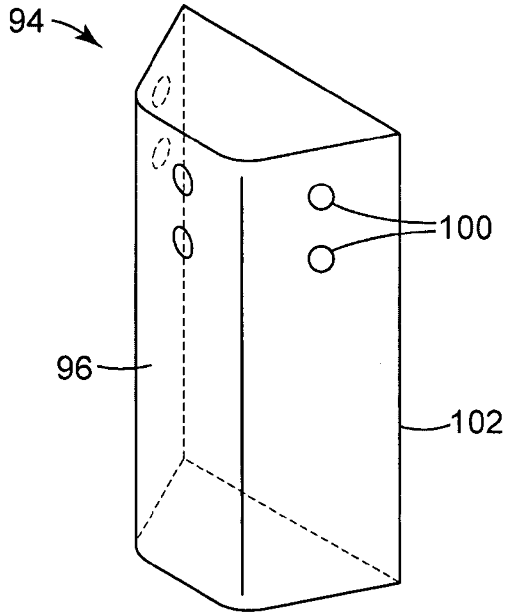
FIG. 21 is a perspective view of a wall mount detection sensor.

FIG. 17 is a side view of a wall mount detection sensor 94 containing a wireless network sensor. FIG. 18 is a sectional side view of a wall mount detection sensor 94. FIG. 19 is a top view of a wall mount detection sensor 94. FIG. 20 is a bottom view of a wall mount detection sensor 94. FIG. 21 is a perspective view of a wall mount detection sensor 94. As shown in FIGS. 17-21, detection sensor 94 includes an overall housing 96, a back portion 102 for mounting to a wall, and a small sensor portion 98 including six apertures 100 for containing sensors. As shown in FIG. 19, apertures 104 are spaced apart by a particular angle 106 depending upon a desired zone of coverage. The housing for detector sensor 94 is configured to accommodate wireless network sensor 10 with the photo resistors 16 or other sensors connected to network sensor 10 placed within the apertures such as 100 in order to detect events occurring proximate housing 94. In this exemplary detection sensor, the six photo resistors are placed in a semicircle at 600 increments (angle 106). The housing for wall mount detection sensor 94 can be made of black Delrin material, or a white material can be used to better match the wall color in many conditions.

In an exemplary embodiment, detection sensor 94 has the following approximate dimensions: a length of 9 inches (shown in FIG. 17); a width of 1.625 inches outward from a wall (shown in FIG. 17); a width of 4 inches of the surface mounted against a wall (shown in FIG. 18); an internal height of 0.625 inches and width of 1.02831 inches for portion 98; and an angular displacement from a center line (perpendicular to the zone of coverage) of −10° and 0° for the apertures from left to right, respectively as shown in FIG. 17.

5. Shelf Mount Detection Sensor

This embodiment is a fixture or detection sensor mounted under a shelf or table, for example, that is connected to a wireless network sensor to allow the collection of data from space nearby a shelf in a retail environment or other monitored space. It can desirable to monitor a limited space that does not have the required wall structures available for mounting a detection sensor. Often there is unused space underneath the shelves that hold products for sale. It is also helpful to show when a person has approached a certain part of a shelf rather than passing by several feet away. Thus, it can be useful to mount detection sensors to limit the view of the sensors to just a few feet nearby the shelf so that only close to the shelf or counter or table are detected.

Photo resistors are used in this detection sensor to monitor changes in light levels of a particular area. In this detection sensor, a 9/64 inch hole that is 3/4 inch long provides an aperture that limits the area the photo resistor is monitoring. This aperture is angled down to limit its view to just a few feet beyond the shelf. Several of these apertures and sensors can be spaced along a shelf and wired to a central box also hidden under the shelf and which contains the other components of the wireless network sensor connected to the photo resistors.

Figure 22:
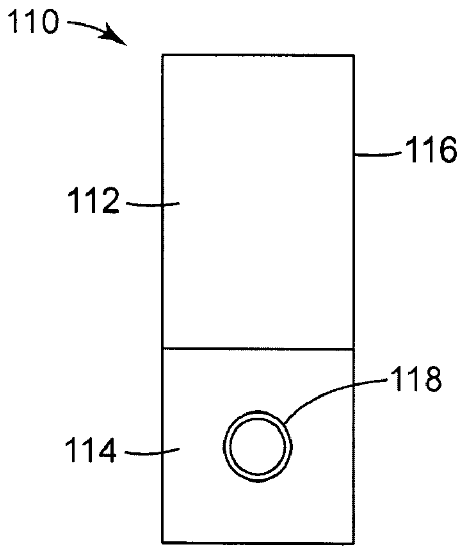
FIG. 22 is a back view of a shelf mount detection sensor element for containing a sensor.
Figure 23:
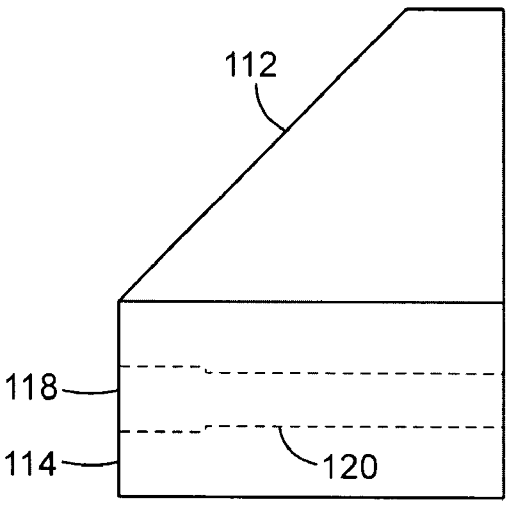
FIG. 23 is a side view of a shelf mount detection sensor element.
Figure 24:
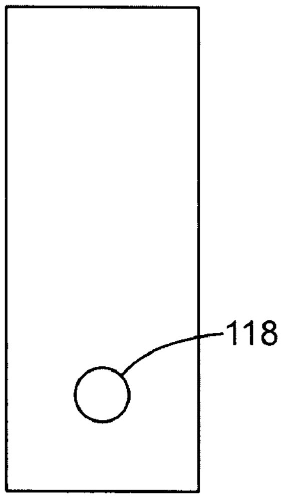
FIG. 24 is a front view of a shelf mount detection sensor element.
Figure 25:
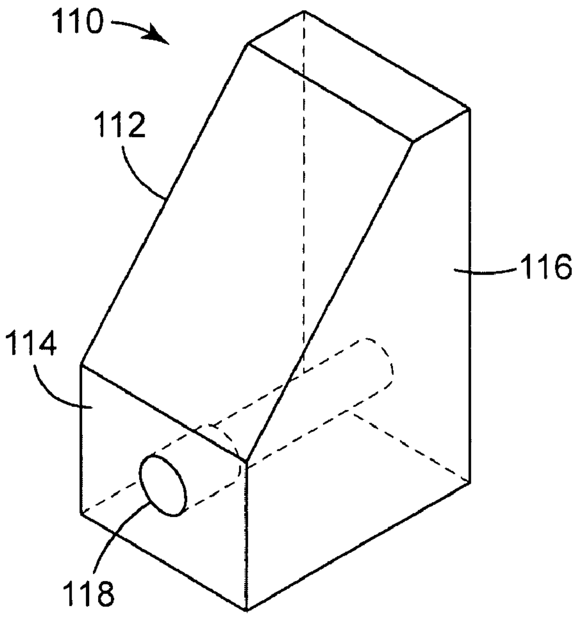
FIG. 25 is a perspective view of a shelf mount detection sensor element.

FIG. 22 is a back view of a shelf mount detection sensor element 110. FIG. 23 is a side view of a shelf mount detection sensor element 110. FIG. 24 is a front view of a shelf mount detection sensor element 110. FIG. 25 is a perspective view of a shelf mount detection sensor element 110. As shown in FIGS. 22-25, detection sensor element 110 includes a housing having a back portion 114, angled portion 112 for mounting to the underside of a shelf, and side portions such as side 116. An aperture 118 contains a photo resistor or other sensor, and an aperture 120, having an opening on a front portion opposite back portion 114, provides for a zone of coverage of the sensor. Angled portion 112 provides for the sensor to be directed at a 45° angle to the floor, although other angles are possible. In this case, the angle of the narrow aperture was set to 45° from horizontal when the angled portion of the block is attached to the underside of a shelf, table or counter. This angle can be adjusted for various situations; in this embodiment, a 45° angle was chosen for a shelf of about three feet high so that it reaches only a few feet out beyond the shelf. The housing for the detection sensor element can be made out of black Delrin or other materials. The housing is light and small enough to attach under a shelf.

In an exemplary embodiment, detection sensor element 110 has the following approximate dimensions: a width of 0.5 inches (shown in FIG. 22); a height of 0.5 inches for back portion 114 (shown in FIG. 22); a length of 1 inch (shown in FIG. 23); a height of 1.25 inches for the back portion opposite front portion 114 (shown in FIG. 24); a 45° angle for angled portion 112; a diameter of 0.141 inches and length of 0.75 inches for aperture 120; and a diameter of 0.172 inches for aperture 118.

Figure 26:
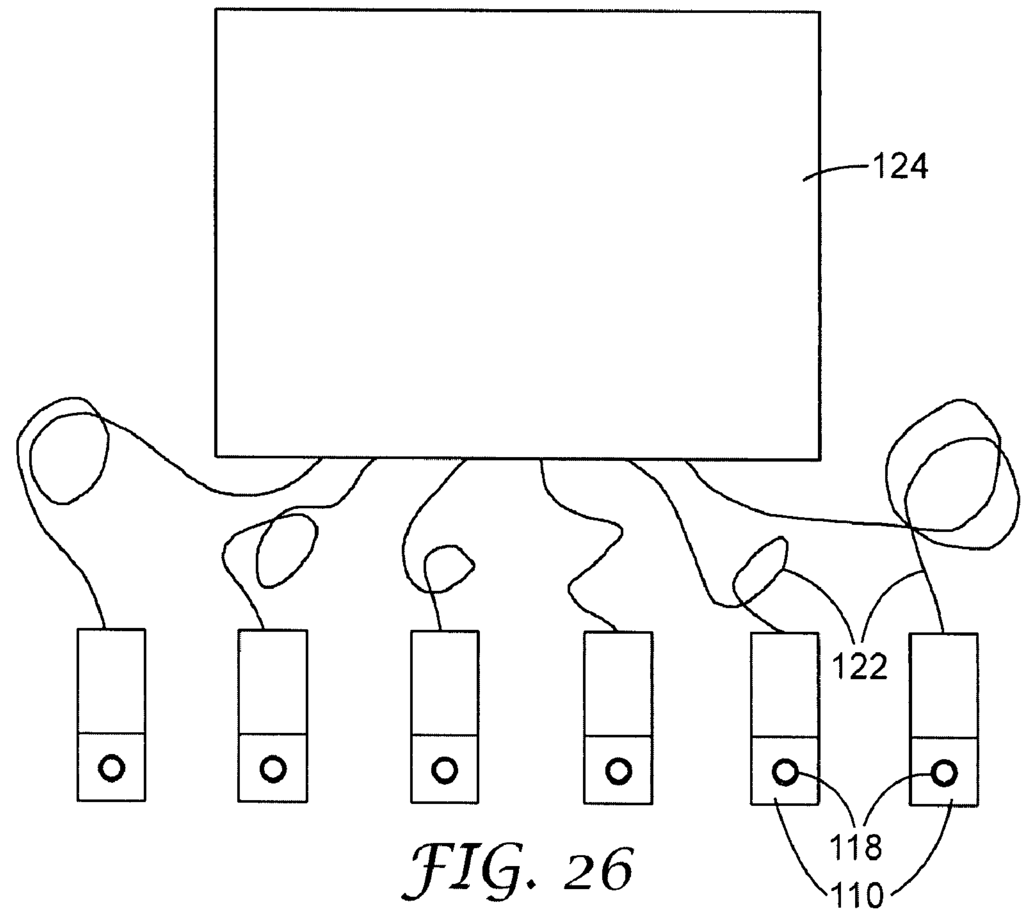
FIG. 26 is a diagram of multiple shelf mount detection sensor elements connected to a controller.

FIG. 26 is a diagram of multiple shelf mount detection sensor elements 110 connected to a controller 124 via wires 122. Controller 124 is configured to contain wireless network sensor 10 with the photo resistors 16 or other sensors contained with an aperture of the housings for the detection sensor elements 110. Each photo resistor is glued inside of its respective aperture and then wired with several feet of wire to a central box which contains the other components of the wireless network sensor or mote, the radio antenna, batteries, and circuitry for these sensors. The housing 124 for the controller can be made out of black Delrin or other materials. The housing 124 is preferably light and small enough to attach under a shelf.

Figure 27:
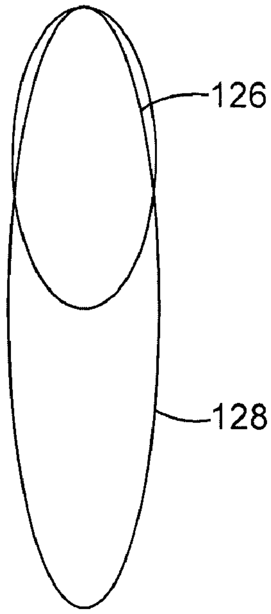
FIG. 27 is a diagram illustrating a pattern of coverage for a shelf mount detection sensor.

FIG. 27 is a diagram illustrating a pattern of coverage for a shelf mount detection sensor for one sensor/aperture at 450 and mounted three feet above the floor. The smaller area 126 shows where people are most likely detected in front of each sensor; in an exemplary embodiment, area 126 has approximately a length of two feet and width of one foot. The larger area 128 shows where people are likely detected when they are in larger contrast to the floor color; in an exemplary embodiment, area 128 has approximately a length of four feet and width of one foot.

6. Sensor Aperture for Limited Field of View

It can be useful or desirable to narrow the area of sensitivity of photo resistors or other sensors so that the detected object or person can be localized within a few feet of the sensor. Limiting the field of view of the sensor involves use of a circular or oval aperture with the sensor mounted at a certain depth back from that aperture that limits the view of the sensor to an area just a few feet wide. The sensor has less extra light coming in from the top and sides and is more sensitive to changes directly in front of it. It cannot detect changes to the side. When a person passes through the view, the change is more pronounced and clear because the person covers most or all of the view rather than a small portion of it, meaning the sensor works better to detect people or objects directly in front of it. The viewing area is determined by the light at the largest angle that can enter the aperture and reach the sensor. The longer the aperture is, the narrower the field of view, and the shorter it is, the wider the view. The apertures can be designed to meet particular needs.

Figure 28:
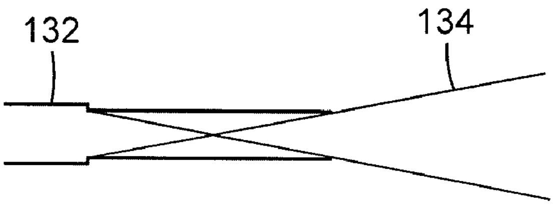
FIG. 28 is a diagram illustrating a sensor aperture for a limited field of view.
Figure 29:
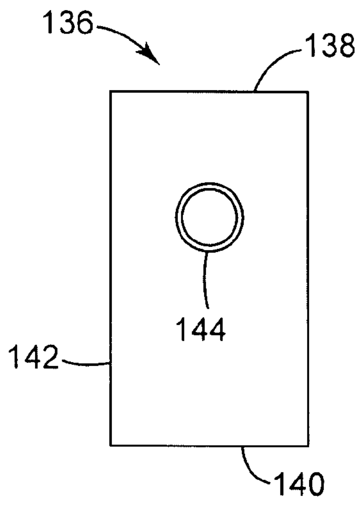
FIG. 29 is a back view of a housing with a circular sensor aperture.
Figure 30:
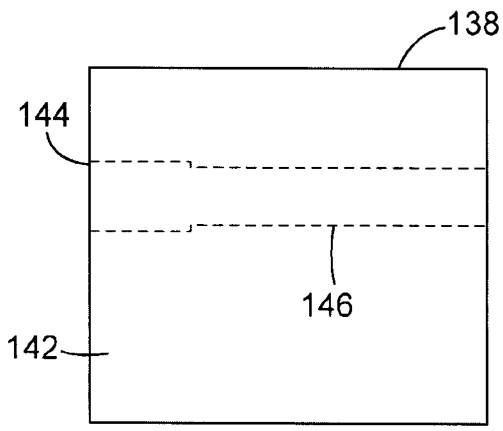
FIG. 30 is a side view of a housing with a circular sensor aperture.
Figure 31:
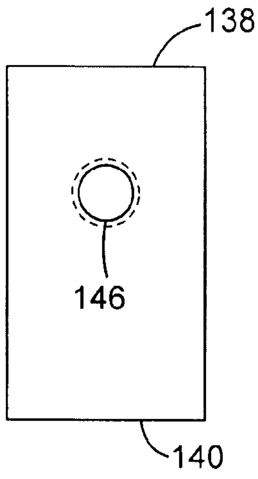
FIG. 31 is a front view of a housing with a circular sensor aperture.
Figure 32:
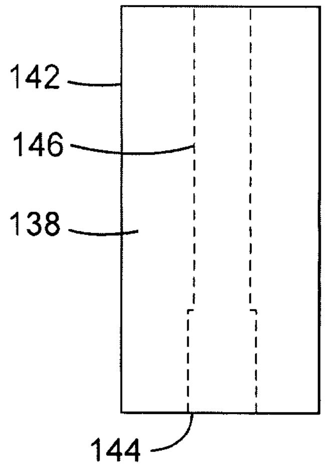
FIG. 32 is a top view of a housing with a circular sensor aperture.
Figure 33:
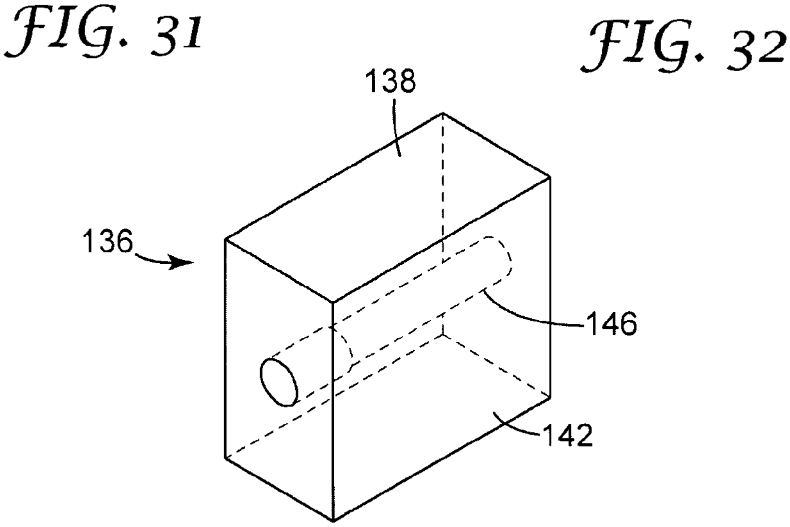
FIG. 33 is a perspective view of a housing with a circular sensor aperture.
Figure 34:
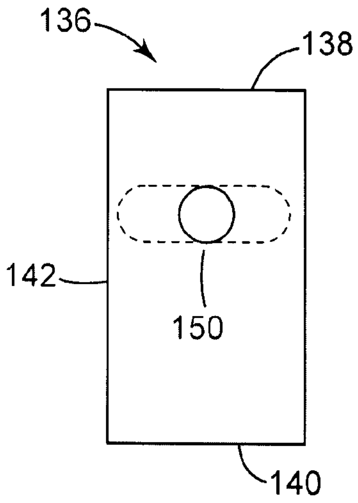
FIG. 34 is a back view of a housing with an oval sensor aperture.
Figure 35:
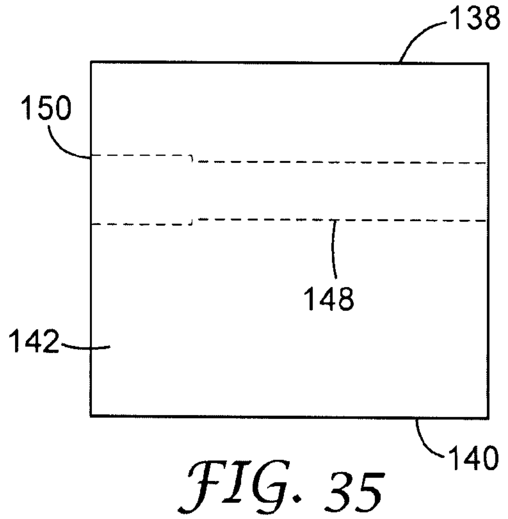
FIG. 35 is a side view of a housing with an oval sensor aperture.
Figure 36:
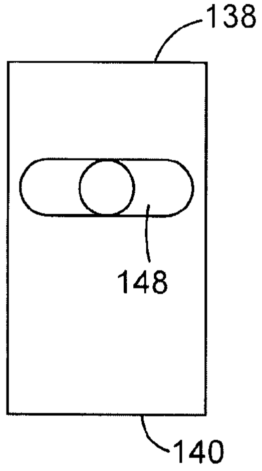
FIG. 36 is a front view of a housing with an oval sensor aperture.
Figure 37:
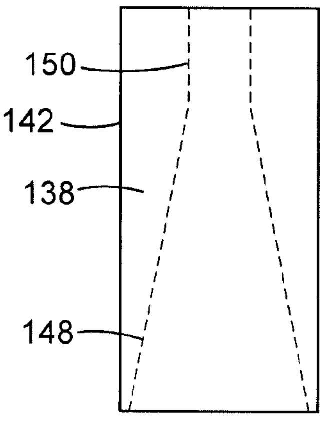
FIG. 37 is a top view of a housing with an oval sensor aperture.
Figure 38:
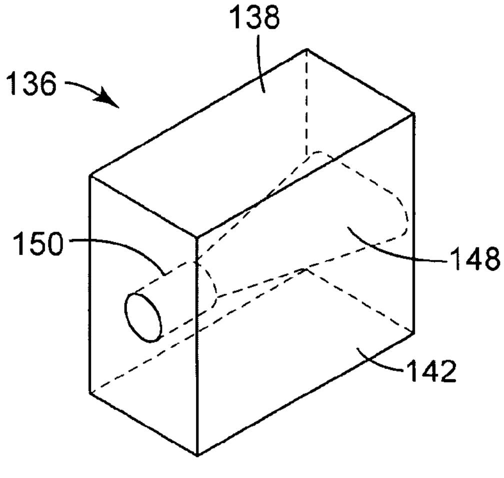
FIG. 38 is a perspective view of a housing with an oval sensor aperture.

FIG. 28 is a diagram illustrating a sensor aperture 132 for a limited field of view 134. FIG. 29 is a back view of a housing 138 with a circular sensor aperture. FIG. 30 is a side view of a housing 138 with a circular sensor aperture. FIG. 31 is a front view of a housing 138 with a circular sensor aperture. FIG. 32 is a top view of a housing 138 with a circular sensor aperture. FIG. 33 is a perspective view of a housing 138 with a circular sensor aperture. FIG. 34 is a back view of a housing 138 with an oval sensor aperture. FIG. 35 is a side view of a housing 138 with an oval sensor aperture. FIG. 36 is a front view of a housing 138 with an oval sensor aperture. FIG. 37 is a top view of a housing with 138 an oval sensor aperture. FIG. 38 is a perspective view of a housing 138 with an oval sensor aperture.

As shown in FIGS. 29-38, housing 136 includes a top portion 138, a bottom portion 140, and a side portion 142. As shown in FIGS. 29-33, the housing for the circular aperture includes an aperture 144 for containing a photo resistor or other sensor on a back portion of housing 136 and an aperture 146 for providing a limited field of view via a circular opening on a front portion of housing 136 opposite the back portion. As shown in FIGS. 34-38, the housing for the oval aperture includes an aperture 150 for containing a photo resistor or other sensor on a back portion of housing 136 and an aperture 148 for providing a limited field of view via an oval opening on a front portion of housing 136 opposite the back portion. Wireless network sensor 10 would be located proximate housing 136 with photo resistors 16 or other sensors located in apertures 144 and 150 and with wireless network sensor 10 connected to the sensors.

In an exemplary embodiment, housing 136 has the following approximate dimensions: a width of 0.5 inches (shown in FIGS. 29 and 34): a height of 0.875 inches (shown in FIGS. 29 and 34); and a length of 1 inch (shown in FIGS. 30 and 35); a diameter of 0.141 inches and length of 0.75 inches for aperture 146; a diameter of 0.172 inches for aperture 144; a diameter of 0.172 inches for aperture 150; a diameter of 0.141 inches for the portion of aperture 148 joined with aperture 150; a length of 0.75 inches for aperture 148; and a width of 0.451 inches for the exiting portion of aperture 148 on the front portion of housing 136.

Figure 39:
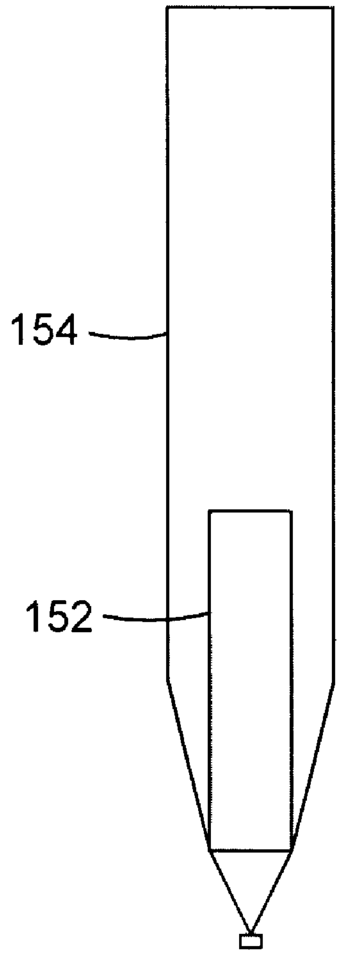
FIG. 39 is a diagram illustrating a pattern of coverage for a circular sensor aperture.

FIG. 39 is a diagram illustrating a pattern of coverage for a circular sensor aperture with a potentially best case of coverage 154 and worst case of coverage 152. In an exemplary embodiment, coverage 154 has approximately an overall length of 11 feet and width of 2 feet for the rectangular portion, and coverage 152 has approximately an overall length of 5 feet and a of width of 1 foot for the rectangular portion.

Figure 40:
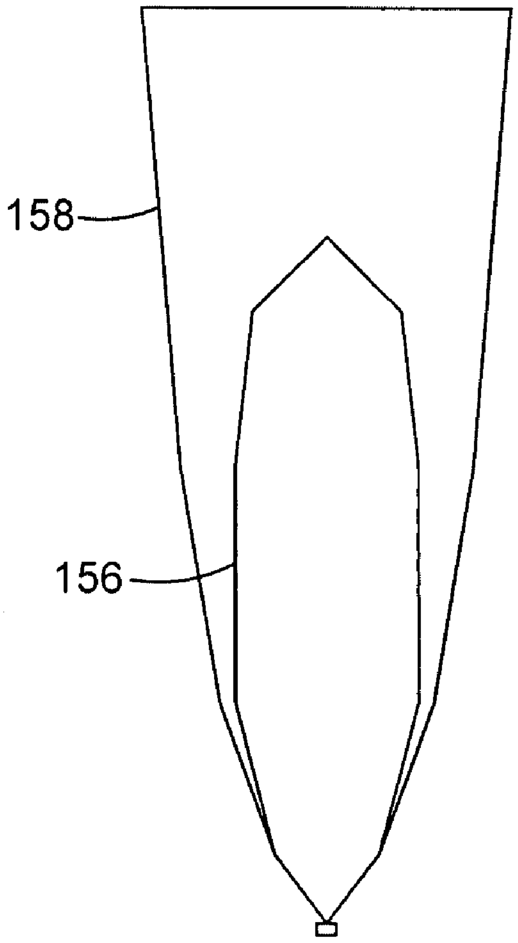
FIG. 40 is a diagram illustrating a pattern of coverage for an oval sensor aperture.

FIG. 40 is a diagram illustrating a pattern of coverage for an oval sensor aperture with a potentially best case of coverage 158 and worst case of coverage 156. In an exemplary embodiment, coverage 158 has approximately an overall length of 12 feet, a width of 4 feet at a distance 6 feet from the sensor, and a final maximum width of 5 feet, and coverage 156 has approximately an overall length of 9 feet and a width of 2.5 feet at a distance 3 feet from the sensor. The housing can be configured and mounted to provide for maximal light entering the aperture to reach the photo resistor or other sensor. This sensor can be placed with its aperture made to face a wall or at an angle down to the floor, or mounted on a ceiling to face the floor. An array of sensors with limited apertures can be arranged to provide coverage of an area as needed.

An example of a photo resistor for use in this embodiment is the Cadmium Sulfoselenide photodetector (Advanced Photonix Inc, PDV-P9005-1), which is 4.20 mm in diameter and which is sensitive to 400 to 700 nm light wavelengths. These sensors have variable resistance dependent on the light input coming to them, ranging from 20M ohms for "dark" to 48-140K ohms for 10 Lux at 2856K. This sensor has one of the highest ranges of resistance and therefore draws less current from the batteries. It is also small and relatively inexpensive.

In this exemplary embodiment, the sensor is put in series with a fixed resistor (R1) of 620K ohms tied to battery power (3.3V nominally), such that the voltage across the sensor is inversely dependent on its input light. As the light increases, the photodetector resistance decreases and pulls the output voltage lower. When the light level drops, as when a shadow crosses its view, the sensor resistance increases and allows the output voltage to rise. The actual voltages at normal light levels can be adjusted by the value of R1 to be about half of the battery voltage. The "normal light level" and value of R1 depend on how much light reaches the sensor when it is in its aperture block.

In this exemplary embodiment, the fixed resistor is tied to power in a common voltage divider so that the output voltage Voutput=(R2/(R1+R2))Vbat+. When the sensor is in bright light, its resistance R2 is low relative to R1 and also changes less than when it is in the dark, so it is desired that the change in the sensor resistance to be in the numerator and affect the output as much as possible.

When this sensor configuration is left without any aperture, it detects light from a wide area and any person walking in front is a relatively small change in overall light level. In that situation, a person can be detected only up to two feet away and directly in front of the sensor if the sensor requires a 10% change in signal level.

To limit the sensor field of view, this photocell was mounted into a circular or fanned-oval aperture made in a block of black Delrin material, as described above, and hot-melt glue was used to hold it in place. The lead wires that connect with a separate circuit board were soldered with the rest of the circuit (fixed resistor) in place. The sensor and aperture were held 40 inches above the floor in a bright laboratory. The voltage was monitored as an 18 inches wide by 28 inches tall colored tag board (the target) with the top at 54 inches height above the floor was moved in front of the aperture. The tag board was in varied colors to simulate various clothing on people (black, red, tan and white). The baseline voltage without any target in place was recorded and then subtracted from the voltage outputs with targets in various locations.

The important design elements are the width and length of the smaller aperture. A 0.75 inch depth (length) of the aperture was used, which had less signal (darker) and took more space, but had better sensitivity for longer distances.

Using this setup, it was determined where a simulated person (tag board) would be detected, requiring signals greater than 0.2V or about 10% above baseline, by the sensor with either a circular or fanned-oval aperture. The side-to-side viewing area was limited to two feet wide for the circular aperture and by symmetry, the height of the viewing area was assumed to be the same. The black-colored tag board was detectable 11 feet away, but the red-colored tag board was only seen up to about five feet away.

The fanned or oval aperture was designed to allow a wider viewing range without affecting the height of the viewing area. In testing, it was found that the oval aperture allows for a reach up to five feet in width. This does not help to determine the actual location of a person quite as well, but covers more area with a single sensor. The overall signal levels for the target were lower because more extraneous light is let in the sides and the simulated person does not cover quite as much of the viewing area to make as big of a change in signal.

Local Data Processing on Sensors

Figure 41:
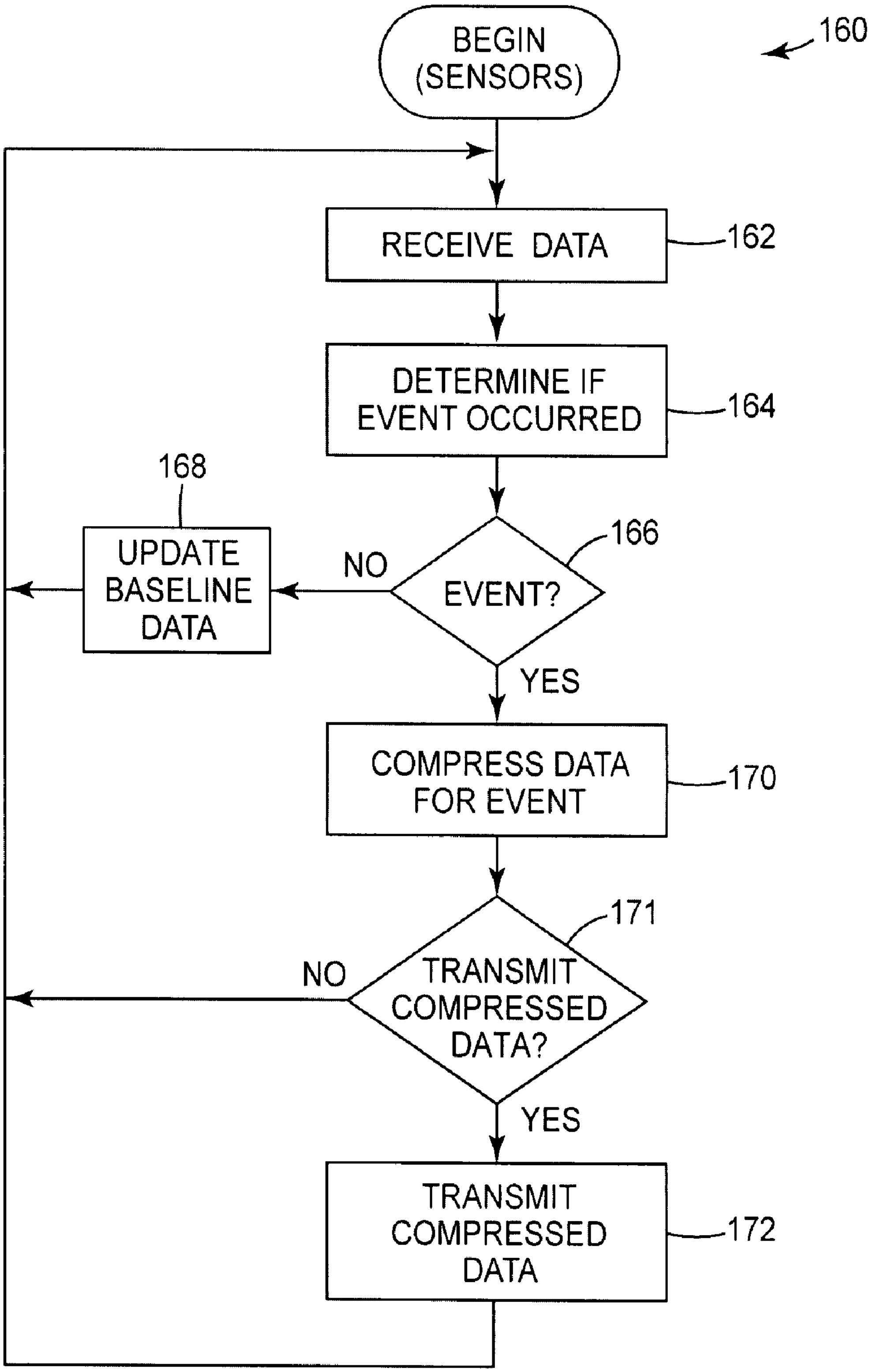
FIG. 41 is a flow chart of a method for processing data on wireless network sensors.

FIG. 41 is a flow chart of a method 160 for processing data on wireless network sensors. Method 160 includes receiving data (step 162) and determining from the data if an event occurred (step 164). If an event did not occur (step 166), method 160 updates the baseline data (step 168) and continues to receive and process data to detect events. If an event did occur (step 166), method 160 compresses the data for the event (step 170) and determines whether to transmit the compressed data (step 171). Method 160 selectively transmits the compressed data (step 172) as determined by step 171. For example, the system may wait until a buffer or other memory location is full with compressed data, or it may transmit the compressed data at regular time intervals.

1. Event Determination on Wireless Network Sensors

This embodiment involves an implementation of steps 164 and 166 in software or firmware for execution by processor 22 in wireless network sensor 10. The event detection (step 164) can involve determining if an event occurred by applying particular criteria to changes detected in a signal level of a signal received from a sensor in a wireless network sensor. In particular, this embodiment is an algorithm and software to determine when light values detected by a series of sensors such as photodetectors change sufficiently to be of interest, known as an "event". Other or additional criteria may be used as well for determining the occurrence of events. In this embodiment, each photo resistor sensor is read four times per second in a person sensing stanchion having 6 photo resistors, for a total of 24 data values per second. Table 1 illustrates an algorithm for this event detection.

TABLE 1

| The algorithm to process the sensor data and determine whether or not an event will be recorded is: |
|---|
| The sensor data values are read as 10-bits of data and are then truncated to 8-bit values.<br>The sensor data value is biased to the baseline value for that sensor so that the variable absSensorData value always represents the absolute value of the sensor data above or below the baseline.<br>absSensorData = (uint8_t)ABS(currentBaseline[sensorNum−1] − sensorData);<br>For version 1:<br>An up event is reported if:<br>the absSensorData value is greater than one of the 3 threshold values and the last event value for this sensor was false or 0 (meaning that the last event was a "down" event.)<br>the value reported will be a 1, 2, or 3 depending on which threshold was crossed (LOW, MED, HIGH)<br>A down event is reported if:<br>the absSensorData value is less than the LOW threshold and the last event for this sensor was true or >0 (meaning that the last event was an "up" event)<br>the value reported will be a 0 for a down event<br>Only one up event is reported until a down event is received, even if subsequent absSensorData values are greater than the reported event<br>For version 2 (Version 2 is currently in use):<br>An up event is reported if:<br>the absSensorData value is greater than one of the 3 threshold values and the last event value for this sensor was false or 0 (meaning that the last event was a "down" event) or the last event value for this sensor was less than this event value (i.e., if the last event value was a 2 (threshold MED), and the absSensorData is greater than threshold HIGH, then a 3 will be reported<br>the value reported will be a 1, 2, or 3 depending on which threshold was crossed (LOW, MED, HIGH)<br>A down event is reported if:<br>the absSensorData value is less than the LOW threshold and the last event for this sensor was true or >0 (meaning that the last event was an "up" event)<br>the value reported will be a 0 for a down event<br>Up to 3 up events can reported (as each sensor value increases past a threshold value) until a down event is received |

Figure 42:
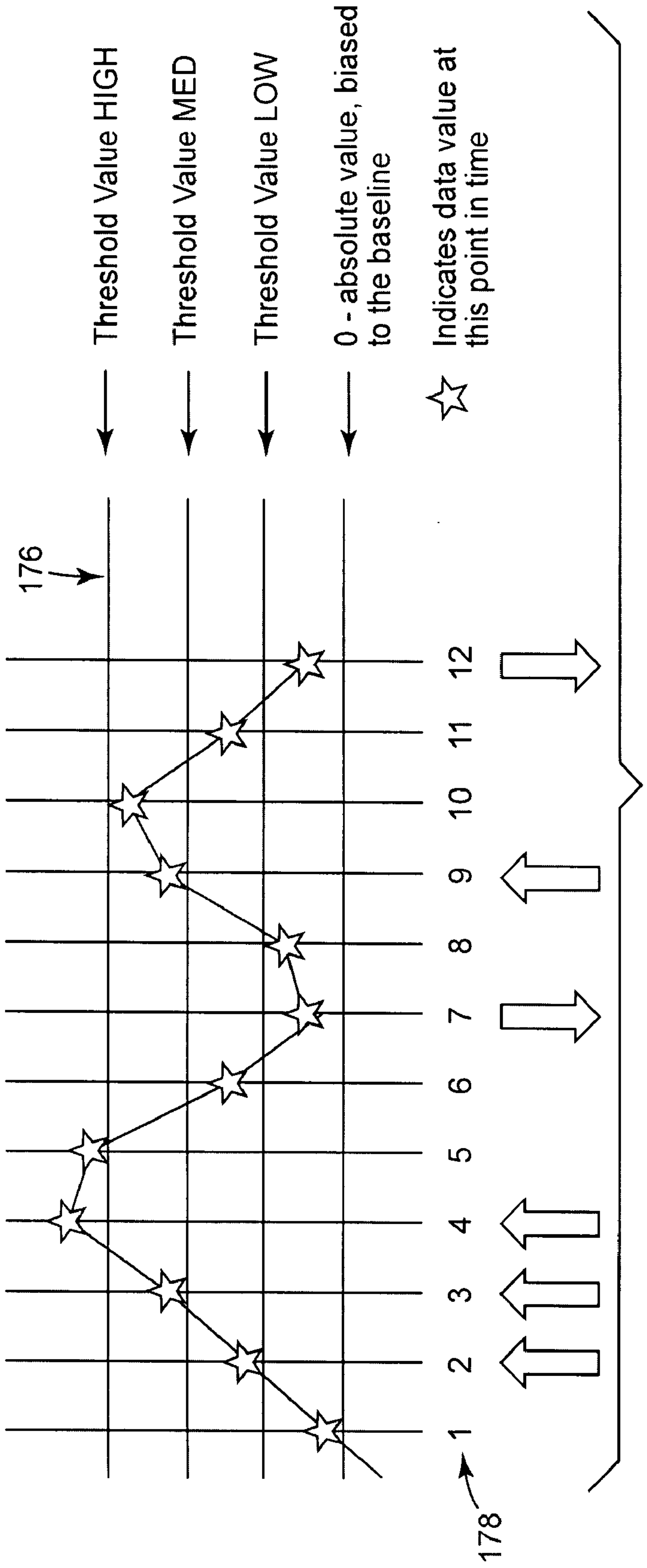
FIG. 42 is a diagram illustrating a method for detecting events using wireless network sensors.

FIG. 42 is a diagram illustrating a method for detecting events using wireless network sensors. Events occur at time intervals 178 and having threshold values 176. Table 2 describes this event detection algorithm with reference to FIG. 42.

TABLE 2

| |
|---|
| absSensorData value at time interval 1 is not high enough to cross the LOW threshold and so is not reported.<br>absSensorData value at time sequence 2 is above the LOW threshold and the previous event was initialized to false (down). In both version 1 and version 2, this would be reported as an UP event with value 1.<br>absSensorData value at time sequence 3 is above the MED threshold and is greater than the previous reading. In version 1, this would not be reported because the last event for this sensor was true (the event at time sequence 2 was reported.) In version 2, this would be reported as an UP event with value 2.<br>absSensorData value at time sequence 4 is above the HIGH threshold and is greater than the previous reading. In version 1, this would not be reported since the event at time sequence 2 was reported. In version 2, this would be reported as an UP event with value 3.<br>absSensorData value at time sequence 5 is above the HIGH threshold, however it will not be reported as an up event because the previous event was already reported as true (version 1) or HIGH (version 2). It will not be reported as a down event because it is greater than the LOW threshold.<br>absSensorData value at time sequence 6 is below the HIGH and above the MED threshold, however it will not be reported as an up event because the previous event was already reported as true (version 1) or HIGH (version 2). It will not be reported as a down event because it is greater than the LOW threshold.<br>absSensorData value at time sequence 7 is below the LOW threshold and the previous event was an up event, so this will be reported as a down event with value 0.<br>absSensorData value at time sequence 8 will not be reported because it is not greater than the LOW threshold and the previous event was a down event.<br>absSensorData value at time sequence 9 will be reported as an up event with value 2 because the value is greater than the MED threshold and the previous event was a down event. |

TABLE 2-continued

| |
|---|
| absSensorData value at time sequence 10 will not be reported as an up event in either version. In version 1, it is not reported because the previous event was an up event. In version 2, it is not reported because the value is less than the HIGH threshold and the previous event was an MED (value 2) event. |
| absSensorData value at time sequence 11 would not be reported by either version because the value is not less than the LOW threshold and the previous event was an up event. |
| absSensorData value at time sequence 12 would be reported as a down event with value 0 because it is lower than the LOW threshold and the previous event was an up event. |

There are several advantages to this embodiment. The event is determined directly on the mote, thereby saving processing time on the base station collecting the data. Less data is sent than if sending full voltage readings for each event to the base station on the wireless radio network among the motes, thereby increasing the bandwidth of the network.

Sampling Rate: An exemplary sampling rate is four samples per second per sensor. These sampling rates were determined experimentally to be sufficient to detect people walking by the sensors. Lower sampling rates were seen to miss people, especially if they were running or walking very quickly.

Threshold Values: Threshold values were determined experimentally. In one embodiment, only one value (0.2V) was measured to determine an event. By sending all raw data when conducting experiments, it was observed that there were times when a small signal was detected by not reported. It was also observed that there were times when a very large signal was detected and reported but that information was lost by only reporting one value. By reporting 3 values, useful data can be transmitted for later processing. Another embodiment involves implementing the following threshold values. The LOW threshold value was observed experimentally. The HIGH threshold was arbitrarily selected given the LOW and MED values, but seemed to be reasonable. These exemplary threshold values and an algorithm for processing them are provided in Tables 3 and 4, respectively.

TABLE 3

```
enum {
   // threshold values
   THRESHOLD_LOW_VALUE    = 5,      // approx .1V, 0 - 3.3V
   THRESHOLD_MED_VALUE    = 10,     // approx .2V, 0 - 3.3V
   THRESHOLD_HI_VALUE     = 25,     // approx .5V, 0 - 3.3V
};
```

TABLE 4

The following are code segments illustrating event determination.

```
// DEFINTIONS
// threshold values
THRESHOLD_LOW_VALUE    = 5,     // approx .1V, 0 - 3.3V
THRESHOLD_MED_VALUE    = 10,    // approx .2V, 0 - 3.3V
THRESHOLD_HI_VALUE     = 25,    // approx .5V, 0 - 3.3V
/** save the lastEventStatus for each sensor */
norace uint8_t      lastEventStatus[NUM_LIGHT_SENSORS];
/** holding place to calculate the absolute value of the sensor Data */
norace uint8_t   absSensorData;
// INITIALIZATION
for (loopCnt = 0; loopCnt < NUM_LIGHT_SENSORS; loopCnt++) {
   lastEventStatus[loopCnt] = FALSE;
   sensorThreshold[loopCnt] = THRESHOLD_LOW_VALUE;
}
// ANALYZE EVENT
// (included to illustrate how events are determined, but edited to remove other
processing of events)
//***********************************************************************
/**    analyzeEvent
  *
  *    Inline code to take the values obtained by reading the sensor, determine baseline
  *    or determine whether or not an event occurred, and store the result.
  *
  * NOTE: sensorNum ranges from 1 to NUM_LIGHT_SENSORS for easy
  * display ... it could just as easily range from 0 to NUM_LIGHT_SENSORS-1.
  */
//***********************************************************************
inline void analyzeEvent(uint16_t dataValue, uint8_t intervalValue, uint8_t sensorNum)
{
   // sensor data is 16-bit value - it needs to be converted to units (on PC)
   // but we'll make it 8-bits here by losing the 2 insignificant digits and shifting the rest
   // into one byte
   tempData = (uint8_t)(dataValue >> 2);
   // now, we'll bias the sensorData to the baseline so that it always represents the
   // absolute value of the sensor data above the baseline
   absSensorData = (uint8_t)ABS(currentBaseline[sensorNum-1] - tempData) ;
   //
   // normal processing to determine an event
   //
   if (operatingMode == NORMAL_MODE) {
#if 0 // version 1- only report first up event
```

TABLE 4-continued

The following are code segments illustrating event determination.

```
        //
        // therefore, whatever value was first seen as a sensor value will be reported
        //
        // original version
        //
            // now, test for an up (TRUE) event
            // TRUE if the sensorData is greater than the threshold and
            // there is no event already in progress
        //
            if (absSensorData > sensorThreshold[sensorNum−1] &&
                            !lastEventStatus[sensorNum−1]) {
                //
                // an up event
                //
                // OLD COMPRESSION FORMAT!! <<==
                //
                // tempLightValues[lightEventsSaved].dataValue = intervalValue << 4;
                // tempLightValues[lightEventsSaved].dataValue += (sensorNum*2 + 1);
                //
                // NEW COMPRESSION FORMAT!! <<==
                //
                tempLightValues[lightEventsSaved].dataValue = (intervalValue−1) << 6;
                tempLightValues[lightEventsSaved].dataValue += sensorNum << 2;
                //
                // the initial check was for a "low" event; 1 for low
                //
                tempLightValues[lightEventsSaved].dataValue += 1;
                //
                // now check for "med" or "high"; 2 for med
                //
                if (absSensorData >= THRESHOLD_MED_VALUE) {
                    tempLightValues[lightEventsSaved].dataValue += 1;
                }
                // now check for "high"; 3 for high
                //
                if (absSensorData >= THRESHOLD_HI_VALUE) {
                    tempLightValues[lightEventsSaved].dataValue += 1;
                }
                // set lastEventStatus to TRUE since an event found
                lightEventsSaved++;
                lastEventStatus[sensorNum−1] = TRUE;
            } // end of up event
#else // version 2 - reports all up events
            //
            // therefore, if a sensor value continues to increase / decrease in subsequent
            // reading, each transition will be recorded in sequence
            // i.e., could generate 3 sequential events, level LOW, then MED, then HI
            // look at the last event first: was it a LOW or MED?
            // and is this value greater than a HIGH event?
            //
            if ( lastEventStatus[sensorNum−1] < 3 &&
                absSensorData >= THRESHOLD_HI_VALUE ) {
                tempLightValues[lightEventsSaved].dataValue = (intervalValue−1) << 6;
                tempLightValues[lightEventsSaved].dataValue += sensorNum << 2;
                //
                // add event code
                //
                tempLightValues[lightEventsSaved].dataValue += 3;
                lastEventStatus[sensorNum−1] = 3;
                lightEventsSaved++;
            }
             //
            // look at the last event first: was it a LOW?
            // and is this value greater than a MED event?
            //
            else if ( lastEventStatus[sensorNum−1] < 2 &&
                absSensorData >= THRESHOLD_MED_VALUE ) {
                tempLightValues[lightEventsSaved].dataValue = (intervalValue−1) << 6;
                tempLightValues[lightEventsSaved].dataValue += sensorNum << 2;
                //
                // add event code
                //
                tempLightValues[lightEventsSaved].dataValue += 2;
                lastEventStatus[sensorNum−1] = 2;
                lightEventsSaved++;
                }
            //
            // look at the last event first: was it a LOW?
```

TABLE 4-continued

The following are code segments illustrating event determination.

```
        // and is this value greater than a LOW event?
        //
        else if ( lastEventStatus[sensorNum-1] < 1 &&
                absSensorData >= THRESHOLD_LOW_VALUE ) {
            tempLightValues[lightEventsSaved].dataValue = (intervalValue-1) << 6;
            tempLightValues[lightEventsSaved].dataValue += sensorNum << 2;
            //
            // add event code
            //
             tempLightValues[lightEventsSaved].dataValue += 1;
            lastEventStatus[sensorNum-1] = 1;
            lightEventsSaved++;
            }
#endif
        // now, test for an down (FALSE) event
        // FALSE if the sensorData is less than the threshold and there is an event in
        progress
        //
        else if (absSensorData < sensorThreshold[sensorNum-1] &&
        lastEventStatus[sensorNum-1]) {
            //
            // a down event
            //
            // OLD COMPRESSION FORMAT !! <<==
            // tempLightValues[lightEventsSaved].dataValue = intervalValue << 4;
            // tempLightValues[lightEventsSaved].dataValue += sensorNum*2;
            //
            // NEW COMPRESSION FORMAT !! <<==
            tempLightValues[lightEventsSaved].dataValue = (intervalValue-1) << 6;
            tempLightValues[lightEventsSaved].dataValue += sensorNum << 2;
            lightEventsSaved++;
            lastEventStatus[sensorNum-1] = FALSE;
        } // end of down event
    } // end of normal processing
    // adaptive baselining
    calcBaseline ( tempData, sensorNum);
    return;
}
```

2. Baselining Sensors

This embodiment involves an implementation of step 168 in software or firmware for execution by processor 22 in wireless network sensor 10. When sensing physical properties of the environment, such as the light level, it is expected that even in static conditions there will be small variations in the signal at various times. As the sun moves or the temperature changes, for example, slow changes are to be expected in the monitored environment. If there are large and sudden changes, then it is expected that something of interest has happened, such as a shadow passing by a sensor, possibly indicating a person walking by it. If the sensors are used to detect a sudden change such as that, referred to as an "event," then the new large signal is subtracted from the old steady-state signal before the change, referred to as "baseline" or "zero level." The subtraction shows the size of the signal of interest. After some time, it is expected that the signal will drop back to the original baseline level or close to it, meaning that the event has ended. Thus, this technique allows measurement of the amount of time that an event lasted.

Sometimes there can be large changes to the signal from the sensor that occur suddenly but do not return to the old baseline. For example, the lights might be turned on or off in a monitored space, or the sun might be hidden behind a cloud in that space. An informatics system needs a way to decide that the new signal levels are actually a new baseline and to change to that new baseline for any future events. An informatics system can do that by determining that the new signals last longer than an expected event might and that they remain steady throughout that time. This assumes that the informatics system knows the timing of an event of interest and that a steady signal is not usually received in an event of interest. An informatics system might also determine that several sensors all have a sudden change, but this method would work for even a single sensor. The informatics system has an algorithm to adjust baseline signals in both small and slow changes and also in sudden large changes that remain steady. The term "informatics system" includes any system to receive and process data from wireless network sensors. An example of a baselining algorithm used in touch screens is described in U.S. Patent Application Publication No. 2003/0210235, which is incorporated herein by reference.

The baselining algorithm for wireless network sensors can be described as follows. The signal for each sensor for the last n samples is averaged and this mean value is compared to the previous saved baseline value for that sensor. If the sensor reading average is trending away from the baseline, then the baseline has a small increment added to or subtracted from it so that it will gradually follow the sensor average. This occurs as long as the change is small and yet greater than the noise in the system.

If the new readings are far from the baseline, it could be an event happening and the informatics system should not change the baseline at all. Another possibility is that the baseline has changed dramatically due to, for example, the sun or lights or location of the sensor in a monitored area, and the informatics system will switch to that new baseline if it stays at approximately that value for a long enough time. The informatics system sets up a tentative baseline to save this proposed new baseline value for each sensor and then uses counters to measure how long the sensor readings remain near the new tentative baseline value. The tentative baseline can also follow the small trends of the readings as long as they remain near the new tentative baseline while the system is waiting for the counters to reach their limits. If the readings move too far away, then the informatics system may have events happening again or may be in the middle of a “real” event and will reset the counter so that it does not jump to the new tentative baseline value. If the counters finally reach their limit, meaning that the new tentative baseline is consistent over a long enough time, then the baseline is set to the tentative baseline value. At that point, any false events due to a change in the environment will be cleared out after the next sample.

The informatics system senses the location and motion of objects or people by detecting them passing by a sensor that is detecting changes in light levels proximate it. Having sensors out in the “real world,” indoors or outdoors, requires that the “zero” point of each sensor be reset periodically to match changes in the environment so that false detection of moving objects is minimized. This method continually adjusts the “zero” point or baseline of each sensor individually and yet also allows the system to adapt to a sudden change such as the lights being turned on or off or the sun going behind a cloud, if the new state remains steady. If the new state is not steady, the baseline is not adjusted, because the informatics system interprets a varying signal as a moving person or object in the field of view, and the system leaves the zero level as it was.

Each sensor has its own baseline value that is maintained and adjusted based on the latest readings (which occur typically every 0.25 seconds in one case), if they vary only a small amount from the previous readings. If there is a sudden change, a tentative new baseline reading is saved and adjusted if the new readings vary only a little from that new reading. After (in one case) 5 to 10 seconds, if the new tentative baseline is still close to the current readings, the tentative baseline becomes the new baseline. Table 5 provides pseudo-code for the baselining algorithm.

TABLE 5

The algorithm that was implemented in the motes is written here in pseudo-code form:

```
#define   Baseline_Adjust_Increment          0.02 //Volts
#define   Baseline_Adjust_Min_Threshold      0.04 //Volts
#define   Baseline_Adjust_Max_Threshold      0.06 //Volts
#define   Tentative_Adj_Max_Threshold        0.06 //Volts
#define   Max_count_to_switch_baseline       20
Initialize Baseline_Array and Tentative_Baseline_Array to initial readings
For (i=each sensor) do
  Mean_reading = Average(last four readings of this sensor)
  Delta = Mean_reading − Baseline_Array(i)
  AbsDelta = AboluteValue(Delta)
  If (AbsDelta < Baseline_Adjust_Max_Threshold) Then
  // Reading is changing less than baseline adjust maximum, so adjust baseline
        {
        If (AbsDelta > Baseline_Adjust_Min_Threshold) Then
        // Reading is greater than the noise, so adjust baseline
            {
            If (Delta > 0) Then Baseline_Array(i) = Baseline_Array(i) +
            Baseline_Adjust_Increment
            Else Baseline_Array(i) = Baseline_Array(i) −
            Baseline_Adjust_Increment
            }
        Else // Reading is in the noise, no adjustment needed yet
            {
            // Baseline_array(i) remains the same
            }
        }
  Else
  // Reading is changing more than baseline maximum, possible event, so
  // do not adjust baseline and check on the tentative baseline instead
        {
        TDelta = Mean_reading − Tentative_Baseline_Array(i)
        AbsTDelta = AbsoluteValue(TDelta)
        If (AbsTDelta < Tentative_Adj_Max_Threshold) Then
        // Reading is close to the tentative value, so adjust tentative value
        // and increment the tentative baseline counter
            {
            If (AbsTDelta > Baseline_Adjust_Min_Threshold) Then
            // Reading is greater than the noise, so adjust tentative baseline
                {
                If (TDelta > 0) Then Tentative_Baseline_Array(i) =
                Tentative_Baseline_Array(i) + Baseline_Adjust_Increment
                Else Tentative_Baseline_Array(i) =
                Tentative_Baseline_Array(i) − Baseline_Adjust_Increment
                }
            Else // Reading is in the noise, no adjustment needed yet
                {
                // Tentative_Baseline_Array(i) remains the same
                }
            // Increment counter and check for the counter to finish
            Tentative_Baseline_Counter(i) = Tentative_Baseline_Counter(i) + 1
            If (Tentative_Baseline_Counter(i) >=
            Max_count_to_switch_baseline) Then
            // Counter has reached maximum: new readings have stayed near
```

TABLE 5-continued

The algorithm that was implemented in the motes is written here in pseudo-code form:

```
            // the tentative baseline long enough, so change baseline to
            // tentative value (and leave tentative baseline where it is)
                {
                Baseline_Array(i) = Tentative_Baseline_Array(i)
                Tentative_Baseline_Counter(i) = 0
                }
            Else // Counter has not ended, continue with no changes
            }
        Else // Reading is far from tentative baseline as well, so set tentative
        // baseline to this new value and start counter
            {
            Tentative_Baseline_Array(i) = Mean_reading
            Tentative_Baseline_Counter(i) = 0
            }
        }
Until (All sensors completed)
```

The program in the motes uses the "nesC" language in the "TinyOS" operating system and implements the algorithm described in Table 5. The TinyOS system, libraries, and applications were written in nesC, a new language for programming structured component-based applications. The nesC language is primarily intended for embedded systems such as wireless sensor networks. The nesC language has a C-like syntax and supports the TinyOS concurrency model, as well as mechanisms for structuring, naming, and linking together software components into robust network embedded systems. The pseudo-code in Table 5 was implemented in nesC.

This code is part of the overall mote code that collects the signal data every 0.25 seconds and sends it out in compressed formats every 1.0 second as described in the present specification. For the testing on baselining, the informatics system captures and sends out the baseline and raw data values every ½ second. During normal operation of the motes, the informatics system sends out the baseline data every 30 seconds during a (lower-priority) heartbeat message.

During testing, it was determined what the best values would be for the constant thresholds in a real system using the mote software with various parameters. Parameters were chosen that best adjusted the baseline to slow changes and yet prevented real events from affecting the baselines too much. Also considered were sudden changes of lighting and how well the baselines followed those changes. For testing, a person sensing stanchion with six photocells was set up across from a window in a hallway. The mote calculated baselines for the sensors as the sun shone in an east-facing window and clouds passed by once in a while, then after that time the sensors were covered for about 17 seconds in order for the baseline to adjust, individuals walked by the stanchion several times to create events and as the sun moved away from the window the overall signal level rose. Table 6 includes additional code to illustrate a baselining algorithm.

TABLE 6

The following are code segments illustrating baselining.

```
// DEFINITIONS
enum {
        // baseline values
        BASELINE_ADJ_INCR                = 1,    // amount of min threshold to
                                                 // adjust baseline
        BASELINE_ADJ_MIN_THRESHOLD       = 2,    // amount of min threshold to
                                                 // adjust baseline
        BASELINE_ADJ_MAX_THRESHOLD       = 3,    // amount to max threshold t
                                                 // adjust baseline
        TENTATIVE_ADJ_MAX_THRESHOLD      = 3,    // amount of max threshold to
                                                 // create tentative baseline
        NUM_RDGS_IN_BASELINE_AVERAGE     = 4     // the average of the current plus
                                                 //last xx values used to delta
};
#define MAX_COUNT_TO_SWITCH_BASELINE (20)        // four samples per second in
                                                 // normal mode
/** save the last NUM_RDGS_IN_BASELINE_AVERAGE reading per sensor */
norace uint8_t      saveLastReadings[NUM_LIGHT_SENSORS]
                              [NUM_RDGS_IN_BASELINE_AVERAGE];
/** sequence number in saveLastReadings circular buffer(s) */
norace uint8_t      bufPtr[NUM_LIGHT_SENSORS];
/** the average of the last NUM_RDGS_IN_BASELINE_AVERAGE sensor readings */
norace uint16_t     readingAverage;
/** the ABS difference of readingAverage and the baseline value */
norace uint8_t      ABSdelta;
/** the difference of readingAverage and the baseline value */
norace int     delta;
norace int     tmpReadingAve;
norace int     tmpCurrentBaseline;
/** the counter to decide whether or not to accept the tentative baseline */
norace uint8_t      tentativeBaselineCounter[NUM_LIGHT_SENSORS];
/** save the threshold for each sensor */
```

TABLE 6-continued

The following are code segments illustrating baselining.

```
norace uint8_t         sensorThreshold[NUM_LIGHT_SENSORS];
/** save the current baseline value for each sensor */
norace uint8_t        currentBaseline[NUM_LIGHT_SENSORS];
/** save the tentative baseline value for each sensor */
norace uint8_t        tentativeBaseline[NUM_LIGHT_SENSORS];
/** save the lastEventStatus for each sensor */
norace uint8_t             lastEventStatus[NUM_LIGHT_SENSORS];
/** holding place to calculate the absolute value of the sensor Data */
norace uint8_t         absSensorData;
// INITIALIZATION
    for (loopCnt = 0; loopCnt < NUM_LIGHT_SENSORS; loopCnt++) {
        lastEventStatus[loopCnt] = FALSE;
        sensorThreshold[loopCnt] = THRESHOLD_LOW_VALUE;
        currentBaseline[loopCnt] = 0;
        tentativeBaseline[loopCnt] = 0;
        tentativeBaselineCounter[loopCnt] = 0;
        bufPtr[loopCnt] = 0;
        for (loopCnt2 = 0; loopCnt2<NUM_RDGS_IN_BASELINE_AVERAGE; loopCnt2++) {
            saveLastReadings[loopCnt][loopCnt2] = 0;
        }
    }
// ANALYZE EVENT
// (included to illustrate the call to calcBaseline)
//******************************************************************************
 /**    analyzeEvent
   *
   *    Inline code to take the values obtained by reading the sensor,
   *    determine baseline or determine whether or not an event occurred,
   *    and store the result.
   *
   * NOTE: sensorNum ranges from 1 to NUM_LIGHT_SENSORS for easy
   * display ... it could just as easily range from 0 to
   * NUM_LIGHT_SENSORS−1.
   */
//******************************************************************************
inline void analyzeEvent(uint16_t dataValue, uint8_t intervalValue, uint8_t sensorNum) {
            // sensor data is 16-bit value - it needs to be converted to
            // units (on PC) but we'll make it 8-bits here by losing the 2
            // insignificant digits and shifting the rest into one byte
            tempData = (uint8_t)(dataValue >> 2);
            // now, we'll bias the sensorData to the baseline
            // so that it always represents the absolute value of the
            // sensor data above the baseline
            absSensorData = (uint8_t)ABS(currentBaseline[sensorNum−1] − tempData) ;
            //
            // normal processing to determine an event
            //
            if (operatingMode == NORMAL_MODE) {
                        // code removed for illustration
            }           // end of normal processing
            // now modify the adaptive baselining (if needed)
            calcBaseline (tempData, sensorNum);
            return;
} // end of analyzeEvent
// ADAPTIVE BASELINE CODE
//************************************************************************
/** calcBaseline
   *
   * Inline code to calculate the baseline for a given sensor and
   *     to examine each incoming reading versus that baseline to
   *     determine whether to adapt the baseline or start
   *     a tentative baseline
   *
   * Params: the 8-bit sensorData, 8-bit sensorNumber
   *
   * Note: this method modifies currentBaseline for each sensor, a
   * global array
   * Note: this method modifies tentativeBaseline for each sensor, a
   * global array
   * Note: this method examines MODE
   * Note: this method modifies tempLightValues, a global array
   * Note: this method modifies lightEventsSaved, a global value
   */
 //************************************************************************
 inline void calcBaseline (uint8_t sensorData, uint8_t sensorNbr) {
            // The last saveLastReadings for each sensor are stored in
            // saveLastReadings[sensor#][NUM_RDGS_IN_BASELINE_AVERAGE]
            // by storeReading
```

TABLE 6-continued

The following are code segments illustrating baselining.

```
storeReading (sensorNbr, sensorData);
// calc average of readings
readingAverage = 0;
for (loopCnt = 0; loopCnt < NUM_RDGS_IN_BASELINE_AVERAGE; loopCnt++) {
        // sum the last xx readings
        readingAverage += saveLastReadings[sensorNbr−1][loopCnt];
}
// calc the average
readingAverage = readingAverage / NUM_RDGS_IN_BASELINE_AVERAGE;
// calc difference of readingAverage from baseline
tmpReadingAve = readingAverage;
tmpCurrentBaseline = currentBaseline[sensorNbr−1];
delta = tmpReadingAve − tmpCurrentBaseline;
ABSdelta = (uint8_t)ABS(delta);
// need to adjust the currentBaseline?
if (ABSdelta <= BASELINE_ADJ_MAX_THRESHOLD) {
        // the reading is changing less than the currentBaseline so
        // adjust max and consider adjusting the baseline
        if (ABSdelta >= BASELINE_ADJ_MIN_THRESHOLD) {
            // the reading is greater than the noise, so adjust the baseline
            if (delta > 0) {
                currentBaseline[sensorNbr−1] =
                    currentBaseline[sensorNbr−1]                +
                BASELINE_ADJ_INCR;
            }
            else {
                currentBaseline[sensorNbr−1] =
                    currentBaseline[sensorNbr−1] − BASELINE_ADJ_INCR;
            }
        }
        // a currentBaseline adjustment accepted - therefore, no tentative baseline in
progress
        tentativeBaselineCounter[sensorNbr−1] = 0;
} // end of reading is changing less than currentBaseline so adjust max
else {
        // the reading is changing more than the currentBaseline adjust
        // max so do not adjust the currentBaseline but check on the TENTATIVE
baseline
        // calc difference of readingAverage from tentative baseline
        tmpReadingAve = readingAverage;
        tmpCurrentBaseline = tentativeBaseline[sensorNbr−1];
        delta = tmpReadingAve − tmpCurrentBaseline;
        ABSdelta = (uint8_t)ABS(delta);
        // need to adjust the tentative baseline?
        if (ABSdelta <= TENTATIVE_ADJ_MAX_THRESHOLD) {
            // reading is close to the tentative baseline, so adjust
            // tentative value and increment tentative baseline counter
            if (ABSdelta >= BASELINE_ADJ_MIN_THRESHOLD) {
                // the reading is greater than the noise, so adjust the baseline
                if (delta > 0) {
                    tentativeBaseline[sensorNbr−1] =
                      tentativeBaseline[sensorNbr−1]            +
                    BASELINE_ADJ_INCR;
                }
                else {
                    tentativeBaseline[sensorNbr−1] =
                        tentativeBaseline[sensorNbr−1]          −
                    BASELINE_ADJ_INCR;
                }
            } // end adjust tentative baseline
            // increment the tentative baseline counter
            tentativeBaselineCounter[sensorNbr−1]++;
            // can we swap the tentative baseline to the current baseline?
            if (tentativeBaselineCounter[sensorNbr−1] >=
                 MAX_COUNT_TO_SWITCH_BASELINE) {
                // the counter has reached the limit: new readings have
                // stayed near the tentative baseline long enough,
                // let's use that as the baseline
                // leave the tentative value, but clear the counter
                currentBaseline[sensorNbr−1] = tentativeBaseline[sensorNbr−1];
                tentativeBaselineCounter[sensorNbr−1] = 0;
            } // end tentativeBaselineCounter >=
              // MAX_COUNT_TO_SWITCH_BASELINE
        } // end delta < TENTATIVE_ADJ_MAX_THRESHOLD
      else {
        // the reading is far from the tentative baseline as well, so set the
        // tentative baseline to this new value and start the counter
        tentativeBaseline[sensorNbr−1] = readingAverage;
```

TABLE 6-continued

The following are code segments illustrating baselining.

```
                tentativeBaselineCounter[sensorNbr−1] = 0;
            }
        } // test setting tentative baseline
        if (operatingMode == BASELINE_MODE) {
                // IF BASELINE_MODE, send currentBaseline[sensorNum] & biased sensor
        data
                 tempLightValues[lightEventsSaved++].dataValue =
                        (uint8_t)currentBaseline[sensorNbr−1];
                tempLightValues[lightEventsSaved++].dataValue = (uint8_t)sensorData;
        } // end BASELINE_MODE
} // end of calcBaseline
// storeReading CODE
//***********************************************************************
 /** storeReading
   *
   * inline code to store the reading value into a circular buffer of
   * readings (saveLastReadings) for each sensor number
   */
//***********************************************************************
 inline void storeReading(uint8_t sensorNbr, uint8_t sensorData) {
          //
          // saveLastReadings used as a circular buffer for each sensor
          //
        saveLastReadings[sensorNbr−1][bufPtr[sensorNbr−1]] = sensorData;
        bufPtr[sensorNbr−1]++;
        if (bufPtr[sensorNbr−1] >= NUM_RDGS_IN_BASELINE_AVERAGE) {
                bufPtr[sensorNbr−1] = 0;
        }
} // end of storeReading
```

3. Data Compression on Wireless Network Sensors

This embodiment involves an implementation of steps 170-172 in software or firmware for execution by processor 22 in wireless network sensor 10. In particular, this embodiment is an algorithm and data format to compress data taken from a set of sensors and therefore increase the amount of data transmitted via a radio network. The sensors are controlled by a processor with radio communications, referred to as a "mote" as described above, and multiple motes are used to monitor an area traveled by pedestrians or vehicles. In order to increase the bandwidth of the network of motes, multiple sensors readings can be compressed into one radio transmission via the wireless transmitter 24 in wireless network sensor 10.

Starting with a base data transmission packet defined within the TinyOS (TOS) operating system used by the motes, the number of data payloads can be extended to 12 bytes or even more than 12 bytes, each byte representing one event. The more processing that can be performed on the mote (for example, storing more data and refining the event determination, or storing more than 12 events, can result in less traffic on the wireless network and less contention and the potentially more motes a given network can support. One of the advantageous of the TinyOS network is that it is self-configuring in the sense that it builds and carries lists (within the OS on the motes) of "good" neighbors so that if a mote is lost, the surrounding motes have a backup mote to communicate with, and if a new mote comes on the network, neighboring motes will detect it, evaluate it, and incorporate it into the network.

In an exemplary embodiment, the informatics system samples the set of sensors every ¼ second and only saves events. The informatics system transmits a message packet every second (per mote) with any events that have been detected. In the transmission packet, each of the 12 data payloads are compressed according to the algorithm described in Table 7.

TABLE 7

Compressed Event Data:

1st version (known as Message Type 15):

nnnn sss v where:

nnnn is 4 bits representing the interval within one second in which the event occurred. Current processing is that a timer fires every ¼ second and triggers reading all 6 sensors. The system then will send the data every one second (if there is data to be sent). 4 bits allows the system to represent 0-15 values, although the system is only using 1-4 today: interval 1 through interval 4 (depending on when the event occurred (which ¼ second interval).

sss is 3 bits presenting the sensor number. 3 bits will allow the system to track 0-7 sensor numbers. Currently, there are 6 sensors in the stanchions, but this may increase in the future.

v is 1 bit representing the value of the event: True (meaning an object moved into the field of the sensor) or false (meaning an object left the field of the sensor)

TABLE 7-continued

| Compressed Event Data: |
| --- |
| We sample sensors every ¼ second and only save events. Every one second, the mote attempts to send the data to the base station via the wireless network. If less than 12 events were detected, the corresponding byte fields will contain a value of '00'. If more than 12 events per interval (1 second) were detected, the $12^{th}$ byte of event data will be overwritten with "FF" as a signal that data was lost. This will be evaluated as to how frequently this occurs and what action needs to be taken. |
| $2^{nd}$ version (known as Message Type 16): |
| The event compression algorithm has been updated to add more sensors and more event values, but still sends 12 bytes of event data transmitted in any one message packet, with one event per data payload byte. |
| nn ssss vv |
| where: |
| nn is 2 bits representing the interval within one second in which the event occurred. 2 bits allows the system to represent 0-3 values, which accommodates current intervals 1 through 4. |
| ssss is 4 bits representing the sensor number. 4 bits will allow the system to track 0-15 sensor numbers interfaced to one mote. Actual sensor number range is 1-15. The value of zero is reserved. |
| vv is 2 bits representing the value of the event. 2 bits will allow the system to represent 0-3 values: |
| 0: event is false meaning an object left the field of the sensor |
| 1-3: event is true, with predefined levels of information such as the amount of signal registered which can translate to the distance of the object or to the color contrast the object has with the background |
| 1 - event value is low |
| 2 - event value is medium |
| 3 - event value is high |
| Just as with Message Type 15, the system samples sensors every ¼ second and only save events. If less than 12 events were detected, the corresponding byte fields will contain a value of '00'. If more than 12 events per interval (1 second) were detected, the $12^{th}$ byte of event data will be overwritten with "FF" as a signal that data was lost. This will be evaluated as to how frequently this occurs and what action needs to be taken. |

Additional message types have also been defined, heartbeat and several "test modes" as provided in Tables 8-10.

TABLE 8

| Message Type 19, Heartbeat | |
| --- | --- |
| When there are no events, the system can increase wireless network throughput by not sending a message packet with zero event data. Therefore, the system will define a heartbeat message type. Message Type 19 will have the following format within the 12 bytes of the data payload: | |
| Byte 1: | baseline value, sensor 1 |
| Byte 2: | baseline value, sensor 2 |
| Byte 3: | baseline value, sensor 3 |
| Byte 4: | baseline value, sensor 4 |
| Byte 5: | baseline value, sensor 5 |
| Byte 6: | baseline value, sensor 6 |
| Byte 7-12: | 0x00 |
| The heartbeat message will be sent periodically when there is no event data to report. Baseline information is sent in the heartbeat packet for diagnostic purposes. | |

TABLE 9

| Message Type 17, Raw Data Mode | |
| --- | --- |
| Message Type 17 will allow the system to communicate raw data from the mote to the base system. This message type is used as a testing mode, such as evaluating the baseline algorithm. Message Type 17 will have the following format within the 12 bytes of the data payload: | |
| Byte 1: | raw data, sensor 1 |
| Byte 2: | raw data, sensor 2 |
| Byte 3: | raw data, sensor 3 |
| Byte 4: | raw data, sensor 4 |
| Byte 5: | raw data, sensor 5 |

TABLE 9-continued

| Message Type 17, Raw Data Mode | |
| --- | --- |
| Byte 6: | raw data, sensor 6 |
| Byte 7: | raw data, sensor 1 |
| Byte 8: | raw data, sensor 2 |
| Byte 9: | raw data, sensor 3 |
| Byte 10: | raw data, sensor 4 |
| Byte 11: | raw data, sensor 5 |
| Byte 12: | raw data, sensor 6 |
| When sending data in this format, the system will sample sensors at ½ second, but the system will send the message packet every 1 second. This means that the message packet will contain the data of 2 sample cycles. Sending at every 1 second means that the system will only support a small number (<4) of motes sending the data at this rate. This will continue to be a test mode. | |
| The raw data value that the mote acquires has 10 bits. The processing on the mote shifts off the 2 lower order bits, leaving 8 bits. | |

TABLE 10

| Message Type 18, Baseline Data Mode | |
| --- | --- |
| Message Type 18 will allow the system to communicate baseline data (both baseline data and raw sensor values) from the mote to the base system. This message type also has been used as a test mode for use in evaluating the baseline algorithm. Message Type 18 will have the following format within the 12 bytes of the data payload: | |
| Byte 1: | baseline value, sensor 1 |
| Byte 2: | raw data, sensor 1 |
| Byte 3: | baseline value, sensor 2 |
| Byte 4: | raw data, sensor 2 |
| Byte 5: | baseline value, sensor 3 |
| Byte 6: | raw data, sensor 3 |
| Byte 7: | baseline value, sensor 4 |

TABLE 10-continued

| Message Type 18, Baseline Data Mode | |
|---|---|
| Byte 8: | raw data, sensor 4 |
| Byte 9: | baseline value, sensor 5 |
| Byte 10: | raw data, sensor 5 |
| Byte 11: | baseline value, sensor 6 |
| Byte 12: | raw data, sensor, sensor 6 |

When sending data in this format, the system will read 6 sensors every ½ seconds and send the data every ½ second. This means that the message packet will contain the data of 1 cycle. Sending at every ½ second means that the system will only support a small number (<4) of motes sending the data at this rate. This will continue to be a test mode. The baseline value and the raw sensor data are both "raw" values, 10 bits scaled to 8 bits.

This approach allows the informatics system to increase the sampling rate without overwhelming the network communications. The TOS system was initially designed for a low-rate of sampling and a single sample every two seconds was considered the limit. More typical was every minute or every ten minutes. That bandwidth can be insufficient for some sensor networks. This compression algorithm, combined with transmission every one second, allows an informatics system to gather more data with a much higher frequency.

The entire radio transmission packet has the format shown in Table 11, of which the 12 data payload bytes are the focus of this embodiment.

TABLE 11

| Bytes | Field |
|---|---|
| 7E 00 | The UART Serial address |
| 00 | TOS message type |
| 00 | Group ID |
| 00 | Data length |
| 00 00 | not used |
| 00 00 | Origin Mote address |
| 00 00 | Network sequence number |
| 00 | not used |
| 00 | message type |
| 00 00 | Origin mote address |
| 00 00 | Parent Mote address |
| 00 00 00 00 | Battery voltage & mote sequence number |
| 00 | Payload Data 1 |
| 00 | Payload Data 2 |
| 00 | Payload Data 3 |
| 00 | Payload Data 4 |
| 00 | Payload Data 5 |
| 00 | Payload Data 6 |
| 00 | Payload Data 7 |
| 00 | Payload Data 8 |
| 00 | Payload Data 9 |
| 00 | Payload Data 10 |
| 00 | Payload Data 11 |
| 00 | Payload Data 12 |
| 00 00 00 00 | Time Stamp |
| EC D9 | CRC |

A sample radio packet, using the format shown in Table 11, has the structure shown in Table 12.

TABLE 12

| Bytes (hex) | Field |
|---|---|
| 7E 00 | The UART Serial address |
| 15 | TOS message type |
| 55 | Group ID |
| 1C | Data length |
| 00 00 | not used |
| 65 00 | Origin Mote address |
| DD 10 | Network sequence number |
| 00 | not used |
| 11 | message type (Message Type 17, Compressed Event Data) |
| 65 00 | Origin mote address |
| 00 00 | Parent Mote address |
| 9D 0E 0E 80 | Battery voltage & mote sequence number |
| 04 | Event 1 |
| 0F | Payload Data 2 |
| 13 | Payload Data 3 |
| 57 | Payload Data 4 |
| 5A | Payload Data 5 |
| 8C | Payload Data 6 |
| 90 | Payload Data 7 |
| 9B | Payload Data 8 |
| C8 | Payload Data 9 |
| 00 | Payload Data 10 |
| 00 | Payload Data 11 |
| 00 | Payload Data 12 |
| 00 00 00 00 | Time Stamp |
| EC D9 | CRC |

Remote Data Processing

1. Information Extracting for Informatics System

This embodiment includes a system to collect data about objects in one to several locations, communicate that data to a central location and the subsequent processing of that data to extract and display valuable information.

Data Collection. The devices that collect the data in the field are commonly referred to as wireless network sensors, as described above. The wireless network sensors can be implemented in part using devices referred to as motes. These motes have a wireless communication system built in to them. As described above, Crossbow Technology manufactures an example of one such type of mote, which is a small printed circuit board that has a radio, microprocessor, and power supply circuitry on it. The wireless network sensors can also be implemented in part using an interface board that connects the mote to the sensors. In this exemplary embodiment, photo resistors are used as the sensor but other sensors could be used such as infrared (IR) detectors, acoustic sensors, or image sensors.

The mote is programmed to sample each sensor 4 times a second (4 Hz). The data is converted from analog to digital at this time. When the microprocessor determines that an event has occurred, then the sequence number and event level information are stored for transmission. The mote sends an encrypted message every 1 second containing information about the events that occurred during the 1 second interval. If no events occur, no message is sent. The mote also sends out "heartbeat" information periodically. The mote also follows ambient light conditions to alter the baseline or zero point of the measurement system. This feature allows for different light conditions on each sensor as well as allowing for changing conditions for all sensors.

Data Communication. The communication system used by the motes is a version of the TinyOS operating system from the University of California at Berkeley. TinyOS is an ad-hoc wireless mesh network system that allows the motes to find a communication path to the base station via various paths.

Figure 43:
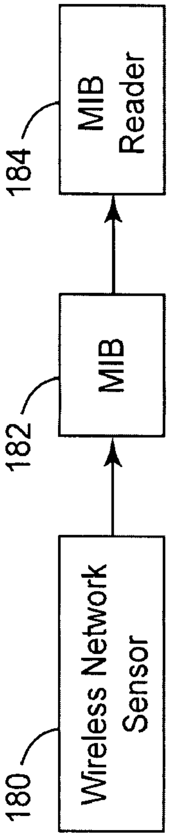
FIG. 43 is a diagram of an interface between a wireless network sensor and a computer system.

Data Receiver. A number of motes placed in a given area can now sample the conditions periodically, make decisions about that collected data, and send on relevant data to the base station. At the base station, the incoming signals are received by another mote programmed to act as a radio to serial port device. This mote gets data from its radio and formats the data to be sent onto a personal computer (PC) via a serial port. This device is referred to as the Mote Interface Board or MIB. The PC has a program running to monitor the serial port referred to as MIB Reader. FIG. 43 is a diagram of the interface between a wireless network sensor and a computer system. A mote interface board (MIB) 182 connects a wireless network sensor 180 with a MIB reader 184.

System Software. The MIB Reader parses the data to separate network information, heartbeat data, and sensor events from each other and then forwards the data via TCP data socket as well as writing out various logs to ensure that data is captured. The Information Processing System 186 receives the data forwarded via the TCP socket or by reading in previously written log files.

Figure 44:
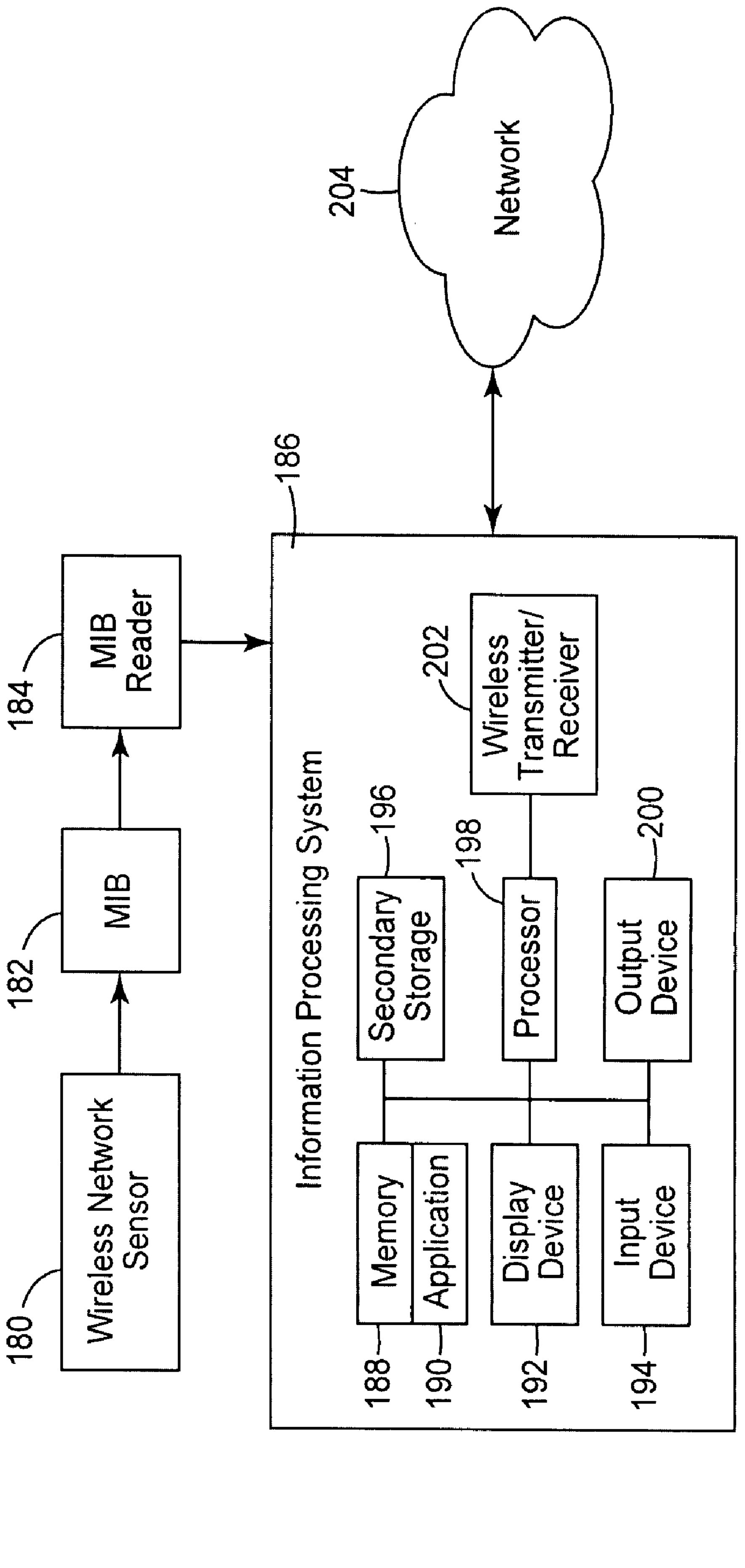
FIG. 44 is a diagram of an informatics computer system for processing data received from wireless network sensors.

FIG. 44 is a diagram of a computer system 186 for processing data received from wireless network sensors. System 186 can include, for example, the following components: a memory 188 storing one or more applications 190; a secondary storage 196 for providing non-volatile storage of information; an input device 194 for entering information or commands into system 186; a processor 198 for executing applications stored in memory 188 or secondary storage 196, or as received from another source; an output device 200 for outputting information, such as a printer for providing hard copies of information or speakers for providing information in audio form; a display device 192 for displaying information in visual or audiovisual form; and a wireless transmitter/receiver 202. System 186 can include a connection to a network 204 such as the Internet, a wide area network, an intranet, or other type of network. System 186 can communicate with network 204 via known communication protocols such as Transmission Control Protocol/Internet Protocol (TCP/IP). It can also communicate via wireless networks. System 186 is connected with wireless network sensors via MIB reader 184.

The system 186 can send information on to various subsystems or make requests to those subsystems for information. The system 186 can generate a home page for the informatics system, which can be accessed by customers, for example, over a network such as the Internet. The Network Health subsystem displays the network data from the motes. This data is used to indicate how the network is functioning. The Sensor Demo GUI is a demo program to visualize sensor readings real-time. The System Configuration files are a series of files containing information about motes, locations, maps and other data needed by the system. The Informatics Processing subsystem is the most complex of the subsystems.

Figure 45:
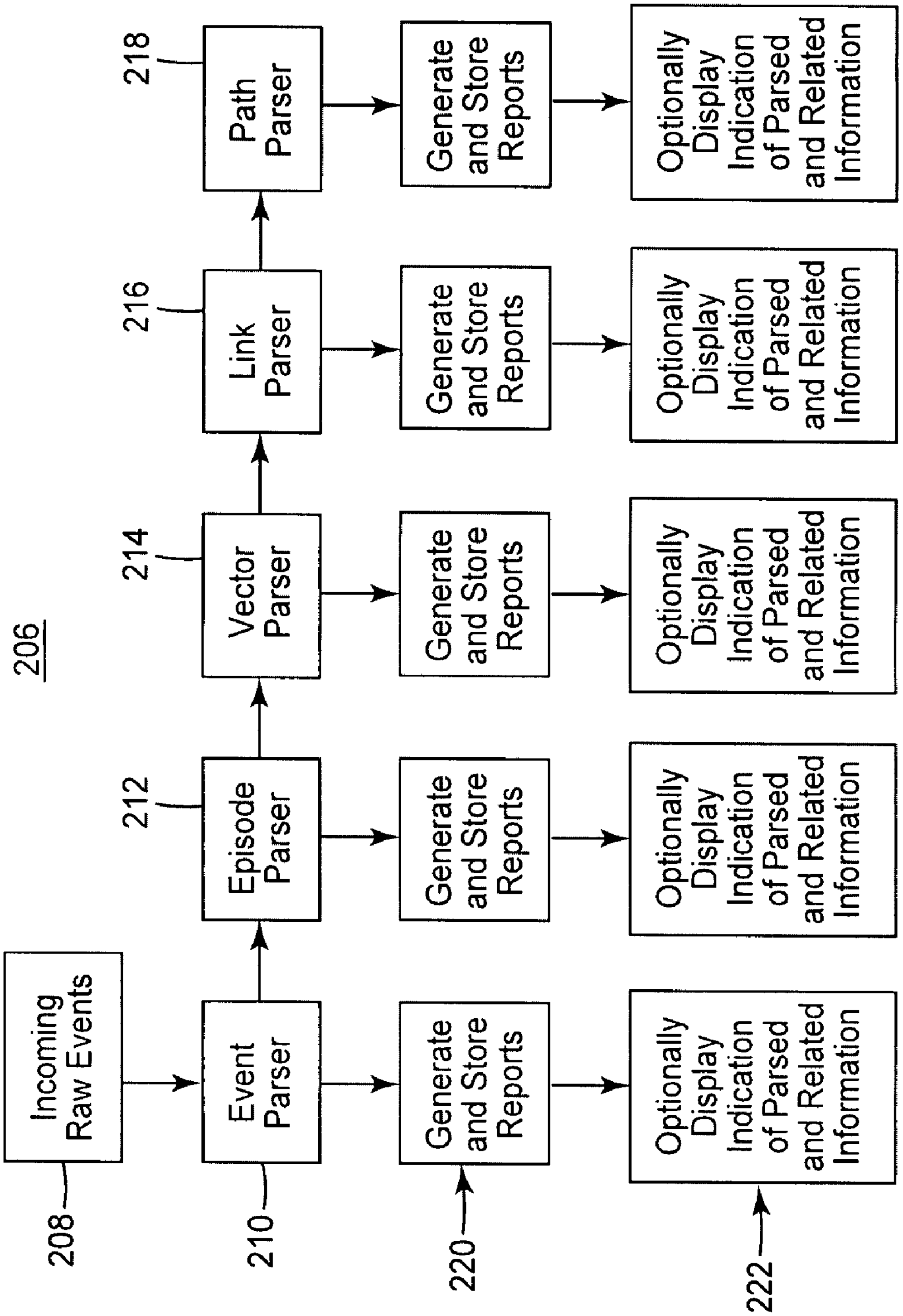
FIG. 45 is a flow chart of a method for processing data received from wireless network sensors.

Informatics Processing. FIG. 45 is a flow chart of methods 206 for processing data received from wireless network sensors. Incoming raw events 208 are processed by an event parser 210. Other processes include the following: an episode parser 212; a vector parser 214; a link parser 216; and a path parser 218. Processes 210, 212, 214, 216, and 218 can be implemented in, for example, software or firmware, such as modules, for execution by processor 198. These processes are further explained below.

Each of these processes, as explained below, determines new processed data by applying particular criteria to data from the previous process in method 206. Although particular criteria for these processes are described in the present specification, other or additional criteria may be used as well. The information resulting or generated from processes 210, 212, 214, 216, and 218 can be electronically stored, for example, in secondary storage 196 in a file or spreadsheet, or alternatively in any particular database format. The generation of reports in steps 220 for each process can also include optionally displaying an indication of the parsed and related information generated by each of the corresponding processes 210, 212, 214, 216, and 218, as shown by steps 222. The display can include, for example, display of the information on display device 192 in screens such a those described in the present specification or in any other display format.

The Informatics Processing subsystem is where the Event Parser parses the raw events into Parsed Events, the Episode Parser parses the Parsed Events into Episodes, the Vector Parser parses Episodes into Vectors, the Link Parser parses Vectors into Links, the Path Parser parses Links into Paths. At each of these stages reports are generated and available for display.

A key point in this process is that not all raw events will become part of a Parsed Event. Only those events that meet the criteria of the parser will be used. This is true for all of the parsers. The parsers are essentially data filters that allow the system to comb through the mass of data looking for patterns to be identified. The resultant set of reports is a valid view into the behavior of the people observed in the sensor field in terms of traffic patterns, for example. Trends of the movement can be tracked.

Data Reporting. The reports can vary for each level. For example, the event reports comprise graphs that show number of events in a given time period, average dwell time of a person in front of a given sensor, dwell time in increments, and topographical representations of the number of events in a given time period at a given location.

A Graphical User Interface (GUI) has been designed to deliver the information to the user. The user interfaces are configured to be electronically displayed on display devices such as display device 192. The user interfaces, also referred to as screens, include various sections, as explained below, to provide information or to receive information or commands. The term "section" with respect to screens refers to a particular portion of a screen, possibly including the entire screen. Sections are selected, for example, to enter information or commands or to retrieve information or access other screens. The selection may occur, for example, by a using a cursor-control device to "click on" or "double click on" the section; alternatively, sections may be selected by entering a series of key strokes or in other ways such as through voice commands or use of a touch screen. In addition, although the screens illustrate a particular arrangement and number of sections in each screen, other arrangements are possible and different numbers of sections in the screens may be used to accomplish the same or similar functions of displaying information and receiving information or commands. Also, the same section may be used for performing a number of functions, such as both displaying information and receiving a command.

The system allows for the portable, economical collection of data about people movement in a given area. The system can be used to understand how people in general move through a given space and what factors might influence their behavior. Advertising effectiveness can be established by using this system to monitor how people react to different ad placement in a store. Store layout can be improved once the underlying flow is understood. Mall owners can charge rents dependent on traffic in a given area of the mall, for example. The wireless aspects of the system provides for the ability to rapidly deploy a sensor system and gather data without having to alter the building infrastructure, which can significantly lower deployment costs. The sensors can be configured in a variety of ways for different viewing angles and attachment methods. These various configurations are known as detection sensors, which can alternatively be built into floor furniture to hide them. Examples of detection sensors are described above.

Event. Table 1 provides a definition and description of an event.

Parsed Event. After raw events are processed to collate start and end events, as well as arbitrate event levels, the parsed events are written out. A parsed event has the following information: mote ID; sensor number; event start time; duration; and event level.

Episode. An Episode is defined to have occurred when two Parsed Events occur at nearest neighbors on a single detection sensor within a given time window. The Episode Parser looks at the Parsed Events to decide if the above criteria are met. Parsed Events are generated, for example, when a person walking past a mote triggers events on multiple sensors while passing by. When two Parsed Events are linked in time and space, better information is obtained regarding the person in the field of view, allowing directional information to be derived at this point. An Episode has the following information: mote ID; starting sensor number; second sensor number; Episode start time; and duration.

Vector. A vector in this system is the combination of geometric data from the System Configuration files and Episode data. From the data in the System Configuration file, the Vector Parser can locate the episode in the monitored space and derive the heading or direction of the episode. In the reporting aspects, the magnitude of the vector can be a summation of the number of Episodes at that location or a total duration. A Vector has the following information: mote ID; location; heading; magnitude; Vector Number; Vector start time; and duration.

Link. A link is determined by processing each Vector in time order looking for Vectors that correlate to a valid path a person might take when walking through the sensor field. For example, if Vector number 1 has a heading of "north" then the system would look for Vectors north of Vector number 1 that occur within a valid time period that is dependant on the distance from Vector number 1 to Vector number 2. If such a condition is met, then the system can create a Link between these Vectors. Physical barriers also must be considered in this phase, as it is not possible for people to walk through walls. A Link has the following information: Link Number; Starting Vector Number; Second Vector Number; heading; and Start Time.

Path. A path is determined by processing each Link in time order looking for Links that correlate to a valid path a person might take when walking through the sensor field. When two Links or more can be combined then a valid Path is said to exist through the sensor field. Again, physical realities must be part of the algorithm. A Path has the following information: Path Number; Number of Links included; Starting Link Number; Second Link Number, Etc.; and Start Time.

Heartbeat. A heartbeat is a periodic response by a microprocessor system to indicate that the system and software are still running correctly. For example, a blinking LED can be a heartbeat message. This system can also use the heartbeat to send specific data to the Mote Interface Board regarding the functionality of the network communications. The heartbeat can be used to send information relating to the state of the baselining function.

Table 13 provides data level definitions for the system, including information for events and paths.

TABLE 13

| Data Level Definitions |
|---|
| Level 0 - Data Collection Infrastructure.<br>This is the hardware and software required to poll the sensors and transport the data to a central point. The Mote software, TinyOS radio network, and the current PC software to collect the data are part of this. |
| Level 1 - Data derived from a single sensor.<br>This is the information the system can extract from a single sensor in the system. This includes:<br>Activity in a given region of space.<br>Length of time an object stays in the detection area.<br>Aggregate values of the above. |
| Level 2 - Data derived from multiple sensors in a single detection sensor<br>This is the type of information the system can extract from a single stanchion. Examples is include:<br>Direction of object movement. (left or right)<br>Speed of moving object.<br>Dwell time of an object in stanchion sensing area. |
| Level 3 - Data derived from multiple detection sensors<br>This is the information that the system can extract from having multiple motes in the field and relating that information with the physical constraints of the environment. Examples include:<br>Net number of people through a constrained region. (Hallway)<br>Population at a given time in a constrained area.<br>Identify pathways with high traffic flows.<br>Individual tracking.<br>Store layout information is needed for some of the above. |
| Level 4 - Data derived from multiple detection sensors with knowledge of outside stimulus<br>Here the data that system collected and extracted above is correlated with outside factors to determine things such as:<br>Ad effectiveness<br>Weather effects<br>Time of day effects<br>Weekly patterns<br>Special events effects |
| Level 5 - Data derived from multiple installations<br>This is where the system starts to develop information about behavior. The system extracts information about how people and retail spaces interact. Examples are:<br>Preferences in turning left or right.<br>Velocity as a function of entry depth<br>Velocity as a function of space configuration<br>Ad placement. |

TABLE 13-continued

| Data Level Definitions |
| --- |
| Level 6 - Consequences of behavior<br>Here the system starts providing a high level of knowledge to customers. The system starts looking at how to utilize behavior trends, and how to change that behavior. This can impact:<br>Ad design<br>Lighting, sound, and other soft factors. |

2. Automatic Installation of Wireless Network Sensors

Applications of wireless network sensors can be used to collect information about people traffic patterns in buildings (e.g., retail stores, offices, sporting events) using low cost networks of sensing devices. The generic term for these systems is "Informatics".

One significant cost for systems with large numbers of sensing devices is the time required to setup and configure those systems. While the anticipated use of low cost, low power, wireless devices greatly reduces the cost of physical installation through the elimination of wiring, there is still a considerable investment required to configure the computer system used to collected information from the sensors. Generally, each sensor must be physically configured within the system configuration files through multiple keyboard steps and may also be further configured on a type of graphical display human-machine interface (HMI) package. If the intended usage of the informatics systems is in a temporary installation, (i.e. collect the required information, study it, make recommendation and move on), then the configuration cost becomes a significant issue.

Another significant issue for systems with large numbers of sensing devices is separating out "alarm" or "important" events from the large volumes of data collected. Typical approaches require the alarm condition for each sensor to be manually configured (i.e., alarm when the temperature is above 35° C.). In addition, to be truly useful, logic for the qualification of the alarm condition is often required (i.e., alarm when the temperature is about 35° C. and time of day is later than 8 AM and day of week is Monday to Friday).

An exemplary embodiment is to include a GPS (Global Positioning System) integrated circuit chip (module) in each sensing element. When a sensor is activated within an informatics network, it can then report what type of information it can provide as well as its position (latitude, longitude, elevation). Software provided with the system can then use standard computer aided drawing (CAD) type drawings for the building to locate sensors and configure the system, given one datum point on the drawings. The inclusion of GPS electronics in most cellular telephones has greatly reduced the cost of this technology and from a power management perspective, the device only needs to operate when the sensor is first installed.

Another exemplary embodiment comprises software that collects sensor information over a period of time and determines what the "normal" patterns of operation are. This software would be aware of the current date, time, day of week and holidays, allowing it to model "normal" behavior as seen by the sensors at any given time of day and date. As the system learns what normal behavior resembles, it will then be able to alert an operator to abnormal (or alarm) conditions without the requirement of manually programming those conditions. In a typical monitoring system, simply knowing that something has changed in an unexpected manner is the most significant piece of information needed by an operator. Determining the cause of that change almost always requires manual inspection and intervention and is not necessarily capable of automation. For example, sudden increases in foot traffic through the rear exit of a building might indicate a hazard at the normal exit to the building or possibly a theft situation. While someone would have to manually observe the situation, the advantage to the system is that they would be aware of the situation in the first place.

As described, the system could help lower the cost of installing and operating an informatics network to the point where it becomes cost effective to deploy in a wide range of applications, broadening the basis from which to derive revenue.

3. Wireless Network Sensor Tile Processing

This embodiment is a method of processing and displaying the results of traffic being monitored by sensors. The method described presents an algorithm to define tiles, process sensor data at the intersections of tiles, and process and display the flow of sensor data through a series of tiles/intersections. The algorithm can be implemented in, for example, software or firmware for execution by processor 198.

Figure 46:
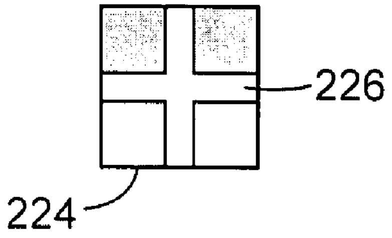
FIG. 46 is a diagram illustrating use of a tile to process and display data received from wireless network sensors.
Figure 47:
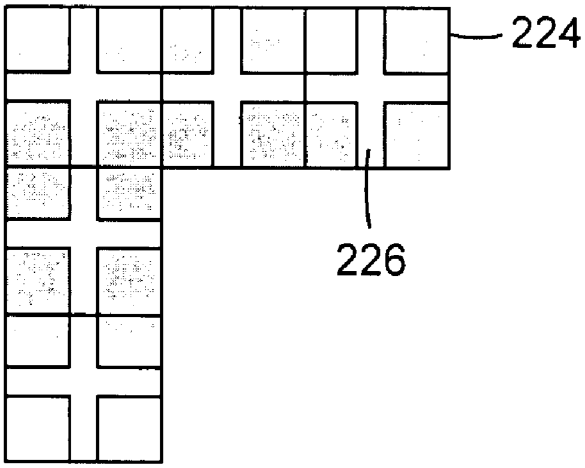
FIG. 47 is a diagram illustrating use of multiple tiles with identical paths to process and display data received from wireless network sensors.

A generic intersection can be defined as a "tile". The most generic tile would comprise 4 entrances/exits as indicated in FIG. 46. A generic tile 224 includes paths 226. The system needs to create a map (using tiles) that corresponds to the physical intersection being monitored, which can be accomplished by connecting "tiles". FIG. 47 is a diagram illustrating use of multiple tiles 224 with identical paths 226 to process and display data received from wireless network sensors.

Figure 48:
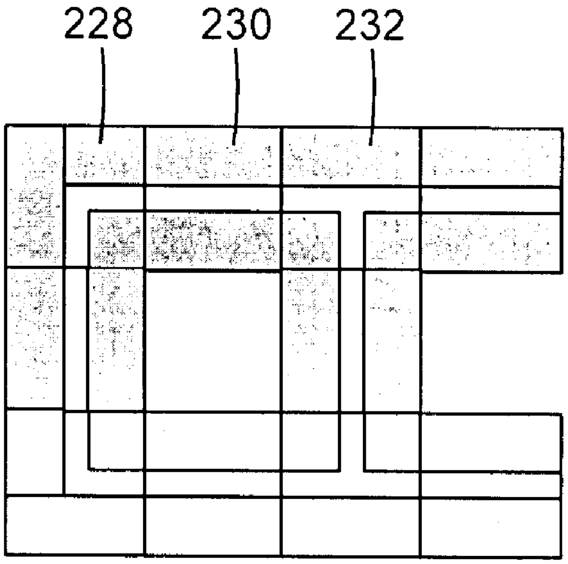
FIG. 48 is a diagram illustrating use of multiple tiles with different paths to process and display data received from wireless network sensors.

The system needs the ability to programmatically "connect" tiles at their points of intersection and to "disable" connects when not all directions are possible or are being studied. This will allow the system to simplify the data analysis so that it does not need to analyze points that are not useful or valid. This ability would allow the system to build intersections as indicated in FIG. 48, illustrating use of multiple tiles 228, 230, and 232 with different paths to process and display data received from wireless network sensors. Tile 228 has an L-shaped path. Tile 230 has a straight path. Tile 232 has a T-shaped path.

One way to implement this is to use a single, generic template with the ability to specify origin, direction (orientation), and which value(s) is zero indicating that there is no data present in that direction. From this, the system could determine that all four intersections are active, that one or more are inactive, and orientation.

The system also needs the ability to "connect" the tiles such that an intersection on one tile is "connected" to an intersection on the next tile and it would expect sensor events to cross this intersection boundary. In fact, the system will look for events to cross the defined intersection boundaries and will ignore intersections that are not defined and have no data.

The system can make use of a toolbar mechanism that allows the user to select and drag a tile to the specific location and then define the connections. This can either be done by the choice of tiles that the user has (every combination is defined and so the connections are a function of defined intersections on the tile connected to all adjacent tile intersections) or by selecting a generic tile and then defining active intersections and orientation.

The system typically tracks the following information for each event: Time; Event number (for this sensor or for all sensors); Sensor type; Sensor value(s) (which will give direction); and Location at time of event (tile # and intersection #).

For each tile, the system typically needs the ability to track the following: Tile number or other tile identifier; Tile intersections that are active, meaning an event was detected at those intersections; and Tile intersections that are connected to another tile (and that tile number).

It is desired to be able to visualize the flow of sensor data through time sequence or event sequence, meaning that it is desired to visualize the flow of events as they happened. The events can be visualized in "real time" or processing a log of events.

One way to process events is to store the data as matrices and match the matrices to the connectivity map. At any given tile-intersection combination, the system would possibly have an event moving into the tile or out of the tile. In either case, the system wants to know what tile-intersection the event is originating from and advancing to. One method involves stepping through the matrices at each time interval and follow that an event at t=0 location (tile A, intersection A) moved to location (tile B, intersection B) at t=1, and moved again to location (tile C, intersection C) at t=2, etc., and the system would put an indicator on the connectivity map to track the event movements. An event can either move into a tile, out of a tile, or stay within a tile to be moving across a tile (i.e., across the center of the tile.)

This will require that the system can track a specific event from a specific tile-intersection to a new tile and a new intersection (and the system will have to validate that the new intersection is connected to the old intersection) and then look for the data in the next process cycle at the new location. The result of this processing will be a vector (with direction) and a scalar (i.e., the count) for each defined intersection. This is the data that can be visually shown on the connectivity map.

To speed up processing, the system may consider predicting where the next event will occur and look there first, and if it is not found there, it will then need to perform a more exhaustive search to find the event. In addition, the system will want to make use of the fact that many of the matrices will be sparse so that it does not need to examine all possibilities.

Figure 49:
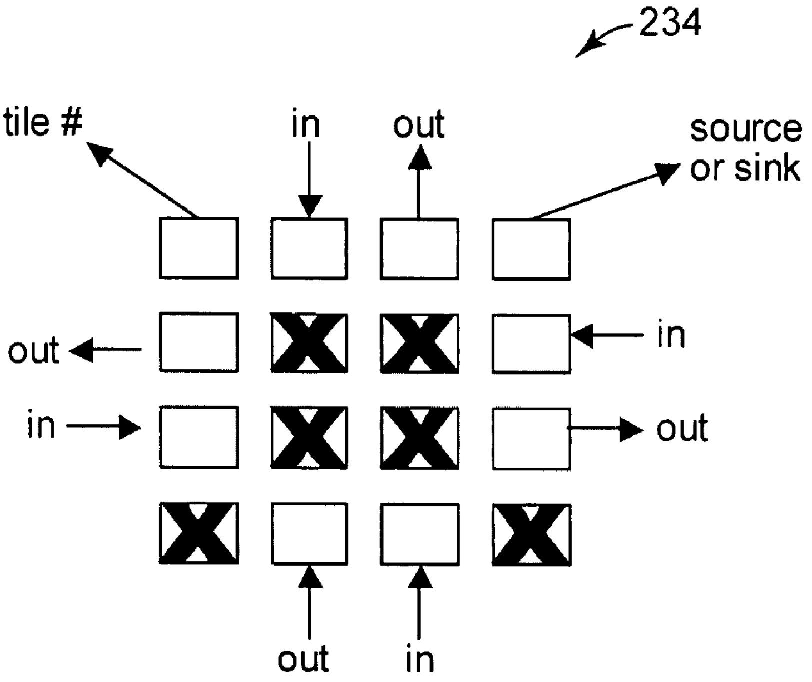
FIG. 49 is a diagram illustrating a first type of display of data from tiles.
Figure 50:
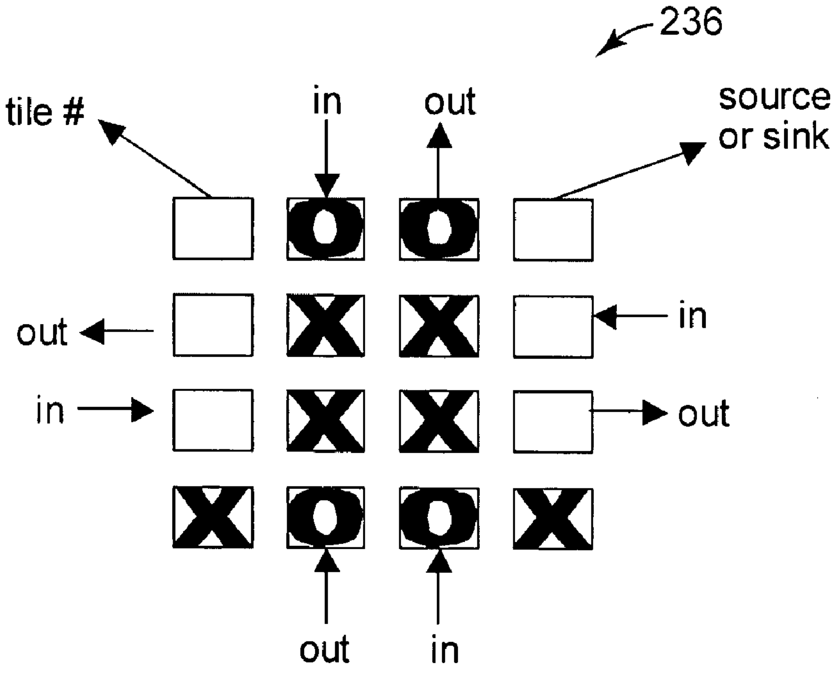
FIG. 50 is a diagram illustrating a second type of display of data from tiles.

The ultimate data result is "flux". Flux represents total counts through intersections or through sequences of intersections. The following sample matrix definitions are possible for implementing the processing. FIG. 49 is a diagram illustrating a first type of display of data 234 from tiles, and FIG. 50 is a diagram illustrating a second type of display of data 236 from tiles. As illustrated in FIGS. 49 and 50, "X's" indicate that the field is not used at this time. "O's" indicate that there is no data for this field (i.e., there is no possibility of data here because there is no intersection here). Fully populated, this matrix would describe a complete, 4-way intersection. A variant intersection would be described using O's at the in/out fields.

4. Vector Determination from Wireless Network Sensor Data

This embodiment is a method to derive directional information from simple sensor readings. The system uses signals from a sensor to determine if an object is present and then by evaluating neighboring sensors it determines if this object has previously been detected. The method allows the user to determine a direction of travel of an object in an open space from simple sensor readings.

Figure 51:
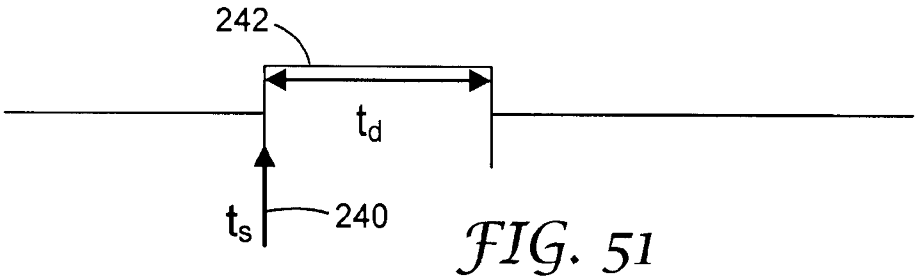
FIG. 51 is a timing diagram illustrating detection of an event using a wireless network sensor.

The sensor is configured to produce a "high" or "true" signal when an object is in the detection field. The signal remains high until the object leaves the detection field. In these examples the system uses a photo resistor with an optical aperture to limit the field of view of the device. FIG. 51 is a timing diagram illustrating detection of an event using a wireless network sensor. A sample signal is presented below showing the result of an object entering the detection field at time $t_s$ (240) and remaining in the detection field for time $t_d$ (242).

Figure 52:
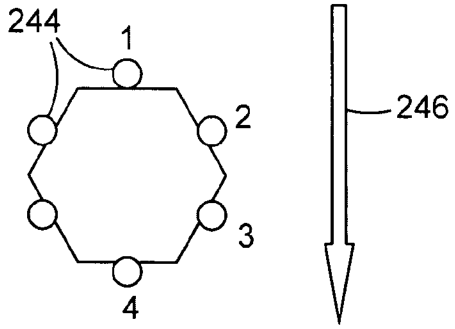
FIG. 52 is a diagram illustrating detection of an event using a person sensing stanchion.
Figure 53:
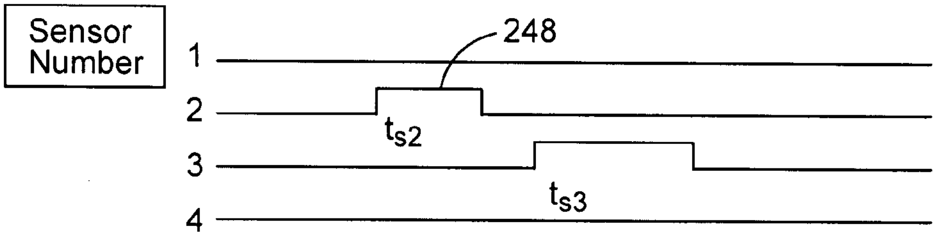
FIG. 53 is a timing diagram illustrating detection of events using multiple wireless network sensors.

FIG. 52 is a diagram illustrating detection of an episode using a person sensing stanchion such as the one described above. In this example, the sensors 244 are arranged in a small circle observing out from the center at 60° intervals. The arrow 246 represents the path an object might follow past the sensor collectors. The signals that this path would produce are represented in FIG. 53, which is a timing diagram illustrating detection of events using multiple wireless network sensors. A pair of parsed events that can be translated into a direction vector is called an episode. (Parsed events and episodes are more fully described below.) The search for an episode begins during a quiescent period, and proceeds forward in time. At time $t_{s2}$ an event is detected on sensor 2. This starts a timer and the method determines the neighbors of sensor 2. In this case the neighbors are sensor 1 and sensor 3. The method now monitors sensors 1 and 3 for parsed events. When a parsed event is detected on sensor 3 a number of decisions must be made. First, has the parsed event occurred within a valid time window, such as window 248. This means that ts3 must not occur too quickly or too late to be the result of a single object following the path above. If the signals represent a valid path, then a vector representing that episode can be generated and displayed on a screen. Over a given time period all of the valid episodes can be collected and then the resultant vectors can be scaled to show number of episodes. In addition, the total duration of an episode can be collected and this data can provide the magnitude information for the vectors.

Figure 54:
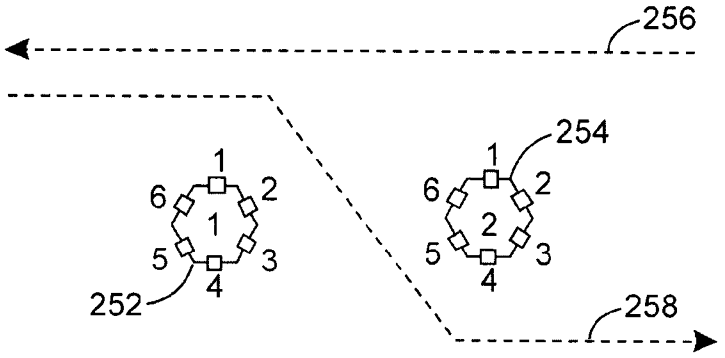
FIG. 54 is a diagram illustrating detection of events using multiple person sensing stanchions.

FIG. 54 is a diagram illustrating detection of events using multiple person sensing stanchions 252 and 254 within paths 256 and 258. Using a number of wireless network sensors collecting information concerning events in an area, a picture or diagram of the flow of objects in that area can be derived. If the objects in question were people in a retail store, this information could help the storeowner understand how traffic flows through his store and why some items sell better than others. If people do not walk past the product, it is difficult for them to purchase the product.

Figure 55:
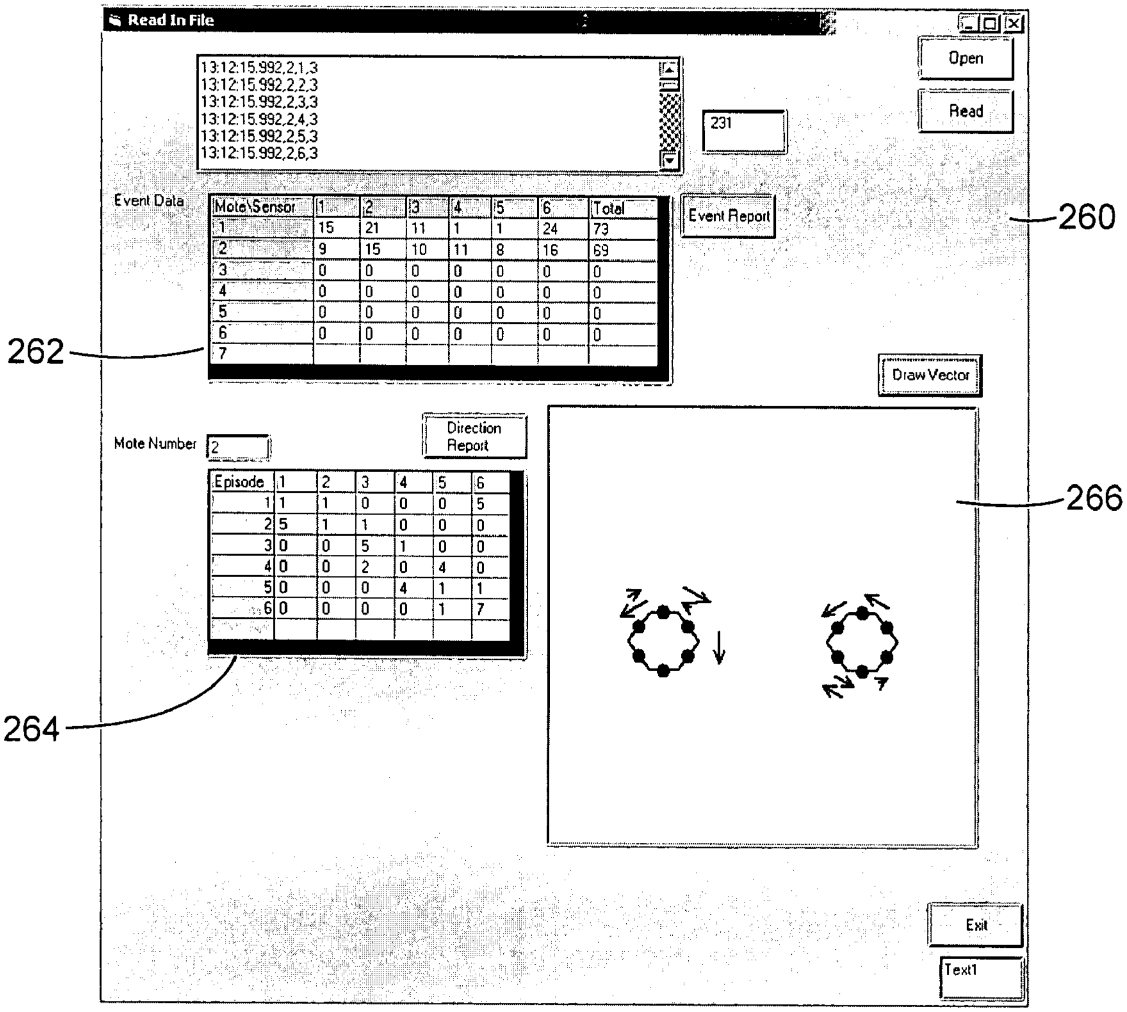
FIG. 55 is a diagram of a user interface for displaying information relating to events detected from wireless network sensors.

FIG. 55 is a diagram of a user interface 260 for displaying information relating to vectors detected from wireless network sensors. User interface 260 includes a section 262 for displaying sensor events, a section 264 for displaying episodes, and a section 266 for displaying vectors. User interface 260 can be displayed on a display device such as device 192. Table 14 provides exemplary code used to extract vector information; this code can be implemented in system 186 for execution by processor 198.

TABLE 14

Sample code used to extract vector information from sensor data.

```
Private Sub cmdRead_Click( )
    Rem First find length of file
    numlines = 0
    Do While Not EOF(1)
        numlines = numlines + 1
        Line Input #1, MyChar
    Loop
    ' Output file length
    txtNumLines.Text = Str(numlines)
    ' Go to top of file
    Seek #1, 1
    FirstLine = True
    ' Start reading data line by line
    For i = 1 To numlines
        Line Input #1, strLine
        strAll = strAll & strLine & vbCrLf
        txtOutput.Text = strAll
        StrPos = InStr(strLine, ",")
        strTime = Left(strLine, StrPos - 1)
        StrPos1 = InStr(strTime, ":")
        strHour = Left(strTime, StrPos1 - 1)
        StrPos2 = InStr(StrPos1 + 1, strTime, ":")
        strMin = Mid(strTime, StrPos1 + 1, (StrPos2 - StrPos1 - 1))
        strSecond = Mid(strTime, StrPos2 + 1)
        strMote = Mid(strLine, StrPos + 1, 1)
        strSensor = Mid(strLine, StrPos + 3, 1)
        strEvent = Mid(strLine, StrPos + 5, 1)
        curSecond = 3600 * Val(strHour) + 60 * Val(strMin) + Val(strSecond)
        valMote = Val(strMote)
        valSensor = Val(strSensor)
        valEvent = Val(strEvent)
        ' find start time and store away
        If FirstLine = True Then
            FirstLine = False
            startSecond = curSecond
        End If
        ' Add up events per sensor
        If valEvent > 0 Then
            moteArray(valMote, valSensor) = moteArray(valMote, valSensor) + 1
        End If
        ' Start Processing of Episodes
        ' If any timers have expired without seeing a neighboring event,
        ' count this as a Single.
        For mote = 1 To moteCount
            For sensor = 1 To sensorCount
                If (myTimer(mote, sensor) > 0 And (curSecond - myTimer(mote, sensor)) >
eventDelay) Then
                    Call UpdateSingles(mote, sensor)
                End If
            Next sensor
        Next mote
        'Handle two temporally close events on the same sensor -- these are either two
        '    people following each other closely or the same person triggering
        '    an event of a higher level.
        If valEvent = 0 Then
            runningValue(valMote, valSensor) = 0
        ElseIf runningValue(valMote, valSensor) = 0 Then
            'valEvent > 0 and runningValue = 0. This should be treated as the
            '    start of a new event. Check the state of the timer.
            If myTimer(valMote, valSensor) > 0 And possEvent(valMote, valSensor) = False
Then
                'if the timer is already running on this sensor, write out the old event
                vectorCount = vectorCount + 1
                episodeCount = episodeCount + 1
                Call writeout(myTimer(valMote, valSensor), valSensor, valSensor, 0#,
episodeCount)
                direction(valMote, valSensor, valSensor) = direction(valMote, valSensor,
valSensor) + 1
            End If
            myTimer(valMote, valSensor) = curSecond
            'start the timer on this new event
            runningValue(valMote, valSensor) = valEvent
            possEvent(valMote, valSensor) = (valEvent = 1)
        Else
            'valEvent > 0 and runningValue > 0
            runningValue(valMote, valSensor) = valEvent
            possEvent(valMote, valSensor) = (valEvent = 1)
            'We can't actually get here unless valEvent > 1.
```

TABLE 14-continued

Sample code used to extract vector information from sensor data.

```
        'Leave the timer with its old value
      End If
      If valEvent > 0 Then
        oneHigherSensor = HigherSensor(valSensor, sensorCount)
        oneLowerSensor = LowerSensor(valSensor, sensorCount)
        If myTimer(valMote, oneHigherSensor) > 0 Then
          vectorCount = vectorCount + 1
          interval = myTimer(valMote, valSensor) − myTimer(valMote, oneHigherSensor)
          Call writeout(myTimer(valMote, oneHigherSensor), oneHigherSensor,
valSensor, interval, −1)
          direction(valMote, oneHigherSensor, valSensor) = direction(valMote,
oneHigherSensor, valSensor) + 1
          myTimer(valMote, oneHigherSensor) = 0
          possEvent(valMote, oneHigherSensor) = False
          possEvent(valMote, valSensor) = False
        ElseIfmyTimer(valMote, oneLowerSensor) > 0 Then
          vectorCount = vectorCount + 1
          interval = myTimer(valMote, valSensor) − myTimer(valMote, oneLowerSensor)
          Call writeout(myTimer(valMote, oneLowerSensor), oneLowerSensor,
valSensor, interval, −1)
          direction(valMote, oneLowerSensor, valSensor) = direction(valMote,
oneLowerSensor, valSensor) + 1
          myTimer(valMote, oneLowerSensor) = 0
          possEvent(valMote, oneLowerSensor) = False
          possEvent(valMote, valSensor) = False
        End If
      End If
    Next i
End Sub           ' cmdRead
```

5. Event Parser for Wireless Network Sensors

This embodiment is a method and software for taking event data, which are potentially incomplete, and turning them into parsed event data. Parsed event data are generated from sets of at least one up event and one down event, on the same sensor, that are associated with the passage of a detected object in front of the sensor.

An event occurs when the signal level on a sensor changes with sufficient speed and magnitude to be of interest; i.e., to be likely to be caused by an object moving in the field of view of the sensor rather than by environmental changes. It is recorded when the difference between the current reading and the baseline exceeds or drops below either a fixed detection level or a set fraction of the baseline value. Either single or multiple threshold values (i.e., event levels) may be used.

Event data has the following information: mote ID; sensor number; event level; and event time. The mote ID is a unique identification number assigned to the "mote" (wireless network sensor without the sensors, e.g., photo resistors) to which the sensor of interest is attached. The sensor number identifies which of the sensors on the mote detected the event as multiple sensors can be attached to a single mote. The event level is the threshold region the sensor signal has entered. If a single threshold value is used, this will be either 1 (difference between current signal and baseline has exceeded the threshold) or 0 (difference between current signal and the baseline has dropped below the threshold.) If multiple threshold values are used, this will be whatever number corresponds to the threshold region of the signal. For example, the system can generally use an Off-Low-Medium-High scheme, so the levels are 0-1-2-3. The event time is the clock time at which the event was detected. The software for processing raw sensor data into event data resides on the individual motes.

Event data may be incomplete if, for example, there is external interference with the wireless communications network, or there is so much activity that not all of the detected events can be transmitted. Thus, not all up or down events necessarily reach the central data collection location. It is necessary to filter the data to discard unpaired up or down events. This is done by the event parser software.

Parsed event data has the following information: mote ID and sensor number; parsed event start time; duration; and event level. The mote ID and sensor number are same as for event data. The parsed event start time is clock time of the first up event in the set of associated events. The duration is the time of the last down event minus the time of the first up event. Even when multiple levels of up events are used, the system reports only the final down event (when the system crosses back under the "low" threshold) to conserve system resources. In this case the last down event is also the only down event. The event level, in a multilevel system, is the highest level achieved by an up event in the current set of associated events. Table 15 illustrates the algorithm for parsing event data, which can be implemented in software in system 186 for execution by processor 198.

TABLE 15

Basic algorithm

```
Read in data line by line
If there is an open event on the current sensor, calculate how long it has
been open.
    Error if the time comes out negative
If this is the close of an event, write it out.
    Error if there are two zeroes in a row
If this is the start of an event, record the time and the level
If this is a higher level of an open event, update the level and leave the
time alone
    Error if the maximum allowed event duration has been exceeded
```

Parsed events are written out to the parsed event file. Errors are recorded in a separate file. The program may also collect total statistics for each sensor, such as the total number of objects detected or the total time spent by all objects in front of the sensor, for use in generating various reports. The program can also handle special sensor arrangements. For example, with wall mount detection sensors such as those described above, the sensors are arranged in pairs and the system generally will perform a logical OR operation on the data from the two sensors in a pair. The odd and even numbered sensors in the pair are jointly considered a single sensor which is assigned the number of the original odd sensor. An event begins when either sensor in the pair first detects an up event, and ends when both sensors in the pair return to 0.

This embodiment filters data obtained from a wireless sensor network such that incomplete data do not confuse further analysis. The embodiment reduces the volume of data to be handled by combining a set of up and down events (from two to four lines of data in the current multi-level implementation) into a single line of data. The embodiment makes it more straightforward to generate reports of object counts and dwell times. Tables 16 and 17 provide sample input and output data, respectively. Table 18 provides sample code for the algorithm, and this code can be implemented in system 186 for execution by processor 198.

TABLE 16

Sample input data:

| Mote | Sensor | State | Missed | | |
|---|---|---|---|---|---|
| 104 | 1 | 0 | 0 | 06/29/2006 | 09:15:39.945 |
| 104 | 2 | 1 | 0 | 06/29/2006 | 09:15:43.661 |
| 104 | 2 | 0 | 0 | 06/29/2006 | 09:15:44.161 |
| 104 | 2 | 1 | 0 | 06/29/2006 | 09:15:53.054 |
| 104 | 2 | 0 | 0 | 06/29/2006 | 09:15:53.785 |
| 104 | 1 | 1 | 0 | 06/29/2006 | 09:16:07.024 |
| 104 | 1 | 0 | 0 | 06/29/2006 | 09:16:07.295 |
| 103 | 2 | 1 | 0 | 06/29/2006 | 09:16:08.046 |
| 103 | 1 | 1 | 0 | 06/29/2006 | 09:16:08.546 |
| 103 | 1 | 0 | 0 | 06/29/2006 | 09:16:08.787 |
| 103 | 2 | 2 | 0 | 06/29/2006 | 09:16:12.282 |
| 103 | 2 | 0 | 0 | 06/29/2006 | 09:16:13.543 |
| 103 | 2 | 1 | 0 | 06/29/2006 | 09:16:23.027 |
| 103 | 2 | 0 | 0 | 06/29/2006 | 09:16:23.277 |
| 103 | 2 | 1 | 0 | 06/29/2006 | 09:16:26.012 |
| 103 | 2 | 2 | 0 | 06/29/2006 | 09:16:28.776 |
| 103 | 2 | 0 | 0 | 06/29/2006 | 09:16:31.569 |
| 104 | 1 | 1 | 0 | 06/29/2006 | 09:16:40.533 |
| 104 | 1 | 0 | 0 | 06/29/2006 | 09:16:40.783 |
| 104 | 1 | 1 | 0 | 06/29/2006 | 09:16:51.047 |
| 104 | 1 | 0 | 0 | 06/29/2006 | 09:16:51.288 |
| . . . | | | | | |
| 103 | 2 | 0 | 0 | 06/29/2006 | 09:25:35.562 |
| 2 | 2 | 0 | 0 | 06/29/2006 | 09:25:36.092 |
| 102 | 5 | 1 | 0 | 06/29/2006 | 09:25:36.122 |
| 2 | 4 | 0 | 0 | 06/29/2006 | 09:25:35.672 |
| 102 | 5 | 0 | 0 | 06/29/2006 | 09:25:35.932 |
| 102 | 5 | 1 | 0 | 06/29/2006 | 09:25:36.062 |
| 103 | 1 | 2 | 0 | 06/29/2006 | 09:25:35.843 |
| 103 | 2 | 1 | 0 | 06/29/2006 | 09:25:35.843 |
| 103 | 2 | 0 | 0 | 06/29/2006 | 09:25:36.093 |
| 103 | 1 | 0 | 0 | 06/29/2006 | 09:25:36.343 |
| 103 | 1 | 1 | 0 | 06/29/2006 | 09:25:36.593 |
| 102 | 5 | 0 | 0 | 06/29/2006 | 09:25:36.213 |
| 103 | 1 | 0 | 0 | 06/29/2006 | 09:25:36.794 |

TABLE 17

Sample output data:

Min. Value = 1

| | start | Max. Interval = 10 | | Combined Sensors = True | | | |
|---|---|---|---|---|---|---|---|
| count | date | start time | type | mote | sens | val | duration |
| 1 | 6/29/06 | 09:15:43.661 | WallMount | 104 | 1 | 1 | 00.500 |
| 2 | 6/29/06 | 09:15:53.054 | WallMount | 104 | 1 | 1 | 00.731 |
| 3 | 6/29/06 | 09:16:07.024 | WallMount | 104 | 1 | 1 | 00.271 |
| 4 | 6/29/06 | 09:16:08.046 | WallMount | 103 | 1 | 2 | 05.497 |
| 5 | 6/29/06 | 09:16:23.027 | WallMount | 103 | 1 | 1 | 00.250 |

TABLE 17-continued

Sample output data:

Min. Value = 1

| | start | Max. Interval = 10 | | Combined Sensors = True | | | |
|---|---|---|---|---|---|---|---|
| count | date | start time | type | mote | sens | val | duration |
| 6 | 6/29/06 | 09:16:26.012 | WallMount | 103 | 1 | 2 | 05.557 |
| 7 | 6/29/06 | 09:16:40.533 | WallMount | 104 | 1 | 1 | 00.250 |
| 8 | 6/29/06 | 09:16:51.047 | WallMount | 104 | 1 | 1 | 00.241 |
| 9 | 6/29/06 | 09:16:53.581 | WallMount | 101 | 5 | 1 | 00.721 |
| 10 | 6/29/06 | 09:16:56.866 | WallMount | 101 | 3 | 3 | 01.452 |
| 11 | 6/29/06 | 09:17:01.522 | Stanchion | 4 | 1 | 1 | 00.250 |
| 12 | 6/29/06 | 09:17:02.804 | Stanchion | 4 | 1 | 1 | 00.482 |
| 13 | 6/29/06 | 09:17:02.974 | Stanchion | 1 | 4 | 3 | 01.182 |
| 14 | 6/29/06 | 09:17:06.579 | Stanchion | 2 | 5 | 1 | 00.972 |
| 15 | 6/29/06 | 09:17:07.301 | WallMount | 104 | 1 | 1 | 00.500 |
| . . . | | | | | | | |
| 570 | 6/29/06 | 09:25:35.312 | WallMount | 103 | 1 | 2 | 00.250 |
| 571 | 6/29/06 | 09:25:30.614 | Stanchion | 2 | 2 | 3 | 05.478 |
| 572 | 6/29/06 | 09:25:35.371 | Stanchion | 2 | 4 | 1 | 00.301 |
| 573 | 6/29/06 | 09:25:35.843 | WallMount | 103 | 1 | 2 | 00.500 |
| 574 | 6/29/06 | 09:25:36.062 | WallMount | 102 | 5 | 1 | 00.151 |
| 575 | 6/29/06 | 09:25:36.593 | WallMount | 103 | 1 | 1 | 00.201 |

TABLE 18

The following code illustrates the algorithm

```
string ISensor.AddEvent(DateTime time, int value)
{
 string errorMsg = string.Empty;
 switch (m_eventState)
 {
  case EventState.parsedEventCompleted:
   errorMsg = startNextParsedEvent(time, value);
   break;
  case EventState.inParsedEvent:
   errorMsg = processNextEvent(time, value);
   break;
  case EventState.abortingParsedEvent:
   waitForEndOfParsedEvent(time, value);
   break;
 }
private string startNextParsedEvent(DateTime time, int value)
{
 string errorMsg = string.Empty;
 if (value == 0)
 {
  m_twoZeroErrors++;
  return cErrorTwoZeroEvent; // Error: two successive events of value '0'
 }
 else
 {
  if (value < m_minEventValue)
  {
   m_lowEvents++;    // Low Event: event value did not reach
   minimimum
  }
  m_parsedEventstartTime = time; // Initialize the next parsed event
  m_highestEventValue = value;
  m_previousEventTime = time;
  m_eventState = EventState.inParsedEvent;
  return errorMsg;
 }
}
private string processNextEvent(DateTime time, int value)
{
 TimeSpan interval = time - m_previousEventTime;
 if (interval.TotalMilliseconds < 0)
   { return negativeDurationEventDetected(value, ref interval); }
 if (value == 0) { return completeTheParsedEvent(time); }
 if (interval.TotalSeconds > m_maxEventInterval)
   { return longEventDetected(value, ref interval); }
 else { return continueTheParsedEvent(time, value); }
}
```

TABLE 18-continued

| The following code illustrates the algorithm |
|---|

```
private void abortTheParsedEvent(int value)
{
 if (value == 0) { m_eventState = EventState.parsedEventCompleted; }
 else { m_eventState = EventState.abortingParsedEvent; }
}
```

6. Episode Parser for Wireless Network Sensors

This embodiment is a method and software for taking Parsed Event data and turning them into Episode data. Episodes are generated from exactly two Parsed Events, on adjacent sensors on the same detection sensor, that are associated with the passage of a detected object in front of the sensors.

Determination of an Episode occurs as follows. An Episode occurs on adjacent sensors of the same detection sensor. The start of the later Parsed Event must occur within a specified time (Event Window) of the start of the earlier Parsed Event. The earlier Parsed Event must end prior to the end of the later Parsed Event. Each earlier Parsed Event participates in at most one Episode. Once matched with a later Parsed Event to form an Episode, the earlier Parsed Event is discarded. However, the later Parsed Event may become the earlier Parsed Event in a new episode. Should a later Parsed Event be adjacent to two (or more, depending on the nature of the detection sensor) earlier Parsed Events, both (all) earlier Parsed Events are discarded and no Episode is identified. The later Parsed Event may still become the earlier Parsed Event in a new Episode, however.

Figure 56:
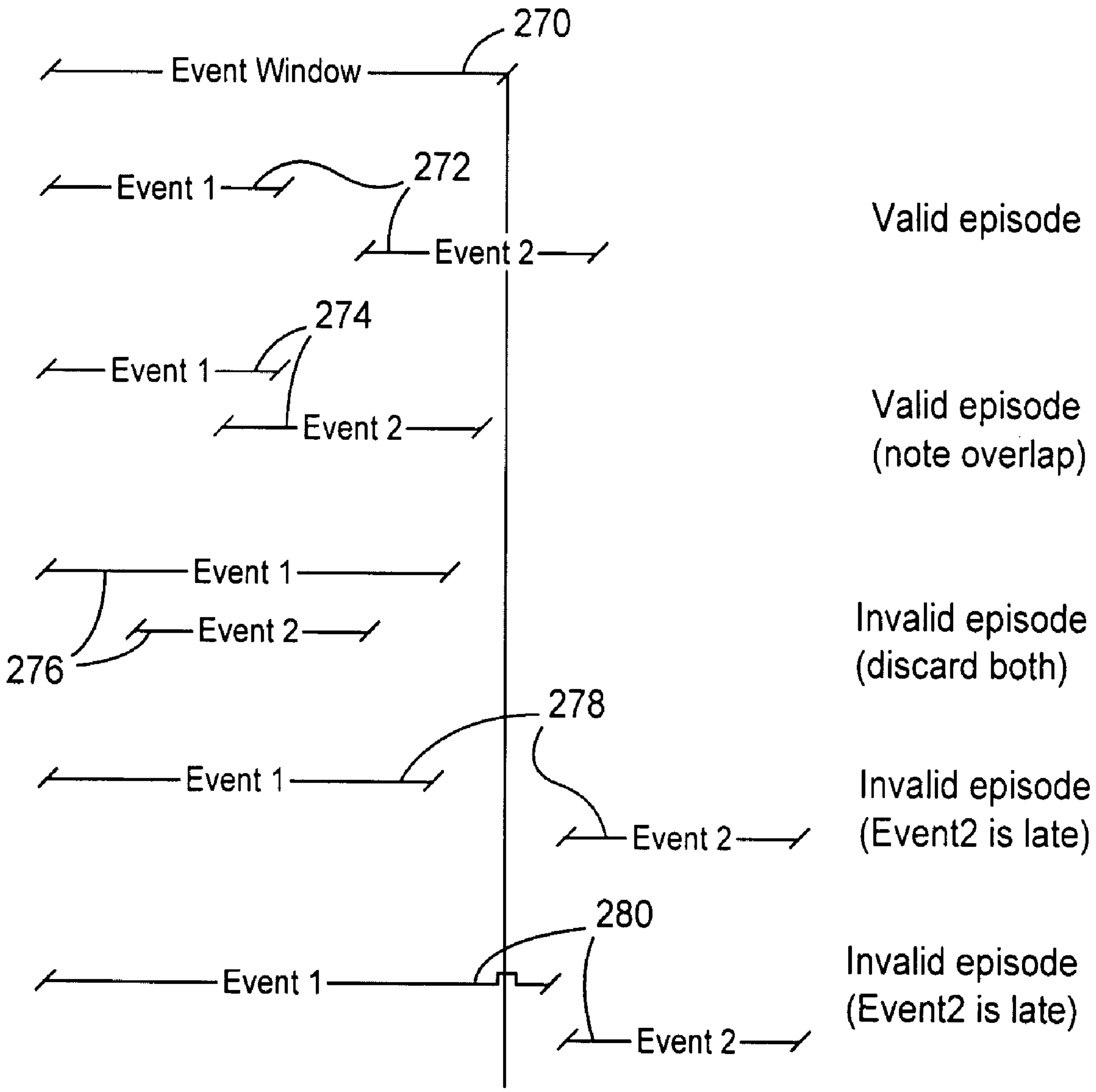
FIG. 56 is a diagram illustrating detection of episodes using wireless network sensors.
Figure 57:
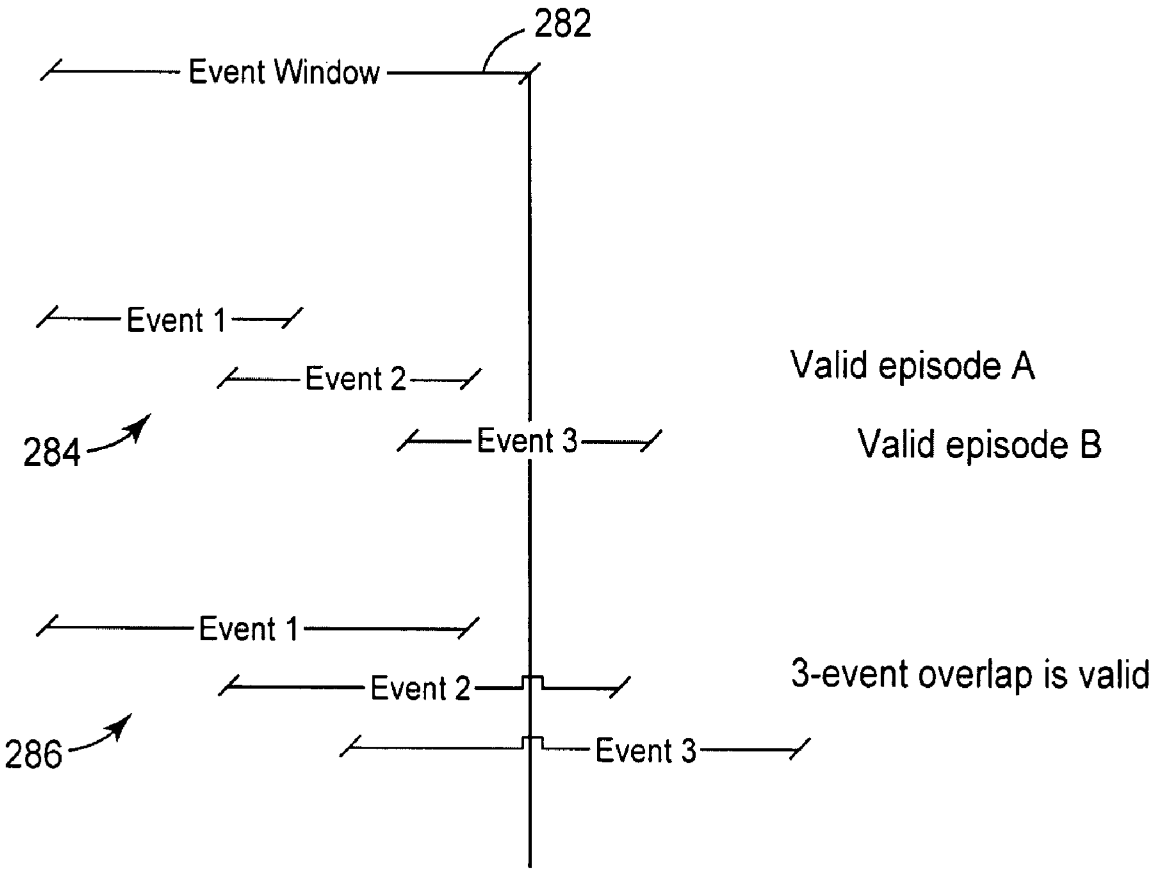
FIG. 57 is a diagram illustrating detection of episodes using wireless network sensors.

These conditions are illustrated schematically in FIGS. 56 and 57. FIG. 56 is a diagram illustrating detection of episodes using wireless network sensors. Within an event window 270, the episodes are detected among events 272 (valid episode), 274 (valid episode), 276 (invalid episode), 278 (invalid episode), and 280 (invalid episode). FIG. 57 is a diagram illustrating detection of episodes using wireless network sensors. Within an event window 282, the episodes are detected among events 284 (two valid episodes) and 286 (two valid episodes).

Parsed Event data has the following information: Parsed Event start time and date; mote ID and sensor number; total duration of the Parsed Event; and event level. In a multilevel system, the final event level is the highest level achieved by an up event in the current set of associated events.

Episode data contains the following information fields: Episode start time and date (taken from earlier Parsed Event.); mote ID; first (earlier) and second (later) sensor numbers; and duration (time between start of earlier and end of later Parsed Events). Table 19 illustrates the algorithm.

TABLE 19

| Basic algorithm |
|---|

```
Read in data line by line
If a later Parsed Event on one sensor starts within the Event Window of
an earlier Parsed Event on an adjacent sensor, then
    If there has also been an earlier Parsed Event on another adjacent
    sensor within the Event Window, then discard both (all) earlier
    Parsed Events and record the error
    If the later Parsed Event ends prior to the earlier Parsed Event, then
    discard both the earlier and the later Parsed Events and record the
    error Otherwise, record the Episode and discard the earlier
    Parsed Event
```

Episodes are written out to the Episode file. Errors are recorded in a separate file. The program may also collect total statistics for the Episodes, such as the total number of Episodes between each pair of sensors and their average duration, for use in generating various reports.

This embodiment enables the system to characterize the motion of objects near detection sensors. For example, when combined with floor plan information, it will enable the identification of differences in numbers or speed between people headed into one end of store aisle and people headed out of it. The embodiment enables data on one sensor to corroborate data from another, assisting in the elimination of spurious data. The embodiment reduces the volume of data to be handled in further processing by eliminating data that cannot be unambiguously associated with the motion of an object in an identifiable direction. Table 20 is sample code for the algorithm, and this code can be implemented in system 186 for execution by processor 198.

TABLE 20

| SetupParser m_ExperimentInfo; |
|---|

```
private EpisodeParser m_episodeParser;
private List<ParsedEvent> m_pendingEvents = new List<ParsedEvent>( );     //
        ParsedEvents waiting for a matching ParsedEvents
private void readParsedEventsFile( )
 lblOutputFilename.Text = m_episodeParser.Open(Settings.Default.EventFilePath,
        txtEventWindow.Text);
 if (lblOutputFilename.Text != string.Empty)
 {
   Settings.Default.EventFilePath = m_episodeParser.GetInputDirectoryName( );
   Settings.Default.Save( );
   m_ExperimentInfo = new ExpSetupParser(m_episodeParser.GetInputDirectoryName( ));
   processEvents( );
   reportResults( );
   cleanup( );
 }
private void processEvents( )
 TimeSpan eventWindow = new TimeSpan(0, 0, Int32.Parse(txtEventWindow.Text));
 foreach (ParsedEvent parsedEvent in m_episodeParser.InputData)
 {
   removeExpiredEvents(parsedEvent.StartTime, eventWindow);
   string errorMsg = processNextEvent(parsedEvent, eventWindow);
   logShadowEvent(parsedEvent.ToString( ), errorMsg);
 }
private void reportResults( )
 lblOverlapEvents.Text = m_overlapEvents.ToString( );
 lblEpisodesGenerated.Text = m_totalEpisodes.ToString( );
```

TABLE 20-continued

```
SetupParser m_ExperimentInfo;
```

```
 m_episodeParser.WriteOutputComment("Overlap              Events:            "            +
                 m_overlapEvents.ToString( ));
 m_episodeParser.WriteOutputComment("Total Episodes: " + m_totalEpisodes.ToString( ));
private string processNextEvent(ParsedEvent parsedEvent, TimeSpan eventWindow)
      {
        string errorMsg = string.Empty;
 List<ParsedEvent> neighboringEvents = nearestNeighborEvents(parsedEvent);
        if (neighboringEvents.Count == 0)
        { m_pendingEvents.Add(parsedEvent); }
        else if (neighboringEvents.Count == 1)
        {
           ParsedEvent earlierEvent = neighboringEvents[0];
           if (parsedEvent.EndTime < earlierEvent.EndTime)
           {
              m_pendingEvents.Remove(earlierEvent);
     errorMsg  =  "Error:  complete  overlap  of  #"  +  earlierEvent.Count  +  ",  #"  +
                 parsedEvent.Count;
              m_overlapEvents++;
           }
           else
           {
     if (earlierEvent.EndTime > parsedEvent.StartTime) { errorMsg = "Partial overlap"; }
              logEpisode(earlierEvent, parsedEvent);
              m_pendingEvents.Remove(earlierEvent);
              m_pendingEvents.Add(parsedEvent);
           }
        }
        else if (neighboringEvents.Count > 1)
        {
           foreach (ParsedEvent matchedEvent in neighboringEvents)
           { m_pendingEvents.Remove(matchedEvent); }
           m_pendingEvents.Add(parsedEvent);
        }
        return errorMsg;
     }
```

Data Output and Display

1. Collecting and Evaluating Multidimensional Event Data

Figure 58:
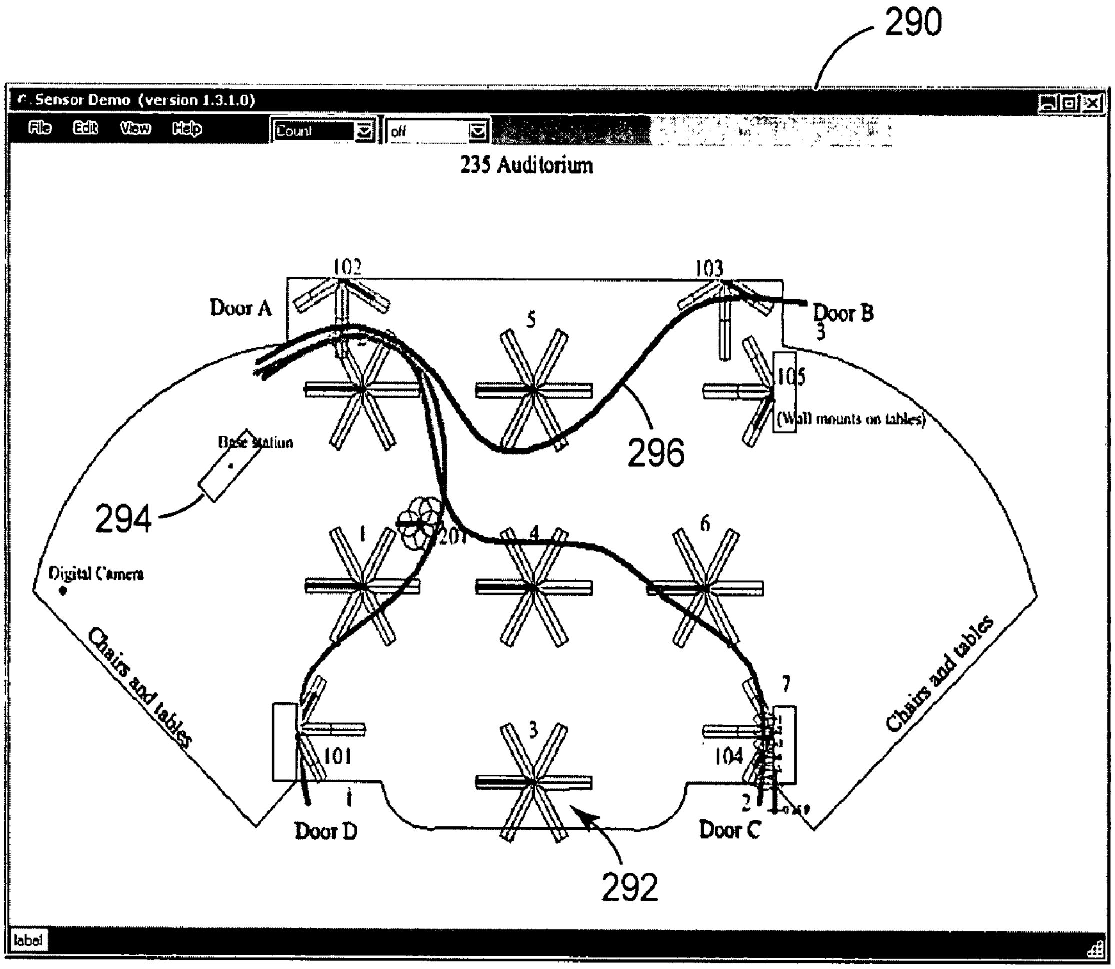
FIG. 58 is a diagram of a user interface for displaying a background image of an environment monitored by wireless network sensors.
Figure 59:
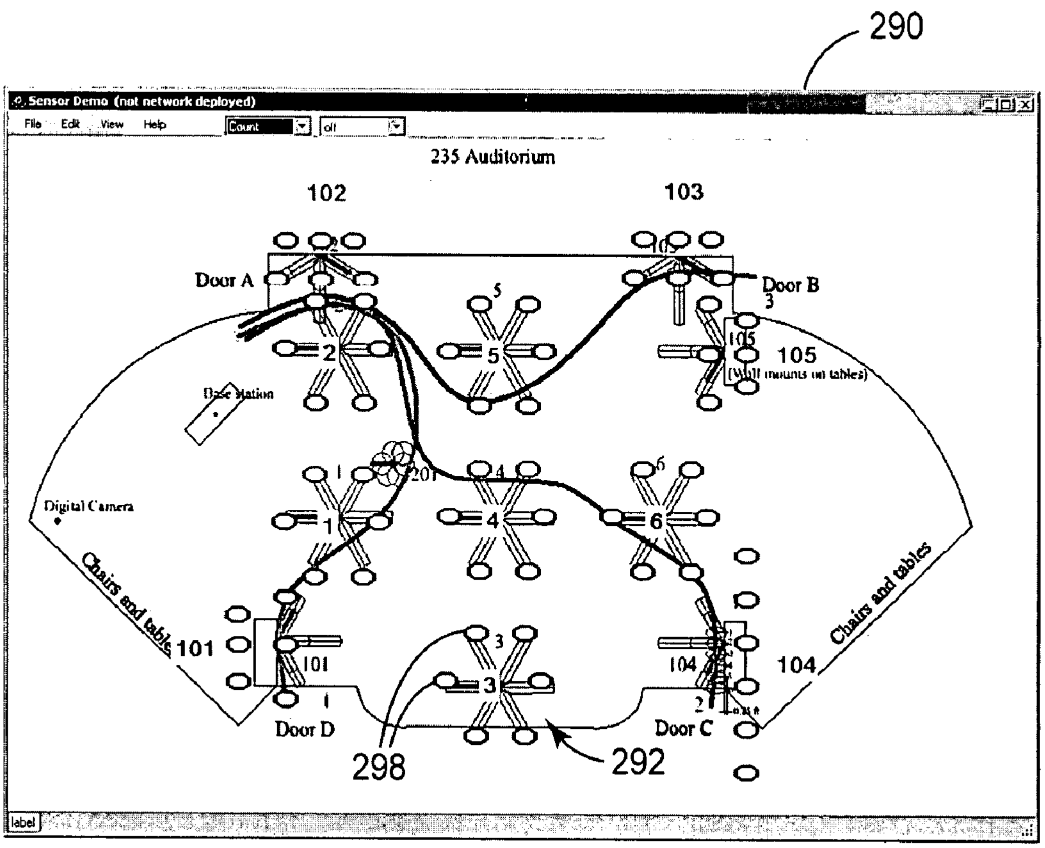
FIG. 59 is a diagram of a user interface for displaying detection sensor representations in the monitored environment.
Figure 60:
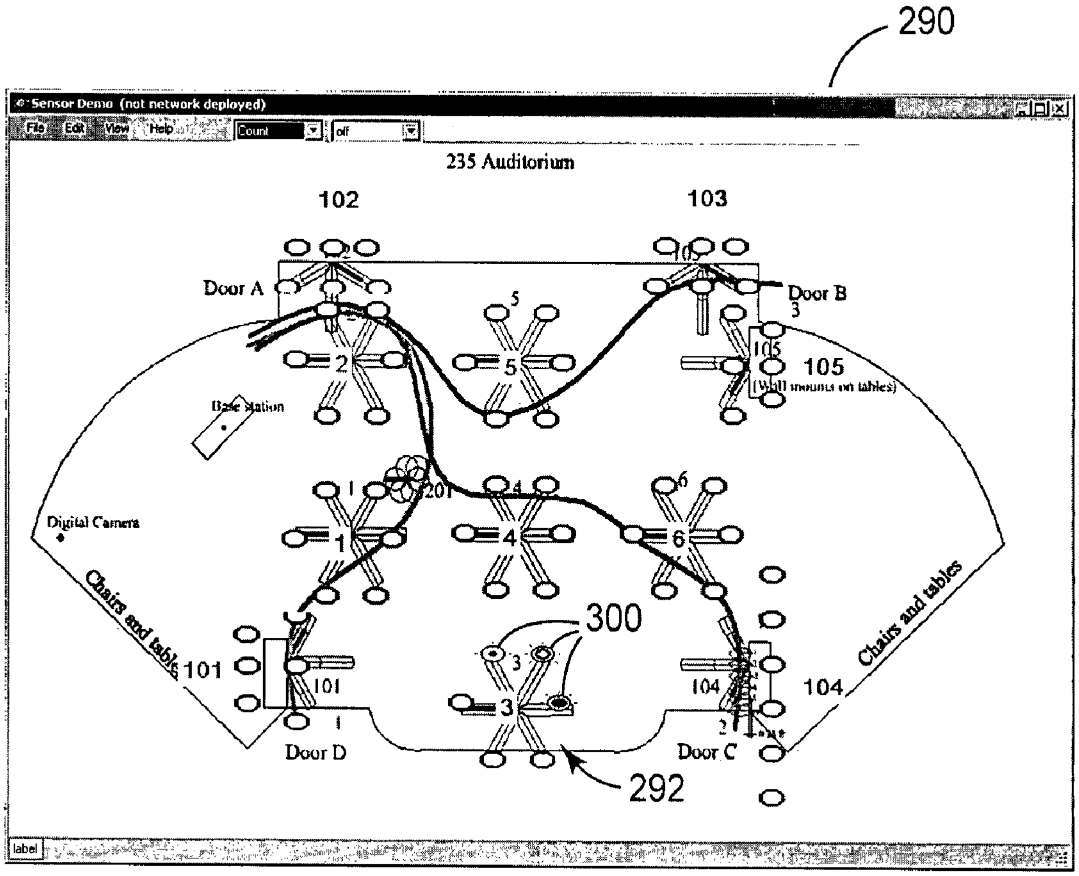
FIG. 60 is a diagram of a user interface for displaying status of detection sensor representations in the monitored environment.
Figure 61:
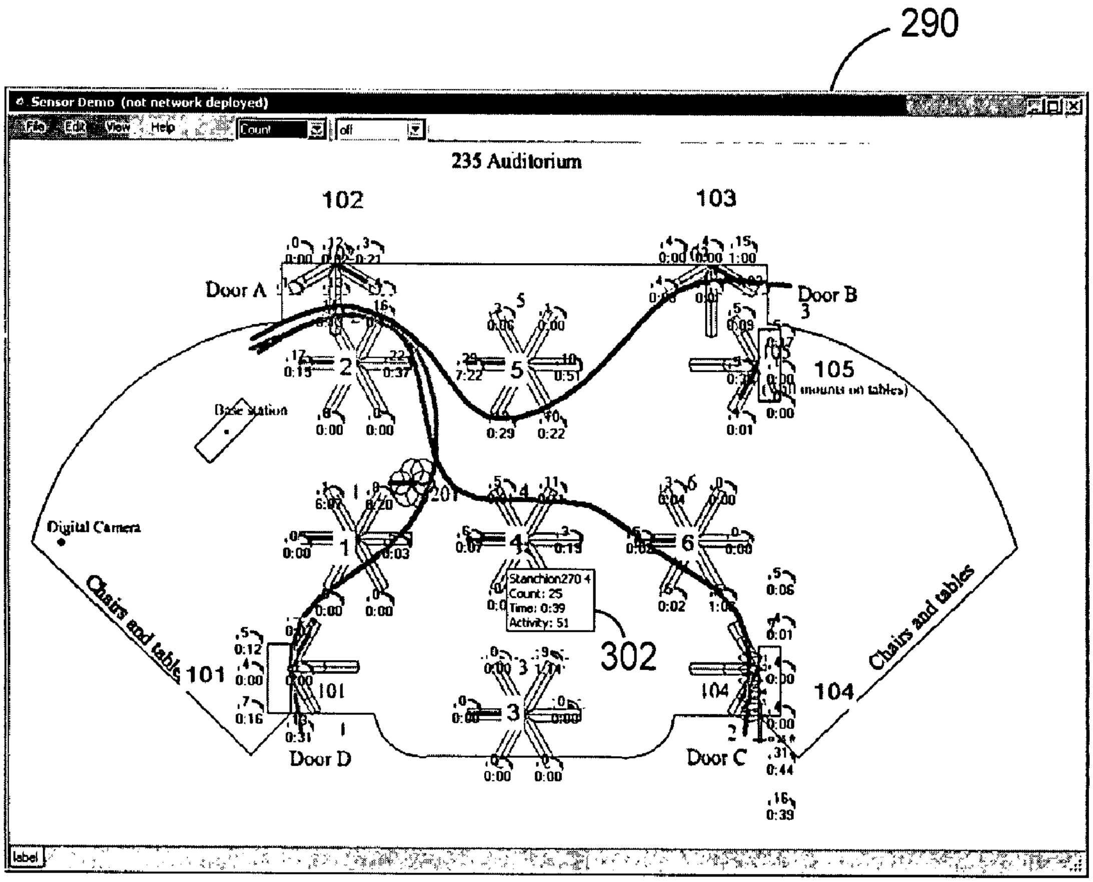
FIG. 61 is a diagram of a user interface for displaying counts and dwell times in the monitored environment.
Figure 62:
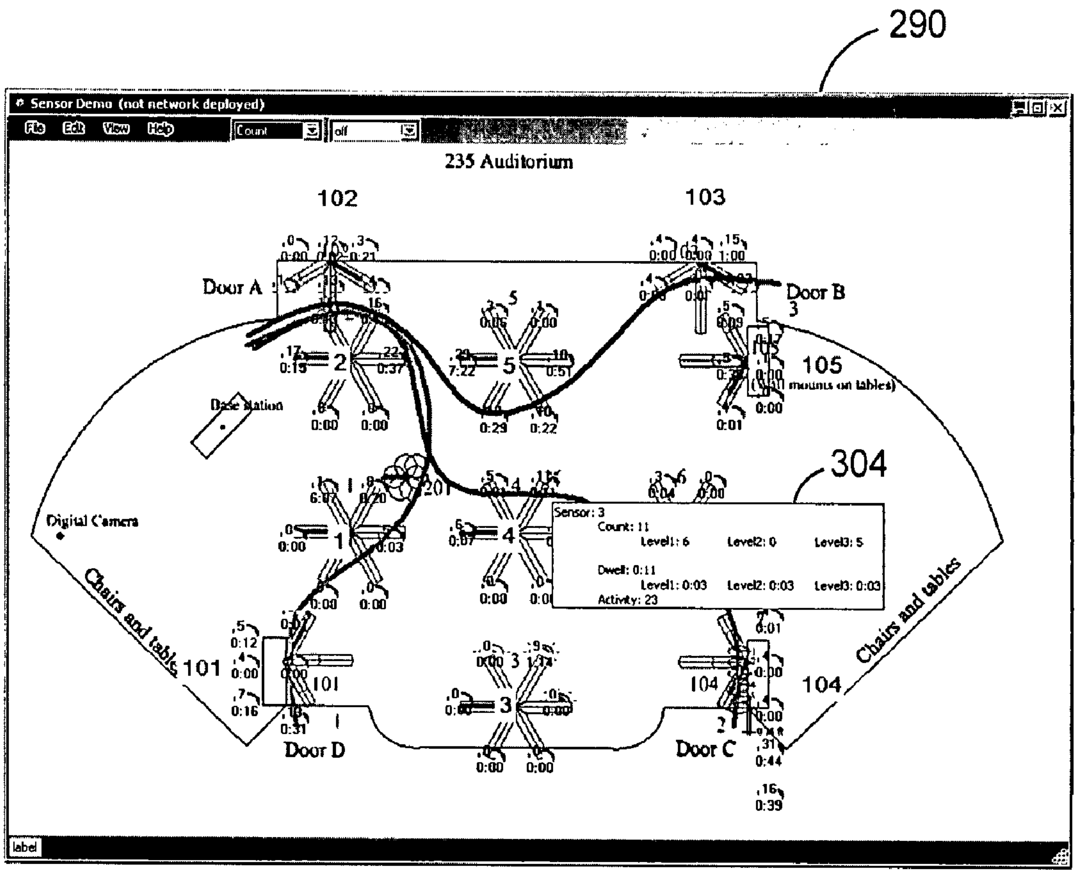
FIG. 62 is a diagram of a user interface for displaying detailed information for counts and dwell times in the monitored environment.
Figure 63:
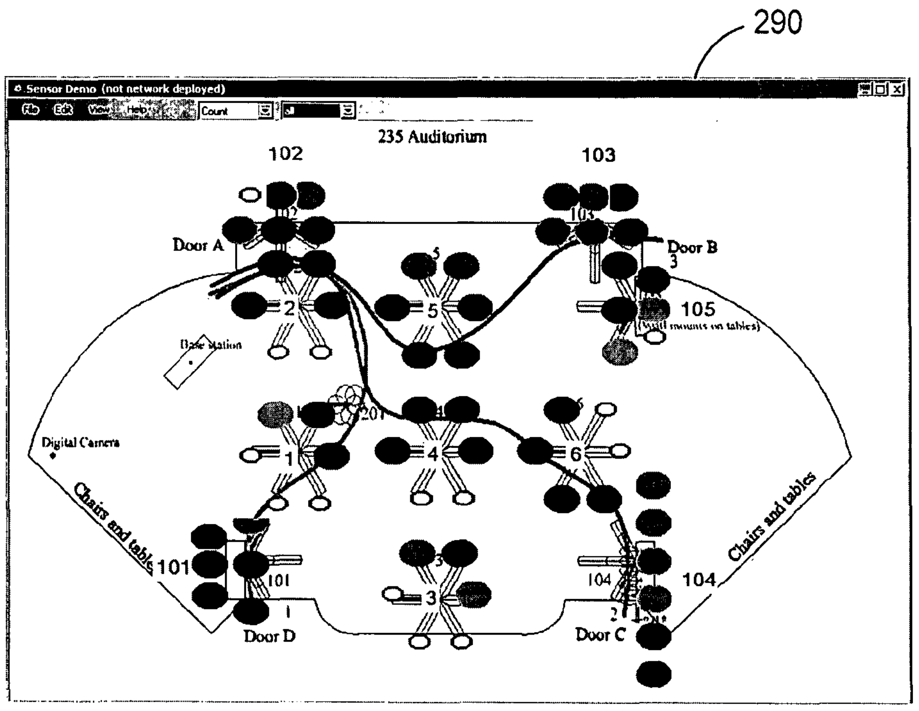
FIG. 63 is a diagram of a user interface for displaying counts plotted against event levels in the monitored environment.
Figure 64:
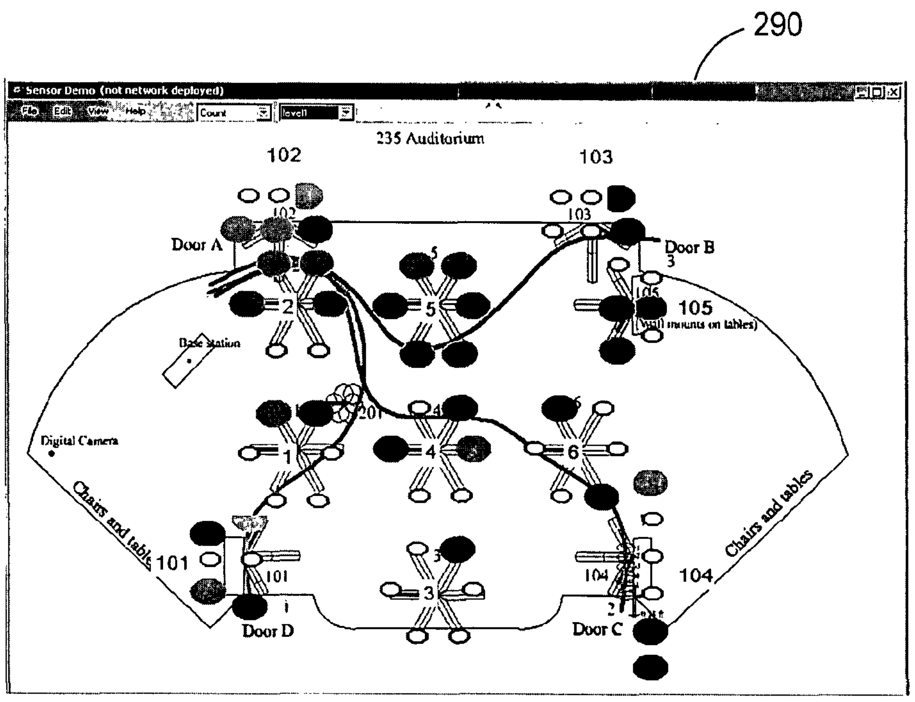
FIG. 64 is a diagram of a user interface for displaying filtered counts in the monitored environment.

The processed information in this embodiment can be electronically displayed on a display device, such as device 192 in user interfaces or screens, for example, such as the following. FIG. 58 is a diagram of a user interface 290 for displaying a background image of an environment monitored by wireless network sensors 292 and showing exemplary paths 296. FIG. 59 is a diagram of a user interface 290 for displaying detector representations 298 in the monitored environment. FIG. 60 is a diagram of a user interface 290 for displaying status 300 of detector representations in the monitored environment. FIG. 61 is a diagram of a user interface 290 for displaying counts and dwell times 302 in the monitored environment. FIG. 62 is a diagram of a user interface 290 for displaying detailed information 304 for counts and dwell times in the monitored environment. FIG. 63 is a diagram of a user interface 290 for displaying counts plotted against event levels in the monitored environment. FIG. 64 is a diagram of a user interface 290 for displaying filtered counts in the monitored environment.

This embodiment is a method and software for collecting, characterizing, evaluating, and archiving multidimensional data. Multidimensional data are data that have multiple characteristics of interest. An example would be data obtained from a real-time event monitoring system, where the events provided by the system are comprised of fields which include: origin (mote 102/sensor 4), signal strength (level2), a timestamp (17 Nov. 2007 14:23:02).

In a first method of timestamping, mote messages are time stamped by the system 186 as the messages are received. The messages contain event data that had occurred over a one-second time period, in one of four ¼ second intervals. These intervals are encoded with the values 0-3, indicating in which ¼ second interval the event had occurred. The timestamp for a particular event would be the system's time-of-day internal clock reading when the message arrived, plus the offset for the specific ¼ second interval in which the event occurred. The offset added value is shown in Table 21.

TABLE 21

| Interval Code | Amount added to PC Timestamp |
|---|---|
| 0 | 0.00 seconds |
| 1 | 0.25 seconds |
| 2 | 0.50 seconds |
| 3 | 0.75 seconds |

However, when the mote network has a great degree of activity, and therefore is generating many event messages, the message processing of system 186 can slow down. Also, the system may have been performing an operating system related task or other processing, for example, and for a few seconds did not retrieve messages from its buffer. Then in a short period of time (for example, less than one second), the system would read in and process a large number of messages, for example 50 or more. In that situation, the time stamps would be accumulated together and the actual time difference between events would be lost. For example, consider two event messages that were received from mote 1 and were generated one second apart. The first message has an event A that occurred in interval 2 and the second message has an event B that occurred in interval 0. In real time, event B has occurred 0.50 seconds after event A. However, because of the system's message processing as described above, the two messages are processed 100 milliseconds apart, and receive timestamps of 09:35:05.275 and 09:35:05.375. After adding the interval code offsets, event A is time stamped with the value 09:35:05.775 and event B is time stamped with the value 09:35:05.375. The timestamps make it appear that event B occurred 0.40 seconds before event A when it actually occurred 0.50 seconds after event B.

In a second, preferred method of time stamping, each mote message has a 32-bit count value included with it that is generated by the mote when the one-second measurement interval begins. This value is provided by a counter on the mote that starts at 0 on power-up and increments by 1024 counts per second. When the system receives the first message from a specific mote, it saves the count value, along with the system's real-time internal clock value for references, as shown in Table 22.

TABLE 22

| Mote ID | $T_{PCREF}$ | $T_{moteREF}$ |
|---|---|---|
| 1 | 09:22:45.200 | 5644 |
| 2 | 09:25:06.788 | 9780 |
| 3 | 09:33:56.441 | 4008 |
| . . . | . . . | . . . |

When subsequent messages from a mote are received, the message time stamp is computed as:

$$Timestamp = T_{PCREF} + \frac{(T_{mote} - T_{moteREF})}{1024}$$

Where, $T_{PCREF}$=the system's real time clock value, read when first mote message is received;

$T_{moteREF}$=mote's 32-bit count value in first message;

$T_{mote}$=32-bit count in received message; and

Timestamp=Real Time Clock timestamp value computed for mote events in message.

The actual event timestamps are computed as before, with the appropriate number of ¼ seconds added to the computed message timestamp. If messages accumulate within the system, the time relation between events is preserved.

This preferred time stamping method also allows the timing between events on different motes to be computed. It is assumed that when the system is first started, there are not many events being generated and the first message from each mote traversed through the wireless network and is received by the system such that the difference in latency times for each mote's first message is small, for example less than one second. If this is the case, then the computed time-of-day timestamps for events on different motes will be accurate enough to be useful.

Capabilities provided by this embodiment include the following: automating the means by which data are collected from an external system; providing a user with methods for characterizing the data by one or more of its dimensional components; providing visualization tools by which a user may evaluate the characterized data; and allowing the user to archive data characterizations for later analysis.

Data are entered into the system via a TCP Socket connection, or alternatively can be read from an archived data file, and the system can thus accept data in real-time from a remote data generator that is also connected to the same network. Data entered into the system can be characterized in several fundamental ways, including the following: as a "Count" by summing the total number of incoming events; as a "Duration" by summing the total time during which an event was active; and as "Activity", computed by multiplying the event level by the event duration for each individual event, then summing this value over all events:

$$\sum_{events} \text{level} * \text{duration}.$$

At the end of a data collection session, the system provides the total number of events received, the total amount of time that any event was active, and the total amount of activity for all events received.

These fundamental characterizations can be filtered by several additional criteria. Thus, for example, the total number of incoming events at level 2 coming from mote 102/sensor 4 can be provided. A GUI allows the user to view system activity. The user may select a background image to provide a context for the experiment. Representations of the detection sensors that generate event data can be projected onto this background at their respective locations. Each detection sensor is represented as an appropriate collection of virtual LEDs on the GUI. In this case, the LEDs on the GUI are a visual representation of an LED shown as a solid or blinking colored area. As the experiment runs and data are collected, the user can choose to view incoming data in either a dynamic or static mode. Events are received from remote sensors over a network connection (using TCP Sockets), such that the sensor system and this embodiment may be located at different physical locations. As events are detected, they are displayed on the GUI by 'activating' the appropriate LED. Different event levels are represented by different degrees of illumination on the LED. Activity that is read from a data file is displayed on the GUI in a similar manner.

Normally, the LED activity displayed on the GUI is deactivated at the end of an event. However, a variation is to leave the LED activated at the maximum level that occurred at the end of an event. At the end of an experiment, the collection of all LEDs that were activated is left on the display to indicate the pattern of maximum event activity.

Over time, as events are collected, the accumulating data characterization can be projected onto the GUI. The user can select whether to display counts, dwell, activity, or any combination of these values. The values are displayed for each sensor. An aggregate characteristic for all sensors on a detector, plus the detector description, is displayed when the cursor is placed at the center of a detector.

Data that have been accumulated may be cleared from the system by the user at any time. Counts (upper) and dwell time (lower) are displayed for each sensor. An aggregate for all characteristics is displayed by placing the mouse cursor over detector 4, for example.

Further detail can be displayed for each sensor in the system by placing the cursor directly over an individual sensor. Detailed information is shown for the characteristics currently shown for all sensors, as illustrated in FIGS. 61 and 62.

Detailed information for 'count' and 'duration' is shown by placing the cursor directly over a particular sensor representation. At any time during or after an experiment, a graphic indication of data characteristics (count, duration, or activity) may be displayed. A series of virtual LEDs displaying various colors are projected onto the sensors, where the color indicates the level of activity. Brighter or more intense the color indicates a greater the level of activity.

Threshold levels for color transitions can be set programmatically. Thresholds can be set to show relative values of sensors within a detector, or relative values of sensors across all detectors. Thresholds may also be set to fixed values that allow comparison of plots across experiments that were run at different times.

Users can filter the plot of any data characteristics (count, duration, or activity) by a specific event level, selecting either an individual event level or an aggregate of all event levels.

When the numerical values for data characteristics are also displayed with a plot, the numerical values represent only those due to the selected plot level. For example, if the plot of counts were filtered for level1 events, the numerical values shown on each sensor represent only the number of level1 events.

Any experiment can be archived to an experiment file. Both configuration information (e.g., detector type, placement, orientation, background image, etc.) and state information (e.g., LED state, data characterization, etc.) are preserved in the experiment file. The user can specify both the name of the experiment file, and the destination directory to which it will be stored, when the file is created.

Any previously saved experiment file may be read in at a later time, returning the state of the system to the point at which the file was originally saved. Further analysis can then be performed, or this restored state may be used as a starting point for collecting additional data. A file containing characterized data (less any configuration information used to construct the GUI) may be saved to a file for subsequent processing, for example by a statistical analysis package.

This embodiment provides a simple and convenient way for documenting experiments. Experiment information such as mote type, orientation, and location is captured from the GUI and written out to a data file. Summary data and state information are also captured and written to the file.

This embodiment provides real-time visual feedback of experiment conditions as they occur by displaying the current state of sensors is displayed on the screen. This is a useful diagnostic tool for validating correct operation of equipment (sensors actually detect a person as they walk past). It is also useful for detecting anomalous behavior (a sensor is generating events when nothing is happening) and incorrect deployment (a mote is detecting on the wrong sensor because it is installed in the wrong location or pointing in the wrong direction).

This embodiment offers a user insight into the behaviors occurring during an experiment by watching the behavior of the LED indicators. Patterns of activity can be visually recognized by observing the sequence of LED activation, for example "people tend to walk towards the left as they pass by the food that is on display."

This embodiment provides visual representation of data values and state information, which allows the user to draw conclusions in real-time based on this data. The numerical values representing sensor results can be displayed in the GUI, and real-world meaning can be inferred when observing this information against a background image that represents the experiment context. For example, "there are twice as many people entering the building as there are leaving the building" by observing the numerical counts on appropriate sensors.

This embodiment allows easy identification of "hot spots" by visually plotting the desired information using an intuitive color scheme. Furthermore, it allows the user to select the type of data characterization that is of concern, or compare the sensitivity of various data characterizations to whatever is of interest. For example, "there is a hot-spot near the coffee bar when plotting counts because it shows up as a yellow virtual LED. However it appears that activity may be an even better indicator since that plot shows up in red."

By allowing the user to make a quick initial visual evaluation of various data characterization, it can provide direction on which type of the many possible data characterizations may be most useful to examine in more detail, for example by use of an appropriate statistical analysis tool.

2. Event Analysis and Display for Wireless Network Sensors

The processed information in this embodiment can be electronically displayed on a display device, such as device 192 in user interfaces or screens, for example. This embodiment is a method and software for taking parsed event data and analyzing and graphically representing it in order to provide useful information about activity in a sensor field. It is also capable of taking raw Event Data to produce the same information.

A sensor field is used to collect data about moving objects, typically people or vehicles. The information of interest varies with the application, but typically includes the frequency with which a particular sensor or group of sensors was triggered, which corresponds to the activity in the region of sensitivity of the sensor(s), and the length of time an object was in the region of sensitivity ("dwell time"), which is related to the speed of the moving object.

Figure 65:
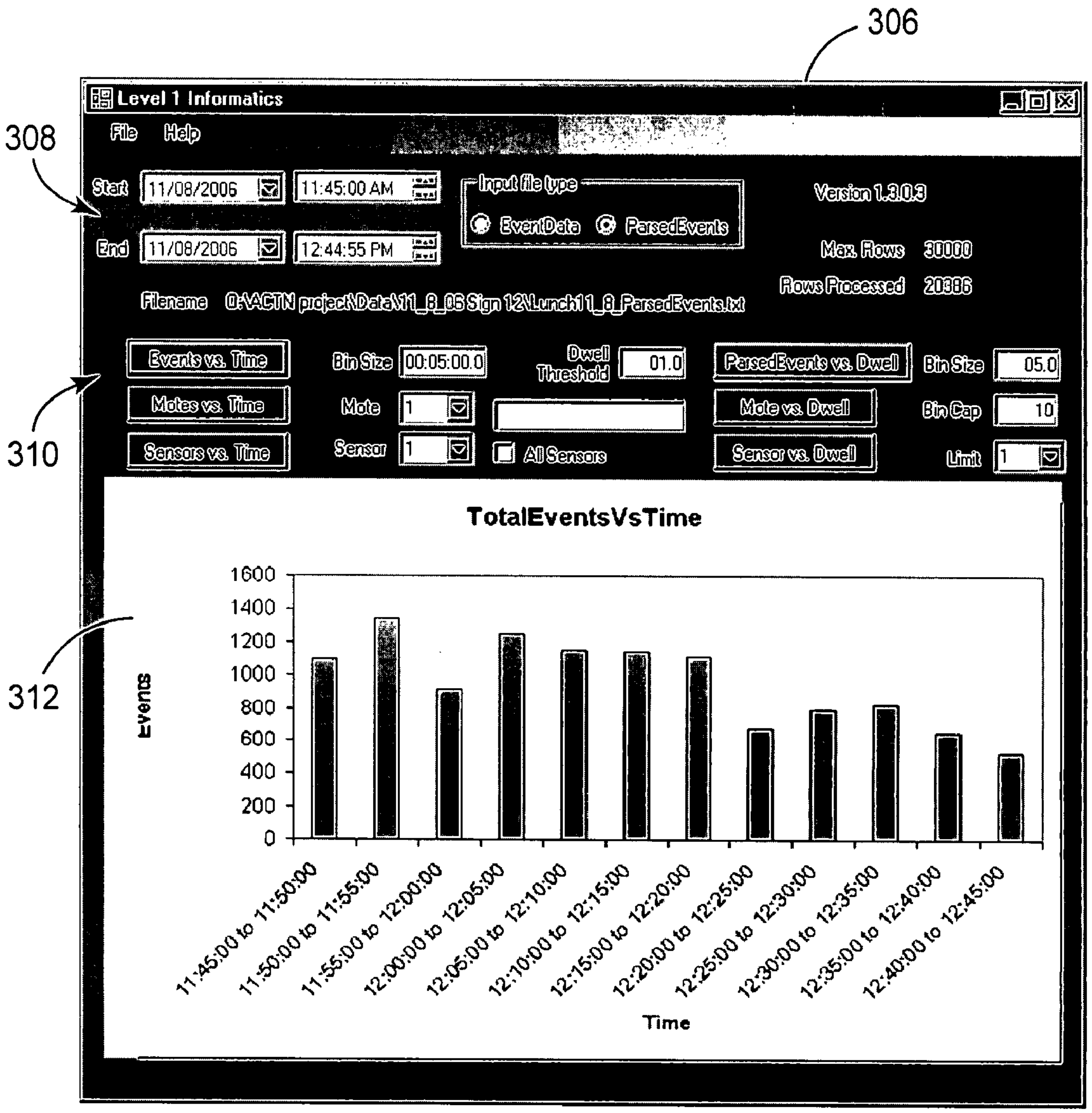
FIG. 65 is a diagram of a user interface for displaying a frequency plots of events in the monitored environment.
Figure 66:
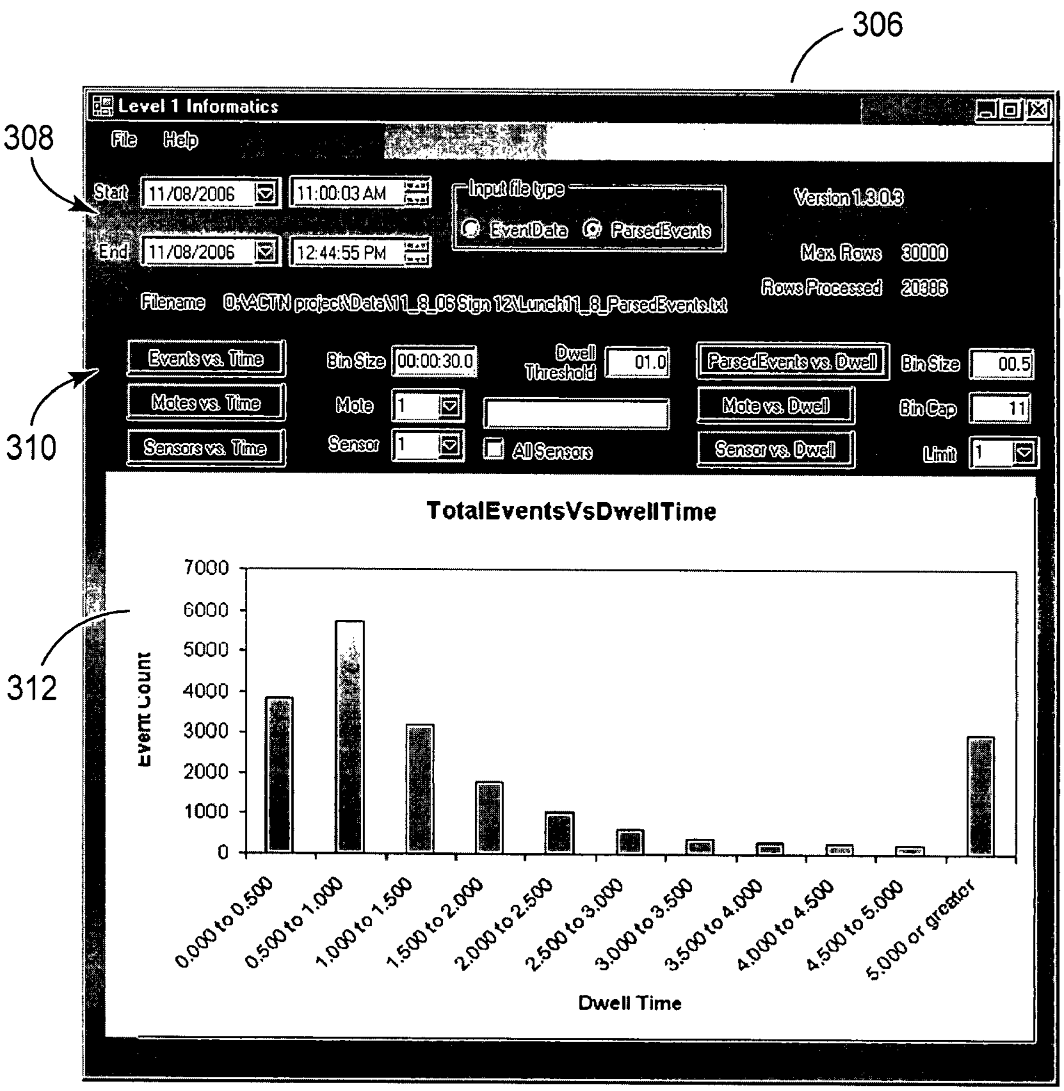
FIG. 66 is a diagram of a user interface for displaying dwell times of events in the monitored environment.

The embodiment has a user interface as shown in FIGS. 65 and 66. FIG. 65 is a diagram of a user interface 306 for displaying frequency plots of events in the monitored environment. FIG. 66 is a diagram of a user interface 306 for displaying dwell times of events in the monitored environment. User interface 306 includes a section 308 for displaying start and end times, a section 310 for selecting different types of graphs (events vs. time, motes vs. time, or sensors vs. time), and a section 312 for displaying a selected type of graph.

The user opens either a Parsed Event data file or a raw Event data file, depending on which "input file type" button is selected. The program searches the data and finds the earliest date and time and automatically enters them in the "Start" boxes, and likewise enters the last date and time in the "End" boxes. The data file name is displayed, as are the total number of data lines in the input file. The input file is read into a hidden Microsoft Excel workbook. The maximum number of data lines that can be handled by the workbook is also displayed. If the number of lines in the input file exceeds the maximum number of lines in the workbook, an error message is displayed and only the number of lines available in the workbook are processed. The workbook contains several worksheets which store ("bin") each line of data either by event time (for frequency graphs) or duration (for dwell time graphs.) The start and end dates/times for the binning can be changed in their respective boxes. The size of the frequency and dwell time bins can be set. It is also possible to make frequency plots of only those Parsed Events which exceed a certain dwell time, as set in the Dwell Threshold box. Since the duration of Parsed Events can be quite long, all Parsed Events in bins greater than the "Bin Cap" are combined into the final bin. Both frequency and dwell time graphs can be made for all the motes and sensors in the system, for only a single mote in the system, or for only a single sensor on a mote. These selections are made in the "mote" and "sensor" boxes. All the sensors on a particular mote may have separate graphs made automatically; this is achieved by checking the "All Sensors" box and entering a family worksheet name in the box above it. All worksheets created using this functionality will be given the entered name followed by the individual sensor number.

When the user is done generating graphs, the Excel worksheets with the graphs can be saved. They may be saved either as the entire workbook, including the sheets with all the data used in the calculations, or simply as the worksheets with the resulting graphs and the processed data used to generate them. The former typically makes an extremely large file that can be slow to save.

This method condenses large volumes of sensor data into more easily understood, relevant information, and it automates certain aspects of the data analysis.

3. Topology Mapping of Event Density

The processed information in this embodiment can be electronically displayed on a display device, such as device 192 in user interfaces or screens, for example.

The embodiment is a method of taking data from a sensor network that reports the number of objects detected in a given sensor field per unit time and mapping that data to a topographical representation of that data. In the topographical map, the X and Y coordinates are used to represent the floor plan of the area under observation and the Z axis is used to represent the number of objects seen in that area in a given time. For example, if hundreds of objects were to be detected in one area and 2 or 3 objects in another, the Z data would reflect this number of objects. One goal of this mapping is to show areas of high traffic differently than other areas in a monitored space. For example, if the system is monitoring a retail store and one of the aisles has a very high number of people moving through it, the system can display a map that reflects that information. This method gives the means to make that map.

The embodiment requires that each sensor in the field have a known detection pattern. This pattern is in essence a map of probability of detection versus the X and Y map of the floor area in front of the sensor. The probability map contains values from 0 to 1 representing the probability of detection. If the detection sensors are mounted on the ceiling, this probability map would resemble a circle. If the sensors are mounted looking sideways the probability map resembles a piece of pie.

The method first generates the probability map for each type of sensor. This data can be derived from experiments that are designed to determine the detection area. These maps are then rotated and translated to the positions they occupied during the experiment of interest. This becomes a multilayer map (one layer per sensor) that contains all of the maps of the sensors in place in the experiment. A map can show all sensors with an event count of 1 and no special processing to remove overlapping fields of probability. A single wedge of a "gray" level is indicative of a single object being detected. In the maps, the grayscale can be auto scaled to make the maximum value in the map to equal white and the lowest value to equal black. This means that white does not have the same meaning in all graphs; it just means that that is area of maximum value in the current map. In a final map, these areas of overlap are processed to show just the maximum number of events from any one of the sensors.

Next the method involves taking a Parsed Event File and reading it to tally the number of events per sensor in the time interval of interest. These totals are then used to multiply the matrix that contains the probability map of each sensor. These arrays are then added together to show the complete field of view. In the addition process, only the maximum value for any given sensor is used to assign the value in the matrix. This is done to prevent over counting the events. It is possible to have sensor fields of detection overlap. In that case, the system should not double count a single object that happens to trigger both sensors at the same time.

The final step in the method is to use image processing to smooth the data to give a more readable version of the map. In the smoothing operation, a 3×3 kernel is used to average the data over a small number of pixels. In the grayscale plot, white can represent a high number of objects detected, while black can represent a low number of objects detected or no data was collected in that area. A false color plot of the data is also generated from the same data. A three-dimensional contour plot can also be generated.

The method allows for the presentation of individual sensor data on a map of the area being monitored. The contour map provides the ability present object density information in a simple to understand format. It is easy to understand that brighter areas indicate more objects are detected in a given area than darker areas.

As an alternative, the event data, or other data from the wireless network sensors, can be displayed in different formats using, for example, known programs to display representations of data. Also, data mining programs can be used to analyze data collected from wireless network sensors.

Figure 67:
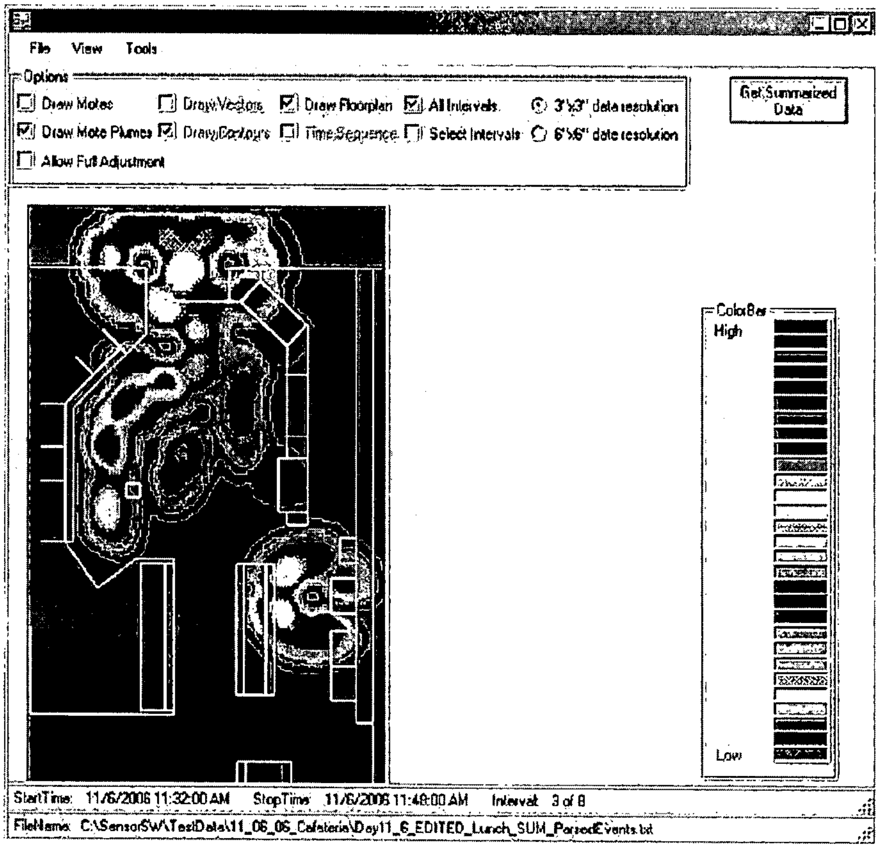
FIG. 67 is a diagram of a user interface displaying a topology map of traffic patterns.
Figure 68:
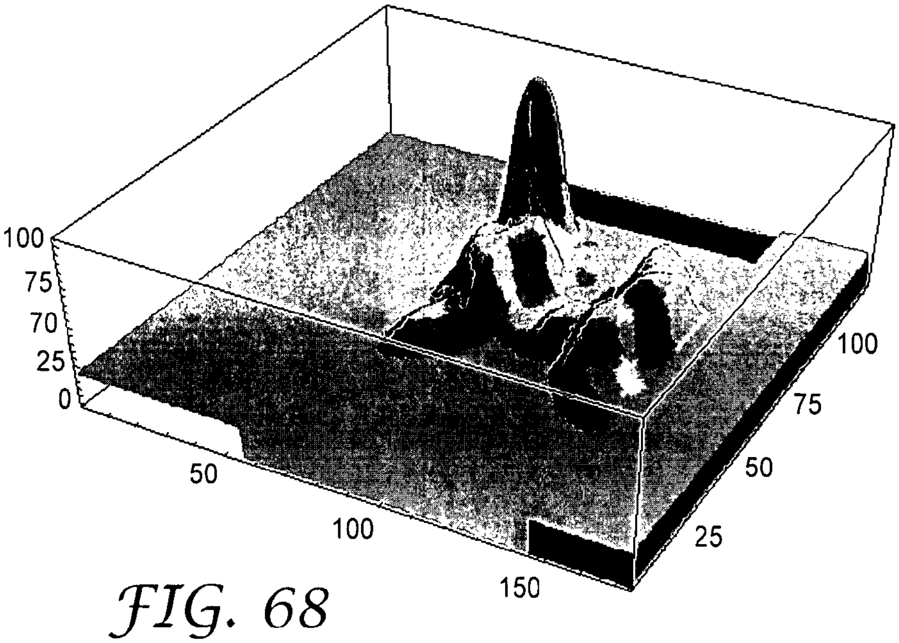
FIG. 68 is a diagram of a representation of a three dimensional topology map of traffic patterns.

FIG. 67 is a diagram of a user interface displaying a topology map of traffic patterns. FIG. 68 is a diagram of a representation of a three dimensional topology map of traffic patterns. The maps shown in FIGS. 67 and 68 can be generated by, for example, the processing described in the present specification and displayed on a display device such as device 192 or printed in hard copy form. For example, the processing to produce maps such as that shown in FIG. 67 can include a process to generate each sensor detection (topology) map, rotate and translate the detection map to the angle and location of the corresponding wireless network sensor, process the maximum count for that sensor, and then perform a logical OR operation on the data to generate a single map of a monitored space. Maintaining a single map of the monitored space can reduce memory usage significantly and speed up performance considerably.

The topology maps can also be made available to customers over a network such as the Internet. The shading in the map of FIG. 67 indicates levels of traffic as represented by the legend bar on the right side of the screen. The height of the peaks in the map of FIG. 68 likewise indicates levels of traffic. Various other types of maps can be generated to provide an indication of traffic patterns, for example maps using different colors or other visual elements to indicate levels or density of traffic patterns.

Methods for Providing Informatics Information

The informatics information collected by the wireless network sensors, described above, can be provided to customers in a variety of ways. The informatics information includes any information resulting from processing of data generated by wireless network sensors. For example, it includes, but is not limited to, the results of process 206 providing the parsed path information, which can be used to generate maps, charts, or other output indicating traffic patterns in a monitored space. The results can also be used, for example, to determine a correct or desired placement of goods in a store and the effectiveness of the location where the goods are placed.

Figure 69:
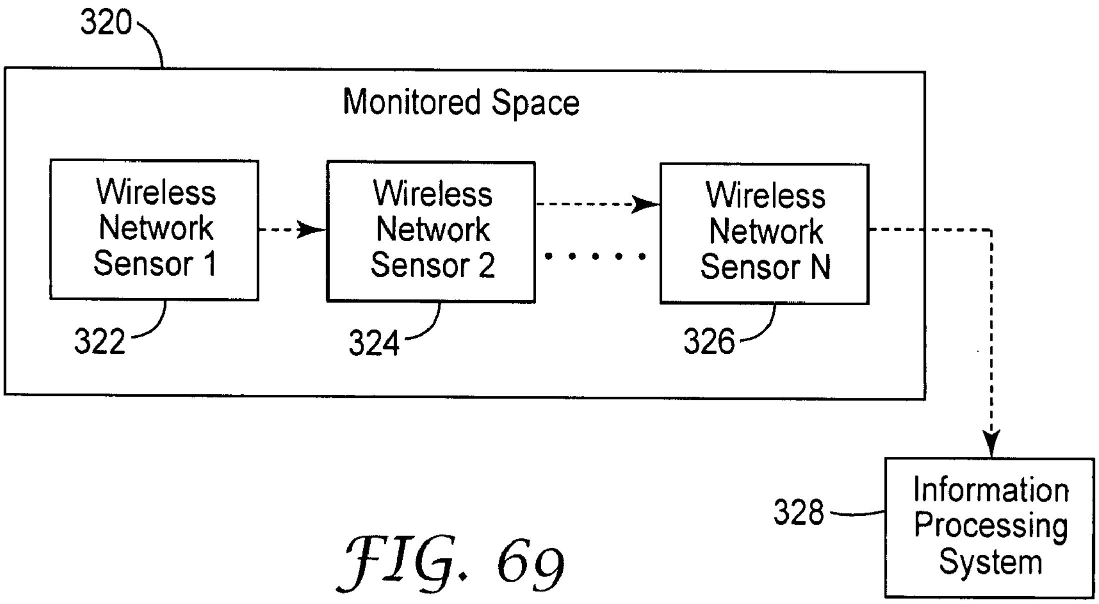
FIG. 69 is a diagram of wireless network sensors used to collect data relating to events in a monitored space.

FIG. 69 is a diagram of wireless network sensors used to collect data relating to events in a monitored space 320. Several wireless network sensors 322, 324, and 326 are located at particular positions around monitored space 320 in order to detect events occurring in the monitored space. Detection sensors, such as those described above, can be used to locate wireless network sensors at various locations in the monitored space, such as in the person sensing stanchions, or mounted on walls, a ceiling, or soffits in the monitored space. An information processing system 328, corresponding with system 186, collects the data from the wireless network sensors in the monitored space and processes it to generate reports or other information using, for example, the processing and resulting information described above.

The space monitored by the wireless network sensors can include particular retail environments such as, for example, a general retail store, car dealerships, airports, grocery stores, department stores, museums, or other public spaces. The traffic patterns determined from the data collected via the wireless network sensors in the monitored space can be used, for example, to design a store layout and placement of goods in the store.

The use of the person sensing stanchions can provide the advantage of placing them on virtually any floor space, especially since they also operate wirelessly and under battery power. For example, in a car dealership, the person sensing stanchions can be placed at various locations adjacent cars for sale, and the resulting information gathered from them can be used to generate traffic patterns throughout the dealership around the cars. A dealer can then, for example, use the traffic pattern information in order to best determine where to position cars for sale on the showroom floor.

As another example, the detection sensors can be placed at various locations adjacent retail spaces in an airport, shopping mall, or other public space. The information gathered from the detection sensors can be used to generate typical traffic patterns for the space, and higher rents could possibly be charged for the retail spaces subject to higher traffic patterns.

Figure 70:
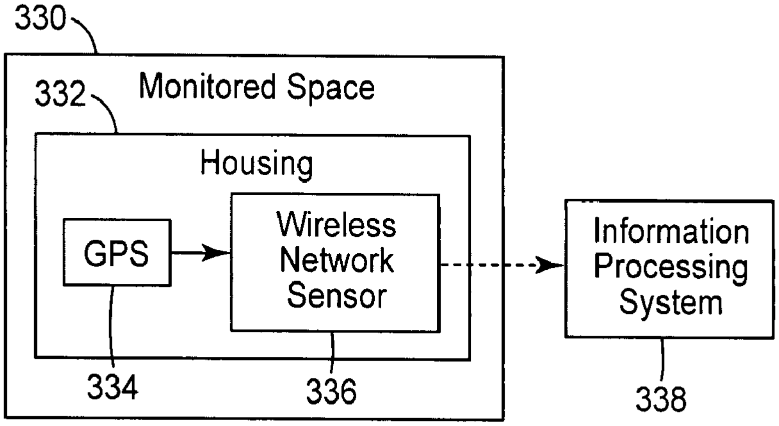
FIG. 70 is a diagram of a global positioning system module coupled with a wireless network sensor used to collect data relating to events and locations of the events in a monitored space.

FIG. 70 is a diagram of a GPS module 334, or other location determining module, electronically coupled with a wireless network sensor 336, contained within a housing 332, used to collect data relating to events in a monitored space 330. GPS integrated circuit chips (module) are known in the art and use satellite signals to provide information at least approximately identifying a geographic location of the GPS module. As an alternative to a GPS module, other location determining modules for providing an approximate geographical location of the modules include techniques described in the following publications, all of which are incorporated herein by reference: Christopher Tayler et al, “Simultaneous Localization, Calibration, and Tracking in an ad hoc Sensor Network,” Proceedings of the fifth international conference on information processing in sensor networks, Nashville, Tenn., USA, pp. 27-33, ISBN: 1-59593-334-4 (2006); Branislav Kusy et al., “Node Density Independent Localization,” Proceedings of the fifth international conference on information processing in sensor networks, Nashville, Tenn., USA, pp. 441-448, ISBN:1-59593-334-4 (2006); Branislav Kusy et al., “Radio Interferometric Tracking of Mobile Wireless Nodes,” Proceedings of the 5th international conference on mobile systems, applications and services, San Juan, Puerto Rico, pp. 139-151, ISBN:978-1-59593-614-1 (2007); Masoomeh Rudafshani et al., “Localization in Wireless Sensor Networks,” Proceedings of the 6th international conference on information processing in sensor networks, Cambridge, Mass., USA, pp. 51-60, ISBN:978-1-59593-638-X (2007); and U.S. Patent Application Publication Nos. 2005/0080601 and 2005/0145018.

Housing 332 can be implemented with, for example, the detection sensors described above. An information processing system 338, corresponding with system 186, collects the data from the wireless network sensors in the monitored space and processes it to generate reports or other information using, for example, the processing and resulting information described above. In addition to the information generated from the wireless network sensors, information processing system 338 can also store corresponding location information, possibly time and date stamped. Table 21 conceptually illustrates a structure to store such information, and it can be stored, for example, in secondary storage 196 in a database structure.

The location information may be useful to initially or repeatedly set up the sensor network, as described above. For example, the sensor network can be set up in one location, and information concerning events can be gathered by the wireless network sensors in that location for a period of time. The gathered information can be associated with the location information through the use of the GPS modules in them and saved, as shown in Table 23. The sensor network can then be moved to a different location and the process repeated for that location.

TABLE 23

| Event | Location Data | Event Information |
|---|---|---|
| event 1 | location 1 | event information 1 |
| event 2 | location 2 | event information 2 |
| . . . | | |
| event N | location N | event information N |

Figure 71:
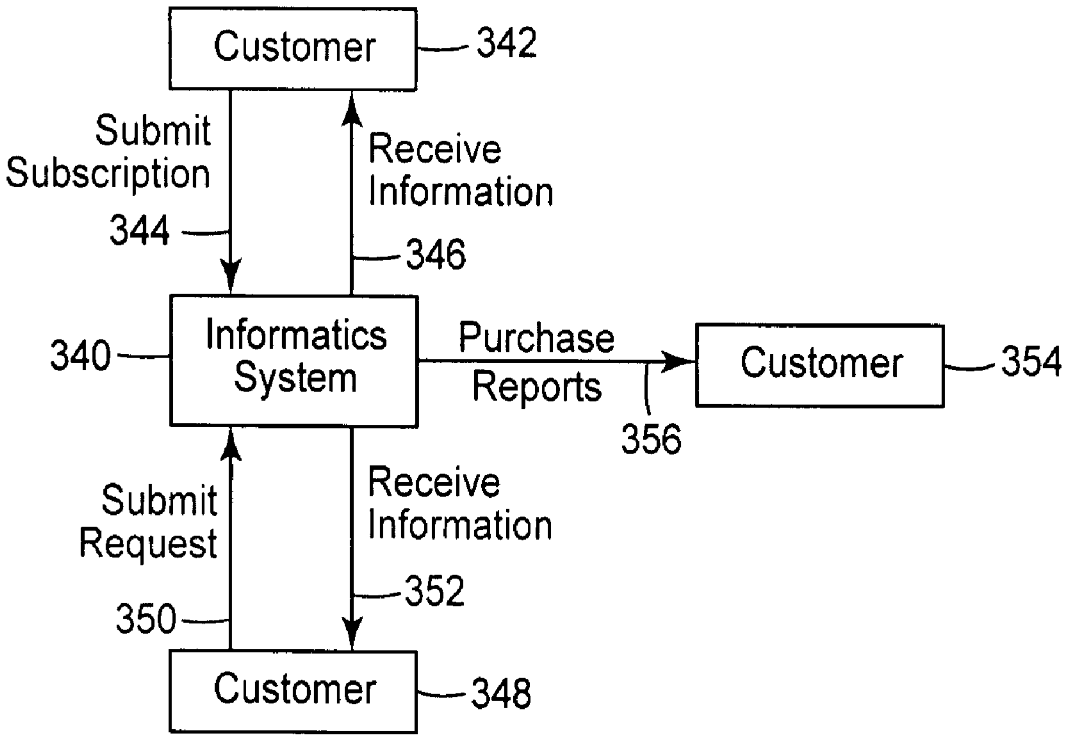
FIG. 71 is a diagram illustrating methods to sell information relating to data collected via wireless network sensors relating to events in a monitored space.

FIG. 71 is a diagram illustrating methods to sell information relating to data collected via wireless network sensors relating to events in a monitored space. An informatics system 340, corresponding with system 186, collects the data from wireless network sensors in a monitored space and processes it to generate reports or other information using, for example, the processing and resulting information described above. In one method, a customer 342 issues a subscription 344 to informatics system 340 and, in response, receives informatics information 346 on a regular time basis. In another method, a customer 348 issues a request 350 to informatics system 340 and, in response, receives informatics information 352. In another method, a customer 354 purchases reports 356 containing informatics information from informatics system 340. The informatics information for the requests and subscriptions can be provided electronically to the customers over network 204 such as the Internet. Informatics system 340 can store an identification of each user’s address, such as an e-mail address, associated with the corresponding subscription or request in order to send the information. An identification of the subscriptions, requests, and reports can also be stored electronically, such as in secondary storage 196, in a database structure to associate the them with particular prices as conceptually illustrated in Table 24. The prices can vary depending upon, for example, the content provided in response to the subscription or request.

The subscriptions can also include, for example, a real-time transmission of an indication of an event to a subscriber’s remote location. The subscriber can also be provided with interactive user interfaces, such as those described above, in order to remotely view information about wireless network sensors in a monitored space.

TABLE 24

| Type of Information Available | Price |
|---|---|
| subscription 1 | price 1 |
| subscription 2 | price 2 |
| . . . | |
| subscription N | price N |
| request 1 | price 1 |
| request 2 | price 2 |
| . . . | |
| request N | price N |
| report 1 | price 1 |

TABLE 24-continued

| Type of Information Available | Price |
|---|---|
| report 2 | price 2 |
| . . . | |
| report N | price N |

Figure 72:
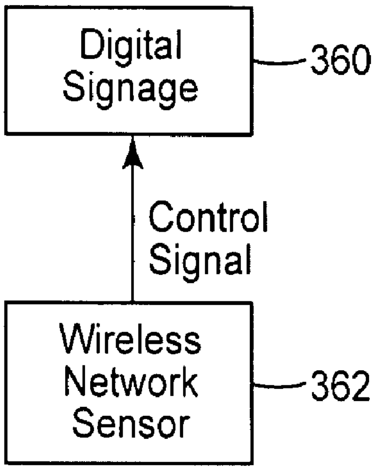
FIG. 72 is a diagram illustrating use of a wireless network sensor used to control digital signage.

FIG. 72 is a diagram illustrating use of a wireless network sensor 362 used to control digital signage 360. The wireless network sensor 362 can be located adjacent or proximate the digital signage 360 and, upon detecting an event or multiple events, it can provide a control signal to the digital signage, a digital display or other type of electronic display, in order to instruct the digital signage to display a particular advertisement or message. Digital signage 360 represents an electronic sign with the ability to display varying messages. For example, digital signage 360 can be implemented with LEDs or other electronic elements in order to display varying advertisements. Table 25 conceptually illustrates associating events with advertisements, and this information can be stored in the wireless network sensors in memory 12. As an example, when wireless network sensor 362 detects events indicating a significant increase in traffic, it can instruct digital signage 360 to switch to an advertisement for an advertiser who only wants the advertisement displayed during high traffic times and may pay a higher price for display during such times.

TABLE 25

| Detected Event | Displayed Advertisement |
|---|---|
| event 1 | advertisement 1 |
| event 2 | advertisement 2 |
| . . . | |
| event N | advertisement N |

The invention claimed is:

1. A detection sensor having a wireless network sensor for detecting events occurring proximate the sensor, comprising:

a housing having a base, a top portion, and a free standing elongate portion having a first end connected to the base and a second end connected to the top portion, wherein the top portion includes plurality of apertures; and a wireless network sensor located in the housing and having a plurality of sensors for detecting events occurring proximate the sensors, a processor for receiving and processing data from the sensors, and a wireless transmitter for wirelessly transmitting data, wherein the plurality of apertures in the top portion each contain one of the sensors.

2. The detection sensor of claim 1, wherein the elongate portion has a substantially cylindrical shape.

3. The detection sensor of claim 1, wherein the apertures in the top portion have a substantially uniform spacing.

4. The detection sensor of claim 3, wherein the apertures in the top portion are spaced apart by approximately 60°.

5. The detection sensor of claim 1, wherein the elongate portion is lined with an opaque material.

6. A detection sensor having a wireless network sensor for detecting events occurring proximate the sensor, comprising:

a bottom portion and a plurality of side sections, wherein the bottom portion has a first side including a first plurality of apertures and a second side, opposite the first side, including a second plurality of apertures; and a wireless network sensor located in the housing and having a plurality of sensors for detecting events occurring proximate the sensors, a processor for receiving and processing data from the sensors, and a wireless transmitter for wirelessly transmitting data, wherein the plurality of apertures in the bottom portion each contain one of the sensors.

7. The detection sensor of claim 6, wherein the first and second plurality of apertures are positioned at varying angles with respect to the bottom portion.

8. The detection sensor of claim 6, wherein the plurality of apertures are arranged to provide a corresponding plurality of coverage areas by the sensors.

9. A detection sensor having a wireless network sensor for detecting events occurring proximate the sensor, comprising:

a bottom portion and a plurality of sections, wherein the bottom portion has a first plurality of apertures and a second plurality of apertures arranged substantially parallel to the first plurality of apertures; and a wireless network sensor located in the housing and having a plurality of sensors for detecting events occurring proximate the sensors, a processor for receiving and processing data from the sensors, and a wireless transmitter for wirelessly transmitting data, wherein the plurality of apertures in the bottom portion each contain one of the sensors.

10. The detection sensor of claim 9, wherein the first and second plurality of apertures are positioned at varying angles with respect to the bottom portion.

11. The detection sensor of claim 9, wherein the plurality of apertures are arranged to provide a corresponding plurality of coverage areas by the sensors.

12. A detection sensor having a wireless network sensor for detecting events occurring proximate the sensor, comprising:

a substantially planar back portion and a plurality of side sections, wherein the side sections include a top portion having a first plurality of apertures and a second plurality of apertures arranged substantially parallel to the first plurality of apertures; and a wireless network sensor located in the housing and having a plurality of sensors for detecting events occurring proximate the sensors, a processor for receiving and processing data from the sensors, and a wireless transmitter for wirelessly transmitting data, wherein the plurality of apertures in the top portion each contain one of the sensors.

13. The detection sensor of claim 12, wherein the first and second plurality of apertures are positioned at varying angles with respect to the back portion.

14. The detection sensor of claim 12, wherein the plurality of apertures are arranged to provide a corresponding plurality of coverage areas by the sensors.

15. A detection sensor element for use in detecting events occurring proximate the sensor, comprising:

a housing having a plurality of side sections and a top section, wherein the housing has a first aperture having a first diameter and a second aperture, joined with the first aperture, having a second diameter larger than the first diameter and having an exit portion at one of the side sections, wherein the top section is configured at a non-zero angle to the first and second apertures, wherein the second aperture is configured to contain a sensor for detecting events occurring proximate the sensor, the sensor being coupled to a wireless network sensor having a processor for receiving and processing data from the sensor and a wireless transmitter for wirelessly transmitting data.

16. The detection sensor of claim 15, wherein the top section is configured at approximately a 45° angle to the first and second apertures.

17. A detection sensor element for use in detecting events occurring proximate the sensor, comprising:

a housing having a plurality of side sections and a top section, wherein the housing has a first aperture having a first diameter and a second aperture, joined with the first aperture, having a second diameter greater than the first diameter, wherein the first aperture has an exit portion at one of the side sections and wherein the exit portion has a circular cross-sectional shape, wherein the second aperture is configured to contain a sensor for detecting events occurring proximate the sensor, the sensor being coupled to a wireless network sensor having a processor for receiving and processing data from the sensor and a wireless transmitter for wirelessly transmitting data.

18. The detection sensor of claim 17, wherein the side sections of the housing have a rectangular shape.

19. A detection sensor element for use in detecting events occurring proximate the sensor, comprising:

a housing having a plurality of side sections and a top section, wherein the housing has a first aperture and a second aperture, wherein the first aperture has a first end joined with the second aperture inside the housing and a second end comprising an exit portion at one of the side sections, wherein the exit portion has an oval cross-sectional shape with a width greater than the first end, wherein the second aperture is configured to contain a sensor for detecting events occurring proximate the sensor, the sensor being coupled to a wireless network sensor having a processor for receiving and processing data from the sensor and a wireless transmitter for wirelessly transmitting data.

20. The detection sensor of claim 19, wherein the side sections of the housing have a rectangular shape.

* * * * *

UNITED STATES PATENT AND TRADEMARK OFFICE

CERTIFICATE OF CORRECTION

PATENT NO. : 8,098,485 B2
APPLICATION NO. : 11/772883
DATED : January 17, 2012
INVENTOR(S) : Bill L Weaver et al.

It is certified that error appears in the above-identified patent and that said Letters Patent is hereby corrected as shown below:

Column 8
Line 64, Delete "600" and insert -- 60° --, therefor.

Column 10
Line 11, Delete "450" and insert -- 45° --, therefor.

Signed and Sealed this
Twenty-first Day of August, 2012

David J. Kappos
*Director of the United States Patent and Trademark Office*